US012678831B2

(12) United States Patent (10) Patent No.: US 12,678,831 B2

Rohr Daniel et al. (45) Date of Patent: Jul. 14, 2026

(54) SYSTEMS AND METHODS FOR OPTICAL FIBER CLEANING AND INTERFACE PARTICLE REDUCTION

(71) Applicant: INTUITIVE SURGICAL OPERATIONS, INC., Sunnyvale, CA (US)

(72) Inventors: Matthew D. Rohr Daniel, San Francisco, CA (US); Troy K. Adebar, San Jose, CA (US); David W. Bailey, Portola Valley, CA (US); Stephen J. Blumenkranz, Los Altos, CA (US); Edward P. Donlon, San Jose, CA (US); Mark E. Froggatt, Blacksburg, VA (US); Christopher M. Major, Santa Clara, CA (US); Randall L. Schlesinger, San Mateo, CA (US)

(73) Assignee: INTUITIVE SURGICAL OPERATIONS, INC., Sunnyvale, CA (US)

(*) Notice: Subject to any disclaimer, the term of this patent is extended or adjusted under 35 U.S.C. 154(b) by 236 days.

(21) Appl. No.: 18/389,592

(22) Filed: Dec. 19, 2023

(65) Prior Publication Data

US 2024/0118500 A1 Apr. 11, 2024

Related U.S. Application Data

(62) Division of application No. 17/193,166, filed on Mar. 5, 2021, now Pat. No. 11,899,248.

(Continued)

(51) Int. Cl.
| | |
|---|---|
| *G02B 6/38* | (2006.01) |
| *B08B 1/30* | (2024.01) |
| *B08B 1/34* | (2024.01) |

(52) U.S. Cl.
CPC .................. *B08B 1/30* (2024.01); *B08B 1/34* (2024.01); *G02B 6/3866* (2013.01); *B08B 2240/02* (2013.01)

(58) Field of Classification Search
CPC .. G02B 6/3866; B08B 2240/02; B08B 7/0028
See application file for complete search history.

(56) References Cited

U.S. PATENT DOCUMENTS

| | | |
|---|---|---|
| 3,690,590 A | 9/1972 | Bennett et al. |
| 4,017,962 A | 4/1977 | Palmer |

(Continued)

FOREIGN PATENT DOCUMENTS

| | | | |
|---|---|---|---|
| JP | 2011-158571 A | * | 8/2011 |
| KR | 20200049119 A | | 5/2020 |

OTHER PUBLICATIONS

FerrulePro ™, Automatic Desktop Cleaner SPR-2 and SPR-1, 2010, retrieved from the internet URL: https://www.seikoh-giken.co.jp/en/products/mix3-2.html , 2 pages.

(Continued)

*Primary Examiner* — Michael Stahl

(74) *Attorney, Agent, or Firm* — Haynes & Boone, LLP.

(57) ABSTRACT

A system comprises an optical fiber, a manipulator assembly, and a control unit. The manipulator assembly comprises a chassis, an optical fiber cleaning assembly housed within the chassis, and a drive mechanism housed within the chassis. The optical fiber cleaning assembly comprises a cleaning tape, a first spool on which the cleaning tape is wound, and a second spool onto which the cleaning tape is drawn after use. The drive mechanism is configured to advance the cleaning tape from the first spool to the second spool such that a portion of the cleaning tape wipes a face of the optical fiber. The control unit is configured to control the drive mechanism to advance the cleaning tape.

20 Claims, 63 Drawing Sheets

Related U.S. Application Data

(60) Provisional application No. 62/990,732, filed on Mar. 17, 2020, provisional application No. 62/986,369, filed on Mar. 6, 2020, provisional application No. 62/986,430, filed on Mar. 6, 2020.

(56) References Cited

U.S. PATENT DOCUMENTS

| | | | |
|---|---|---|---|
| 4,374,505 A | | 2/1983 | Theriot |
| 5,117,528 A * | | 6/1992 | Kanayama ........... G02B 6/3849 |
| | | | 15/210.1 |
| 6,758,605 B1 * | | 7/2004 | Villemaire ................ B08B 1/30 |
| | | | 15/210.1 |
| 7,243,390 B2 | | 7/2007 | Fujiwara et al. |
| 7,837,801 B2 | | 11/2010 | Christopher et al. |
| 2004/0103491 A1 * | | 6/2004 | Fujiwara ................. B08B 11/00 |
| | | | 15/210.1 |
| 2021/0096039 A1 | | 4/2021 | Huang et al. |
| 2021/0096305 A1 * | | 4/2021 | Castro .................... G01M 11/30 |
| 2021/0278604 A1 | | 9/2021 | Rohr Daniel et al. |
| 2022/0026642 A1 * | | 1/2022 | Asakawa ............ B05B 17/0615 |
| 2023/0059738 A1 * | | 2/2023 | Anderson ............ G02B 6/3806 |

OTHER PUBLICATIONS

FerrulePro™, "Seikoh Giken FerrulePro BenchTop Cleaner," Aug. 9, 2013, retrieved from the internet URL: https://www.youtube.com/watch?v=pUOgQJTao0c , 10 pages.

Vertut, J., and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

100

192
Barrier

160
Drive
Mechanism

152
Indicator

150
Control Unit

158
Index Matching
Fluid Sensor

170
Optical Sensor

Cleaning
Tape Sensor
157

SYSTEMS AND METHODS FOR OPTICAL FIBER CLEANING AND INTERFACE PARTICLE REDUCTION

CROSS-REFERENCE TO RELATED APPLICATIONS

This application is a divisional of U.S. patent application Ser. No. 17/193,166, filed Mar. 5, 2021, which claims the benefit of U.S. Provisional Application 62/986,369 filed Mar. 6, 2020; U.S. Provisional Application 62/986,430 filed Mar. 6, 2020; and U.S. Provisional Application 62/990,732 filed Mar. 17, 2020, which are incorporated by reference herein in their entirety.

FIELD

Embodiments described herein generally relate to optical fiber cleaning assemblies or to reducing particle formation at a non-permanent optical fiber connection joint. Specifically, embodiments described herein relate to optical fiber cleaning assemblies for cleaning a face of an optical fiber or reducing particle formation at an optical fiber joint.

BACKGROUND

Optical fibers may be connected to each other to allow light to travel from one fiber to another. For example, an optical fiber within a device may be connected to a system that includes a laser source for generating light and that includes an interrogator for analyzing the reflected light signals within the optical fiber. The optical fibers may be connected in an end-to-end manner, with a face of a first optical fiber in contact with a face of a second optical fiber. To facilitate connection of the optical fibers, each optical fiber may include a fiber connector configured to mate with another optical fiber connector. The optical fiber connectors can enable rapid connection and disconnection. The connectors can also mechanically couple and align the cores of the optical fibers so that light can pass from the first optical fiber to the second optical fiber.

Prior to making an optical fiber connection, the face of one or both optical fibers may be thoroughly cleaned in order to remove any particulate matter present on the face of the optical fibers. Particulate matter such as airborne dust particles, skin oils, lint, and fabric, among other dirt or debris may affect the signals transmitted through the optical fibers. If an optical fiber is contaminated with particulate matter, the particulate matter may scratch the fiber face or may become embedded within the fiber face over time. Contamination of one optical fiber may result in contamination of any optical fiber connected thereto. For example, particulate matter on the contaminated optical fiber may transfer to the connected optical fiber or may scratch or become embedded within the connected optical fiber. Damage to the optical fibers may require repair or replacement of one or both of the optical fibers, which can be expensive and inconvenient.

Furthermore, the joining of communication cables can be performed using a variety of connectors. When using optical fibers for communication signals, it is desirable to form a low loss joint, by abutting faces at the cleaved ends of the fibers with precise alignment of the fiber cores. For non-permanent connectors of optical fibers, the cleaved ends of the fibers are held in alignment by a mechanical force. The signals transmitted by the optical fiber cable can be degraded by contamination between the mating faces at the joint. Forming the optical fiber connection with such contamination can cause damage to the faces over time and result in permanent performance reduction as particles are embedded in the fiber face.

BRIEF SUMMARY

Some embodiments described herein relate to an optical fiber cleaning assembly that includes a cleaning tape, a first spool having the cleaning tape wound thereon, a second spool onto which the cleaning tape is drawn, and a drive mechanism configured to move the cleaning tape from the first spool to the second spool. When a face of an optical fiber is placed in contact with a surface of the cleaning tape, the drive mechanism is configured to move the cleaning tape from the first spool to the second spool to wipe the face of the optical fiber.

Some embodiments described herein relate to a system that includes an optical fiber, and an optical fiber cleaning assembly. The optical fiber cleaning assembly of the system includes a cleaning tape, a first spool on which the cleaning tape is wound, a second spool onto which the cleaning tape is drawn. The system further includes a drive mechanism configured to move the cleaning tape from the first spool to the second spool, and one or more connectors configured to mate with one or more connectors of a system so as to detachably attach the optical fiber cleaning assembly to the system, or one or more connectors of a device so as to detachably attach the optical fiber cleaning assembly to the device, wherein when a face of an optical fiber is placed in contact with a surface of the cleaning tape, the drive mechanism is configured to move the cleaning tape from the first spool to the second spool to wipe the face of the optical fiber.

Some embodiments described herein relate to a method of cleaning optical fibers, wherein the method includes receiving, on a surface of a cleaning tape, a face of an optical fiber, wherein the cleaning tape comprises a plurality of apertures, and wherein the cleaning tape is wound on a first spool. The method further includes advancing, by a drive mechanism, the cleaning tape from the first spool to a second spool so that a portion of the cleaning tape wipes the face of the optical fiber, and, advancing, by the drive mechanism, the cleaning tape so that the optical fiber is aligned with an aperture of the plurality of apertures of the cleaning tape.

In any of the various embodiments described herein, the optical fiber cleaning assembly may further include an index matching fluid having a refractive index that corresponds to a refractive index of the optical fiber, wherein the cleaning tape is impregnated with the index matching fluid. In some embodiments, index matching fluid may include glycerin.

In any of the various embodiments described herein, the surface of the cleaning tape may include an adhesive. In some embodiments, a second surface of the cleaning tape may include an adhesive.

In any of the various embodiments described herein, the first spool may include a biasing mechanism configured to maintain the cleaning tape under tension between the first spool and the second spool.

In any of the various embodiments described herein, the drive mechanism may include a motor.

In any of the various embodiments described herein, the optical fiber cleaning assembly may further include a reservoir configured to store an index matching fluid, wherein the index matching fluid is supplied to the cleaning tape to impregnate the cleaning tape with the index matching fluid.

In any of the various embodiments described herein, the cleaning tape may be pre-impregnated with an index matching fluid.

In any of the various embodiments described herein, the optical fiber cleaning assembly may further include a fluid removal device, wherein the cleaning tape passes through the fluid removal device such that the fluid removal device removes excess index matching fluid from the cleaning tape.

In any of the various embodiments described herein, the one or more connectors of the optical fiber cleaning assembly may be configured to mate with the one or more connectors of the system, and wherein the optical fiber cleaning assembly may further include one or more second connectors configured to mate with the one or more connectors of the device.

In any of the various embodiments described herein, the cleaning tape may include a plurality of apertures arranged along a longitudinal axis of the cleaning tape, such that particulate matter on the face of the optical fiber may be detected through an aperture of the plurality of apertures. In some embodiments, the plurality of apertures may be configured to allow the optical fiber to connect to a second optical fiber through an aperture of the plurality of apertures.

In any of the various embodiments described herein, the drive mechanism of the optical fiber cleaning assembly may include a rotatable disk to couple to a rotatable disk of the system. In some embodiments, rotation of the rotatable disk of the system may cause rotation of the rotatable disk of the optical fiber cleaning assembly to move the cleaning tape from the first spool to the second spool.

In any of the various embodiments described herein, the cleaning tape may be impregnated with an index matching fluid having a refractive index that corresponds to a refractive index of one or more cores of the optical fiber.

In any of the various embodiments described herein, the optical fiber cleaning assembly may further include an optical sensor configured to detect particulate matter on the face of the optical fiber. In some embodiments, the optical fiber cleaning assembly may further include an indicator configured to indicate when particulate matter is present on the optical fiber as determined by the optical sensor.

In any of the various embodiments described herein, the drive mechanism may be configured to rotate a rotating disk of the system to rotate a capstan of a device that advances the cleaning tape.

In any of the various embodiments described herein, the drive mechanism may be configured to actuate a pump such that index matching fluid is supplied by the pump onto the cleaning tape.

In any of the various embodiments described herein, the optical fiber cleaning assembly may further include a contact sensor configured to detect when a second optical fiber contacts the cleaning tape, wherein when the second optical fiber contacts the cleaning tape as determined by the contact sensor, the control unit causes the drive mechanism to automatically advance the cleaning tape.

In any of the various embodiments described herein, the cleaning tape may include a plurality of apertures arranged along a longitudinal axis of the cleaning tape, wherein the plurality of apertures are spaced from one another.

In any of the various embodiments described herein, the drive mechanism may include a motor configured to drive at least one of the first spool and the second spool so as to advance the cleaning tape of the optical fiber cleaning assembly.

In any of the various embodiments described herein, the system may include a chassis comprising the optical fiber, the drive mechanism, and the control unit, and wherein the optical fiber cleaning assembly is removably securable to the chassis of the system in order to clean the optical fiber of the system.

In any of the various embodiments described herein, the optical fiber cleaning assembly may be configured to receive an optical fiber of a device, such that the optical fiber of the system connects to the optical fiber of the device within the optical fiber cleaning assembly In any of the various embodiments described herein, the cleaning tape may be impregnated with an index matching fluid.

In any of the various embodiments described herein, a method of cleaning optical fibers may further include passing the cleaning tape through a reservoir containing an index matching fluid as the cleaning tape advances from the first spool to the second spool so as to impregnate the cleaning tape with the index matching fluid.

In any of the various embodiments described herein, a method of cleaning optical fibers may further include passing the cleaning tape through a fluid removal device configured to remove excess index matching fluid from the cleaning tape impregnated with the index matching fluid.

In any of the various embodiments described herein, a method of cleaning optical fibers may further include detecting, by an optical sensor, a presence of particulate matter on the face of the optical fiber.

In any of the various embodiments described herein, a method of cleaning optical fibers may further include, after detecting the presence of particulate matter by the optical sensor, advancing, by the drive mechanism, the cleaning tape so that a second portion of the cleaning tape wipes the face of the optical fiber.

In any of the various embodiments described herein, a method of cleaning optical fibers may further include receiving, on a second surface of the cleaning tape opposite the surface, a face of a second optical fiber, wherein advancing the cleaning tape from the first spool to the second spool causes the portion of cleaning tape to wipe the face of the second optical fiber.

In any of the various embodiments described herein, a method of cleaning optical fibers may further include causing the optical fiber and the second optical fiber to contact through an aperture of the plurality of apertures of the cleaning tape.

In any of the various embodiments described herein, a method of cleaning optical fibers may further include advancing a barrier to prevent connection of the optical fiber to the second optical fiber when the presence of particulate matter is detected by the optical sensor. In some embodiments, when the presence of particulate matter is not detected by the optical sensor, the method may further include retracting the barrier to allow connection of the optical fiber to the second optical fiber for a predetermined period of time.

BRIEF DESCRIPTION OF THE DRAWINGS

The accompanying drawings, which are incorporated herein and form a part of the specification, illustrate the present disclosure and, together with the description, further serve to explain the principles thereof and to enable a person skilled in the pertinent art to make and use the same.

Figure 1:
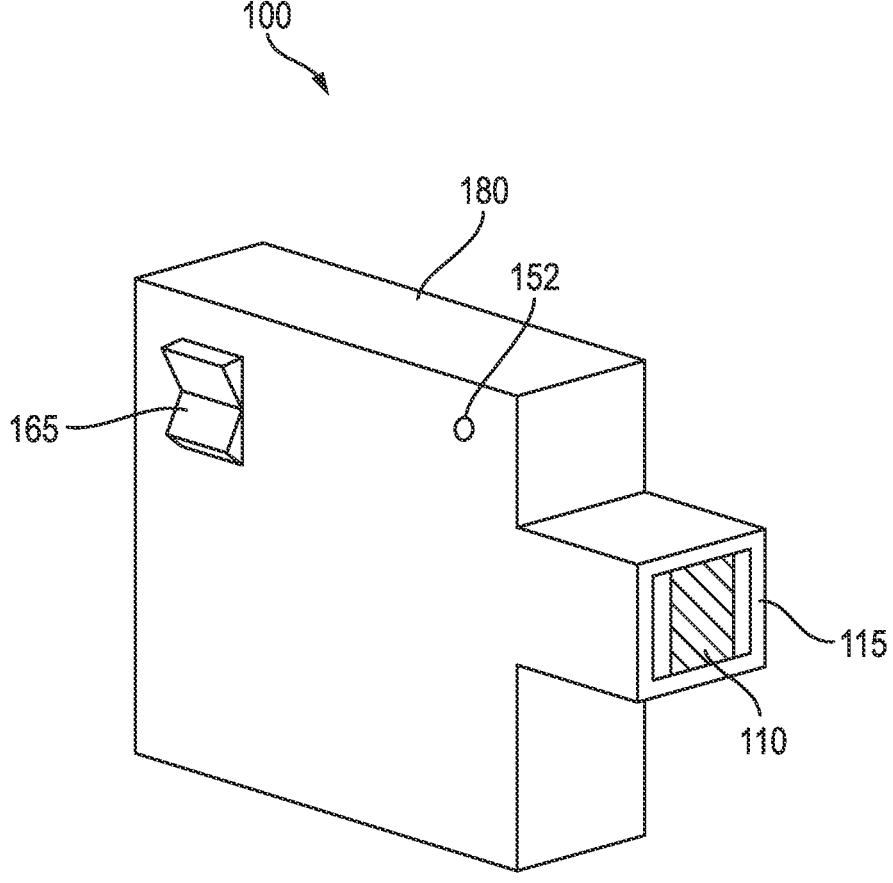
FIG. 1 shows a perspective view of an optical fiber cleaning assembly for cleaning an optical fiber according to some embodiments.

Embodiments of the present technology and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but some embodiments might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Prior to connecting optical fibers, the tips or faces, referred to herein as "faces" of the optical fibers that are placed in contact with one another may be cleaned. As used herein, the term optical fiber may refer to a cladding and one or more cores. As used herein, the term optical fiber connectors or fiber connectors may refer to structures configured to align an optical fiber with a second optical fiber. In order to clean the faces of optical fibers, manual hand-held cleaners may be used. Such hand-held cleaners may require a skilled technician to insert an optical fiber into the cleaning device with a proper insertion pressure and insert the optical fiber for a sufficient period of time while actuating the hand-held cleaner to clean the face of the optical fiber.

Optical fiber connections may be found in medical instruments and medical instrument manipulation systems. For example, optical fibers may be used in a fiber optical shape sensing system (e.g., used to determine the position, orientation, speed, velocity, pose, and/or shape of a distal portion and/or of one or more segments along a medical instrument), fiber optical strain sensing for use in a medical instrument force sensor, fiber optic diagnosis and treatment based on spectroscopic bio-chemical sensing, and/or fiber optic delivery of laser tissue ablation, among other uses.

Medical professionals who use medical instruments incorporating optical fiber connections may be unfamiliar and untrained with optical fiber connections and optical fiber cleaning techniques. As a result, the medical professionals may forget to use a manual hand-held cleaner prior to making the optical fiber connection or may fail to properly and thoroughly clean the faces of the optical fibers prior to making a connection.

If optical fibers are connected without proper cleaning, one or both of the optical fibers may be contaminated. Contamination of an optical fiber may result in particulate matter becoming embedded in the face of the optical fiber or scratching the face of the optical fiber, which may negatively affect the transmission of light signals through the optical fiber connection or cause light signals to be detrimentally reflected from the optical fiber connection. Further, once one optical fiber is contaminated, the contaminated optical fiber may in turn contaminate the other optical fiber connected to the contaminated fiber. Should the optical fiber become contaminated or damaged, the device incorporating the optical fiber (e.g., a medical instrument and/or a medical manipulator system connectable to the medical instrument) may be unable to be used until cleaned or repaired by a skilled technician. Such damage can be very costly to repair and can prevent usage of the device.

Accordingly, a system and method for enhancing the reliable operation of devices that use fiber optical connections is desired.

As used herein, the term particulate matter may refer to any foreign matter or substance present on a face of an optical fiber, such as airborne dust particles, lint, and fabric, among other dirt and debris. Particulate matter may also be generated when friction between components of two mating fiber connectors (e.g., a fiber connector of a medical instrument and a fiber connector of a medical manipulator system) are brought together to connect two optical fibers. An optical fiber may be considered to be contaminated when particulate matter is present on a face of the optical fiber.

Optical fiber cleaning assemblies described herein may be used to clean an optical fiber of a device, such as a medical instrument (e.g., a catheter) having a fiber optic shape sensor with a medical instrument optical fiber connector, or an optical fiber of a system, such as a medical manipulator system for controlling and guiding the medical instrument. While the present disclosure refers primarily to medical instruments and medical systems, it will be readily understood by one of ordinary skill in the art that the optical fiber cleaning assemblies described herein may be used to clean any optical fibers or optical fiber connectors.

FIG. 1 shows a perspective view of an optical fiber cleaning assembly 100 for cleaning an optical fiber according to some embodiments. The optical fiber cleaning assembly 100 may be configured to clean a single optical fiber at a time. Optical fiber cleaning assembly 100 may be used to clean an optical fiber having any number of cores, such as an optical fiber having a single core or a plurality of cores (e.g., two cores, five cores, seven cores, etc.). Prior to connecting two optical fibers to one another, optical fiber cleaning assembly 100 may be used to clean the face of the first optical fiber, and may subsequently be used to clean the face of the second optical fiber. Once both optical fibers have been cleaned, the cleaned optical fibers may be connected to one another.

Optical fiber cleaning assembly 100 includes a housing 180 enclosing a cleaning tape 110 for cleaning optical fibers.

Housing 180 may include a cleaning window 115 through which an optical fiber may contact cleaning tape 110 for cleaning the optical fiber. Cleaning window 115 may expose a portion of cleaning tape 110 to an exterior of housing 180. Cleaning window 115, or a portion of housing 180 at which cleaning window 115 is located, may be configured to mate with an optical fiber connector in order to clean an optical fiber. As would be understood by one of ordinary skill in the art, cleaning window 115 may use different shapes and geometries in order to bring cleaning tape 110 into contact with an optical fiber depending on the type of optical fiber connector and the respective device or system in which it is integrated. Housing 180 of optical fiber cleaning assembly 100 may have any of various shapes. In some embodiments, housing 180 may further include a handle or grip for a user to grasp while using optical fiber cleaning assembly 100. Alternatively, housing 180 may have an ergonomic shape so as to be grasped in one hand of a user, while the other hand is used to press the optical fiber against the cleaning tape 110.

Cleaning tape 110 is configured to remove particulate matter from a face of an optical fiber. Cleaning tape 110 may be an elongated, flexible strip of material having a generally rectangular configuration. Cleaning tape 110 may include a first surface opposite a second surface (e.g., a front surface and a rear surface), as will be described in further detail below. Cleaning tape 110 may be composed of a lint-free material, including, for example, microfiber, polyester, a woven material, or a non-woven material, among other materials. In some embodiments, cleaning tape 110 may be composed of a woven material having a thread pitch of 110 to 160 threads per inch in the perpendicular direction of the weave. The material of cleaning tape 110 may have a thickness of about 0.004 inches to about 0.005 inches.

In some embodiments, cleaning tape 110 may include an adhesive on a surface thereof, such that the surface is sticky or tacky. The adhesive may facilitate removal of particulate matter from the face of an optical fiber. Cleaning tape 110 may be arranged with an adhesive on the front surface, the rear surface, or both. In embodiments having an adhesive, when the face of an optical fiber contacts cleaning tape 110, the adhesive might not transfer to the face of optical fiber. In some embodiments, cleaning tape 110 may be non-tacky and might not include an adhesive.

Optical fiber cleaning assembly 100 may further include an actuator 165 for operating a drive mechanism to move (e.g., advance) cleaning tape 110. Cleaning tape 110 may be moved so as to wipe an optical fiber in contact with a portion of cleaning tape 110 through cleaning window 115. Actuator 165 may be in the form of a push-button, a switch (such as a rocker-switch), a dial, a lever, or the like. Once an optical fiber is brought into contact with cleaning tape 110 through cleaning window 115, a user may operate actuator 165 to advance cleaning tape 110 and wipe the face of the optical fiber in order to clean the face of the optical fiber.

In some embodiments, optical fiber cleaning assembly 100 may further include an indicator 152 configured to indicate a status of an optical fiber cleaning operation, as described in further detail below with respect to FIG. 5. Indicator 152 may be, for example, an indicator light configured to illuminate in order to indicate a status of the optical fiber cleaning operation. For example, indicator 152 may indicate to a user that an optical fiber face is contaminated (e.g., particulate matter is present on a face of the optical fiber) or that the optical fiber face is clean (e.g., the optical fiber face is free of particulate matter). Indicator 152 may be arranged on housing 180 so that indicator 152 is visible to the user operating optical fiber cleaning assembly 100. In some embodiments, indicator 152 may alternatively or additionally include an audio unit, such as a speaker, for playing or emitting a tone or sound to indicate a status of a cleaning operation, e.g., a tone is played to indicate that an optical fiber face is free of particulate matter.

Figure 2:
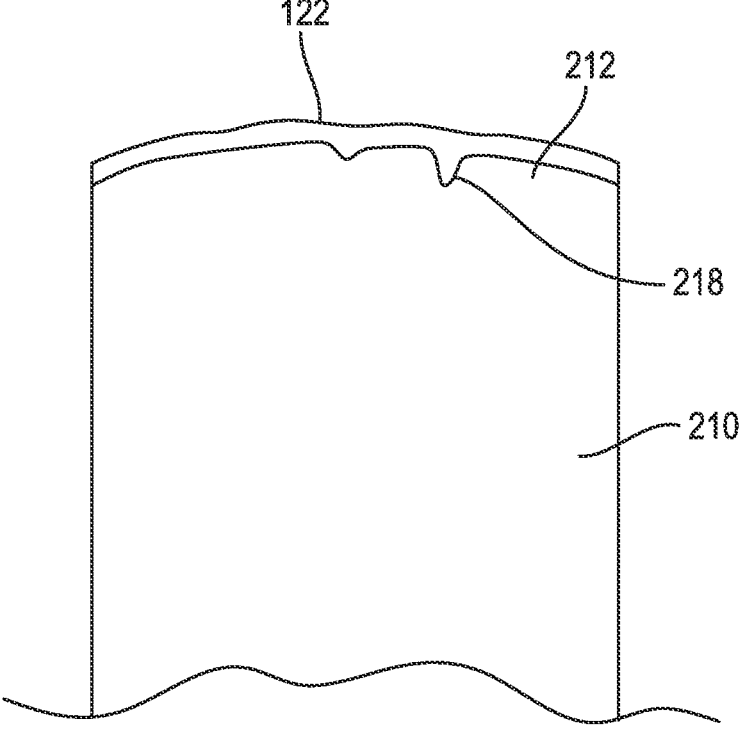
FIG. 2 shows a magnified view of a face of an optical fiber having a coating of an index matching fluid applied by an optical fiber cleaning assembly according to some embodiments.

FIG. 2 shows a magnified view of a face 212 of an optical fiber 210 having a coating of an index matching fluid 122 applied by an optical fiber cleaning assembly 100 according to some embodiments. An index matching fluid (e.g., fluid 122) may be a fluid having a refractive index that correspond to a refractive index of the optical fiber to be cleaned (e.g., optical fiber 210). The refractive index may be equal to or nearly equal to a refractive index of the fiber core(s) of the optical fiber 210. In some embodiments, the refractive index of the index matching fluid 122 may be within about 10% of a refractive index of the fiber core(s) of the optical fiber 210. In some embodiments, the refractive index of the index matching fluid 122 may range from about 1.4 to about 1.5, such as about 1.46. Thus, index matching fluid 122 may be selected based on the material of the optical fiber core(s). Optical fibers may be formed from, for example, fused silica, germanium-doped silica, borosilicate glass, BK7, or crown glass, among others. As index matching fluid 122 has a refractive index that correspond to the core(s) of the optical fiber 210 to be cleaned, the index matching fluid 122 might not affect transmission of light through the optical fiber core(s). In some embodiments, index matching fluid 122 may include glycerin.

In order to apply a coating of index matching fluid 122 onto optical fiber 210, cleaning tape 110 of optical fiber cleaning assembly 100 may be pre-impregnated with index matching fluid 122 or coated with index matching fluid from a reservoir in the cleaning assembly 100 at the time of use. Cleaning tape 110 may be formed from a porous or woven material, and index matching fluid 122 may be held within pores or a weave of cleaning tape 110. Additionally or alternatively, cleaning tape 110 may be formed from an absorbent material, and index matching fluid 122 may be absorbed into cleaning tape 110.

In some embodiments, cleaning tape 110 may be impregnated with an index matching fluid 122 by applying a coating of an index matching fluid 122 onto a first surface (e.g., a front surface) and optionally a second surface (e.g., a rear surface) of cleaning tape 110, such as by a brush. In some embodiments, index matching fluid 122 may be poured onto cleaning tape 110. Alternatively, cleaning tape 110 may be positioned in a pool or bath of index matching fluid for a period of time (e.g., a soak time) and subsequently withdrawn from the pool and wound into a roll. In some embodiments, cleaning tape 110 may be stored in a dry state (e.g., without an index matching fluid), and an index matching fluid 122 may be applied to cleaning tape 110 during a process of cleaning an optical fiber as described in further detail herein.

After index matching fluid 122 is applied to the optical fiber 210, index matching fluid 122 may also fill microscopic gaps or cracks, also referred to herein as etalons 218, on a face 212 of an optical fiber 210, as shown for example in FIG. 2. Further, wetting face 212 with index matching fluid 122 may help to release, capture, and transport particulate matter on face 212 of optical fiber 210, and particulate matter on or within etalon 218.

Figure 3:
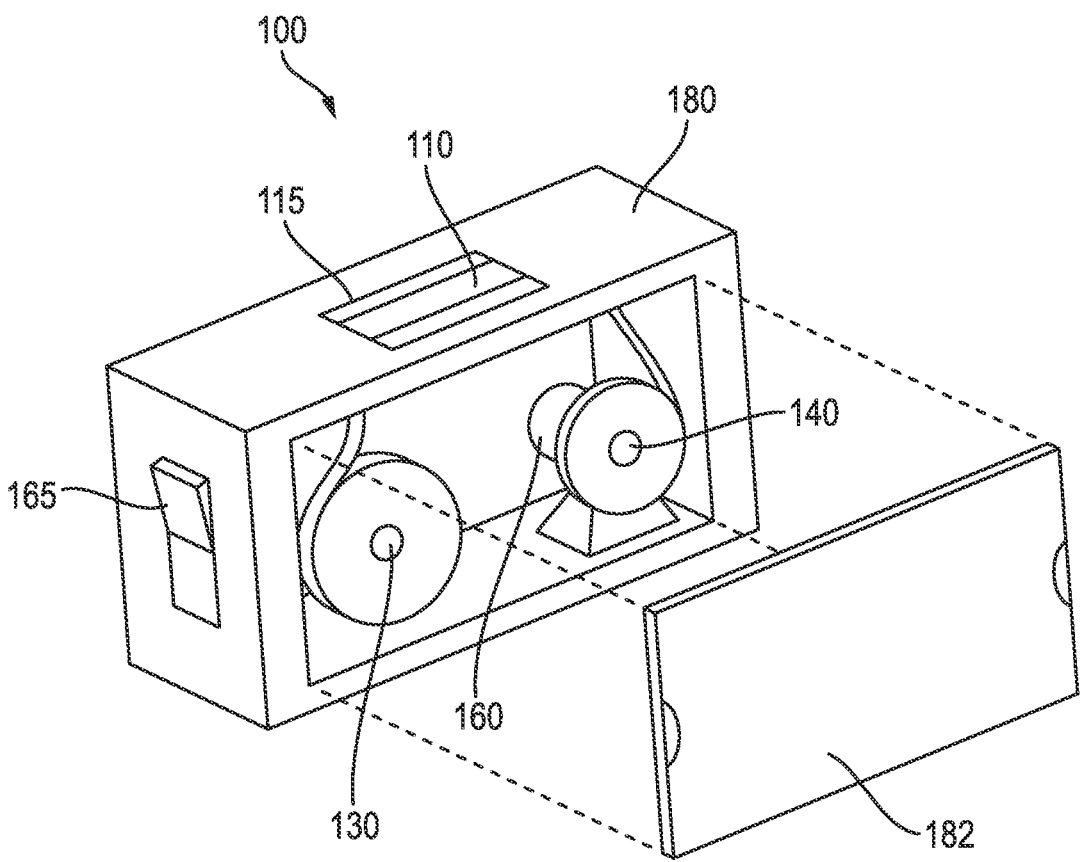
FIG. 3 shows a rear perspective view of an optical fiber cleaning assembly according to some embodiments.

FIG. 3 shows a rear perspective view of an optical fiber cleaning assembly 100 according to some embodiments. Cleaning tape 110 of optical fiber cleaning assembly 100 may be wound in a roll on first spool 130 to facilitate storage and dispensing of cleaning tape 110. Cleaning tape 110 may be drawn from first spool 130, past a cleaning window 115 at which cleaning tape 110 may contact an optical fiber 210, and onto a second spool 140. Each spool 130, 140 rotates about a longitudinal axis of the spool in order to allow cleaning tape 110 to advance from first spool 130 and wind onto second spool 140. In some embodiments, the longitudinal axis of first spool 130 and the longitudinal axis of second spool 140 may be arranged parallel to one another. In some embodiments, first spool 130 may be arranged at an angle to second spool 140. Further, in some embodiments, first and second spools 130, 140 may be parallel to one another and may be arranged on a common longitudinal axis. Such embodiments may help to provide cleaning assembly 100 with a compact configuration. As cleaning tape 110 is drawn from first spool 130 onto second spool 140 during use of optical fiber cleaning assembly 100, a clean and unused portion of cleaning tape 110 may be used to clean a face of an optical fiber. After use, the used portion of cleaning tape 110 is wound onto second spool 140. First spool 130 and second spool 140 may be supported by housing 180 and may be enclosed within housing 180. In some embodiments, cleaning tape 110 may be removably installed on first and second spools 130, 140 so that when a roll of cleaning tape 110 is used, the used roll may be removed and a new roll of cleaning tape 110 may be installed on first spool 130.

In some embodiments, housing 180 may further include a door 182 that is removably secured to housing 180 in order to allow access to an interior volume of housing 180, as shown in FIG. 3. In this way, a user may access cleaning tape 110 within housing 180 so as to remove a used roll of cleaning tape 110 and insert a replacement roll of cleaning tape 110. Enclosing cleaning tape 110 within housing 180 may help to prevent particulate matter from contacting cleaning tape 110 prior to use of cleaning tape 110 to clean optical fibers.

In some embodiments, second spool 140 may be separated from first spool 130 by a divider (not shown) within housing 180 such that first and second spools 130, 140 are arranged within different compartments of housing 180. This may help to prevent any particulate matter on cleaning tape 110 of second spool 140 from transferring to the clean, unused cleaning tape 110 on first spool 130. In some embodiments, optical fiber cleaning assembly 100 may be disposable and might not include a door 182 for replacing cleaning tape 110. Thus, when the roll of cleaning tape 110 has been used, cleaning assembly 100 may be disposed of or recycled.

Optical fiber cleaning assembly 100 may include a drive mechanism 160 configured to cause rotation of first spool 130 or second spool 140 in order to advance cleaning tape 110 from first spool 130 onto second spool 140. In some embodiments, each of first spool 130 and second spool 140 may include a drive mechanism. Drive mechanism 160 may be mechanically operated, and may include for example a gear train. In some embodiments, drive mechanism 160 is a rotary actuator and may be an electrical motor. In some embodiments, first spool 130 may freely rotate, and second spool 140 may be rotated by a drive mechanism 160 so that as second spool 140 rotates, cleaning tape 110 is drawn from first spool 130 onto second spool 140. In this way, drive mechanism 160 may help to maintain tension on cleaning tape 110 so that cleaning tape 110 is taut between first and second spools 130, 140, e.g., in window 115.

In some embodiments, drive mechanism 160 is controlled by an actuator 165. Actuator 165 may be a lever, switch (such as a rocker switch), push-button, dial, or the like. In some embodiments, drive mechanism 160 may be manually operated so that a user can operate actuator 165 in order to cause cleaning tape 110 to advance from first spool 130 onto second spool 140. In some embodiments, a user may control the amount of cleaning tape 110 advanced from first spool 130 onto second spool 140. For example, when actuator 165 is a dial, the user may rotate the dial, and the amount of cleaning tape 110 advanced from first spool 130 to second spool 140 may correspond to the degree of rotation of the dial. In some embodiments, drive mechanism 160 may be configured to advance cleaning tape 110 by a fixed increment. In some embodiments, drive mechanism 160 may advance cleaning tape 110 by, for example, an increment of about 0.5 cm to about 10 cm, or about 1 cm to about 8 cm, or about 2 cm to about 6 cm. Thus, each time actuator 165 is actuated, such as by moving a switch from a first position to a second position, drive mechanism 160 may advance cleaning tape by a certain amount (e.g., 5 cm).

In some embodiments, drive mechanism 160 may be an electric motor that is powered by a power source, such as a battery or a regulated power supply. Electric motor may be controlled by an actuator 165, such as a push-button, such that when a user operates the push-button, electric motor rotates first or second spool 130, 140 in order to advance cleaning tape 110 by a fixed increment. In some embodiments, optical fiber cleaning assembly 100 might not include a drive mechanism 160, and a motor of a system having an optical fiber to which cleaning assembly 100 is connected for cleaning the optical fiber may provide the drive mechanism for advancing cleaning tape 110, as discussed in further detail below.

In some embodiments, drive mechanism 160 is automatically actuated when an optical fiber is introduced into cleaning window 115 or when optical fiber contacts cleaning tape 110 in cleaning window. Optical fiber cleaning assembly 100 may be configured to detect the presence of optical fiber and automatically actuate drive mechanism 160 to advance cleaning tape 110. Further, optical fiber cleaning assembly 100 may prevent operation of actuator 165 if an optical fiber is not detected, such as by a sensor of cleaning assembly 100, or may prevent operation of actuator 165 if an error occurs (e.g., interference by a foreign object, lack of cleaning tape 110, etc.)

Figure 4:
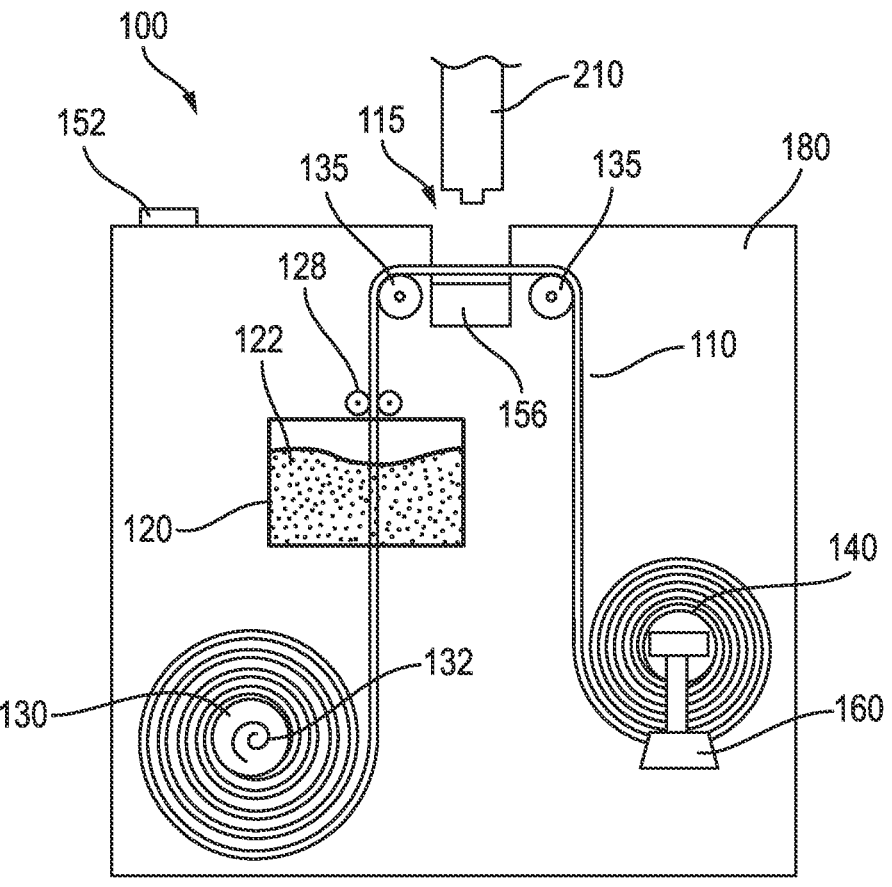
FIG. 4 shows a diagram of components of an optical fiber cleaning assembly according to some embodiments.

FIG. 4 shows a diagram of components of an optical fiber cleaning assembly 100 according to some embodiments. For example, cleaning tape 110 may be stored on first spool 130 in a dry state. Cleaning tape 110 may pass through a reservoir 120 containing index matching fluid 122 so that cleaning tape 110 is impregnated or wetted with index matching fluid 122 as cleaning tape 110 is drawn from first spool 130 onto second spool 140 and through reservoir 120. In some embodiments, cleaning tape 110 impregnated with index matching fluid 122 may pass through a fluid removal device 128, such as one or more pairs of pinch rollers or a squeegee. Fluid removal device 128 may help to remove excess index matching fluid 122 from cleaning tape 110 in order to prevent build-up of index matching fluid 122 at an optical fiber face, which may attract or capture particulate matter. Cleaning tape 110 impregnated with index matching fluid 122 may then move past a cleaning window 115 of housing 180 in which cleaning tape 110 is exposed to an exterior of housing 180 so that cleaning tape 110 may be brought into contact with an optical fiber 210.

As the cleaning tape 110 is drawn from first spool 130 onto second spool 140, cleaning tape 110 may be drawn over guide members 135, such as posts or rollers. Guide members 135 may help to maintain cleaning tape 110 under tension or to adjust the tension of cleaning tape 110 and to position cleaning tape 110 at a desired location and/or orientation, such as substantially parallel to cleaning window 115. Once cleaning tape 110 is used to clean an optical fiber 210 and moves past cleaning window 115, cleaning tape 110 may be wound on a second spool 140.

In such embodiments, a dry roll of cleaning tape 110 may be installed on first spool 130, and a length of cleaning tape 110 may be positioned so as to extend through a reservoir 120 and cleaning tape 110 may be attached to a second spool 140. Reservoir 120 may then be filled with index matching fluid 122 so as to wet a portion of cleaning tape 110 positioned within reservoir 120. Reservoir 120 may store index matching fluid 122 and prevent index matching fluid 122 from escaping reservoir 120. For example, an inlet and outlet of reservoir 120 through which cleaning tape 110 extends may be water-tight so that index matching fluid 122 does not escape through inlet and outlet of reservoir 120. Further, inlet and outlet of reservoir 120 may include a gasket or seal to prevent leakage of fluid 122. In some embodiments, index matching fluid 122 may be a gel or have a high viscosity so as to inhibit leakage of index matching fluid 122. As cleaning tape 110 impregnated with index matching fluid 122 leaves reservoir 120, cleaning tape 110 may pass through fluid removal device 128 so as to remove excess index matching fluid from cleaning tape 110. Excess index matching fluid 122 may be returned to reservoir 120. As cleaning tape 110 advances from first spool 130 to second spool 140, additional portions of cleaning tape 110 are drawn into and through reservoir 120 so as to become coated with index matching fluid 122.

In some embodiments, first spool 130 may include a biasing mechanism 132 configured to maintain cleaning tape 110 extending from first spool 130 to second spool 140 under tension. Biasing mechanism 132 may be, for example, a spring, or friction drag among other mechanisms configured to apply tension to cleaning tape 110.

Figure 5:
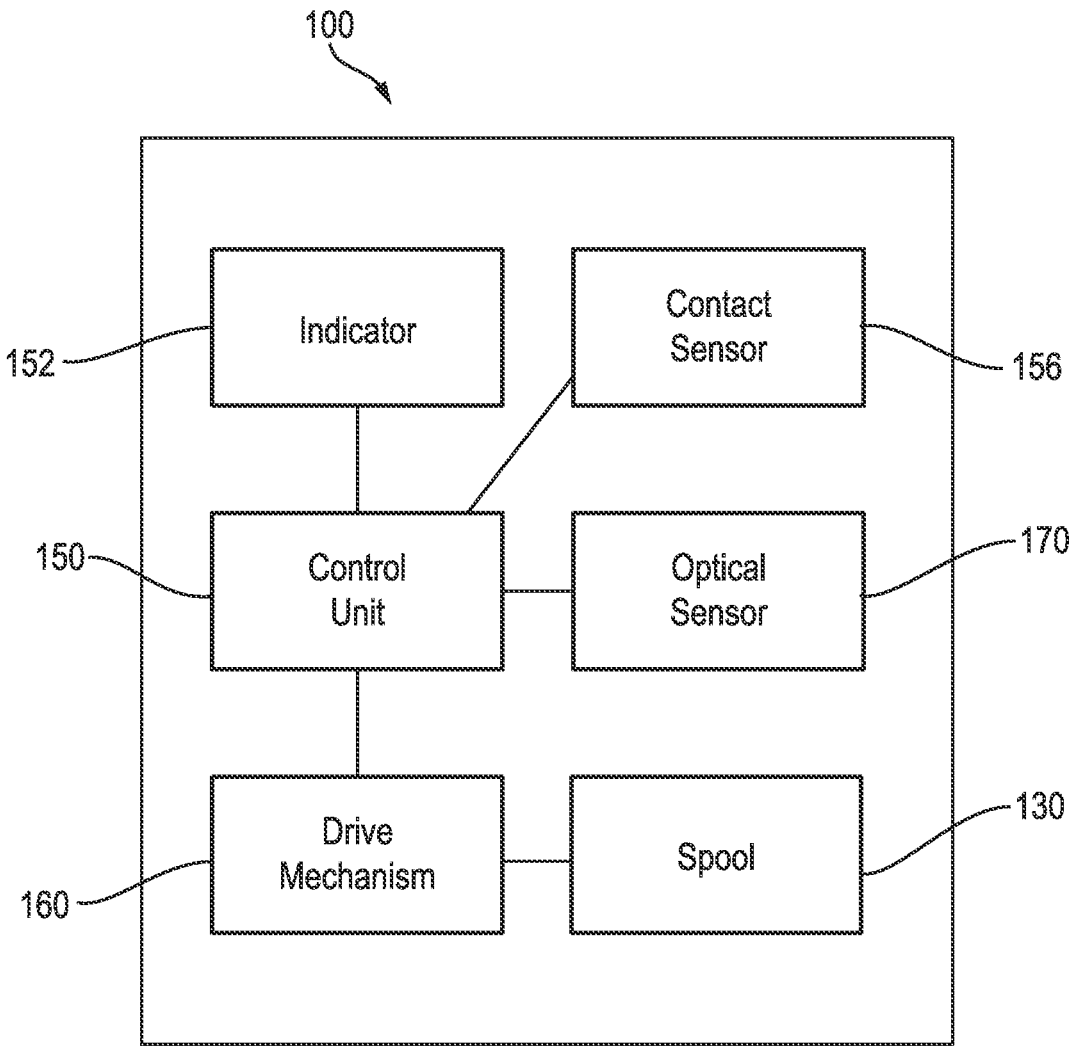
FIG. 5 shows a schematic diagram of components of an optical fiber cleaning assembly according to some embodiments.

FIG. 5 shows a schematic diagram of components of an optical fiber cleaning assembly 100 according to some embodiments. Optical fiber cleaning assembly 100 may include a control unit 150 configured to control operation of optical fiber cleaning assembly 100. Control unit 150 may send instructions to actuate drive mechanism 160 so that drive mechanism 160 advances cleaning tape 110 by a fixed increment, for example. Control unit 150 may be in communication with an actuator 165 that can be operated by a user in order to begin a cleaning operation. In some embodiments, drive mechanism 160 may be automatically actuated when an optical fiber 210 is brought into contact with cleaning tape 110 of optical fiber cleaning assembly 100. In such embodiments, control unit 150 may also be in communication with a contact sensor 156 configured to determine when an optical fiber is in contact with the cleaning tape. Contact sensor 156 may be, for example, a pressure sensor or force sensor so that when optical fiber contacts cleaning tape 110, optical fiber exerts a force on contact sensor 156. Upon detection of contact of optical fiber 210 with cleaning tape 110 by contact sensor 156, control unit 150 may cause drive mechanism 160 to automatically advance cleaning tape 110. Control unit 150 may cause drive mechanism 160 to advance cleaning tape 110 by a fixed increment. If further cleaning is desired, optical fiber can be moved out of contact with cleaning tape 110, and can again be placed into contact with cleaning tape 110 so that cleaning tape 110 is again advanced so as to wipe the face of the optical fiber. This process may be repeated until the face of optical fiber is free from particulate matter.

In some embodiments, the control unit 150 may have a processor and a memory that stores computer-executable instructions. The processor may be a single processor or a plurality of processors, and may include one or more cores. The memory may include random access memory (RAM), flash memory, or the like. Computer programs, also called computer control logic, may be stored in the memory. When executed, the computer programs enable the processor to implement the processes of the embodiments discussed herein. In some embodiments, cleaning assembly 100 might not include a control unit and instead, a system to which cleaning assembly 100 is connected may include a control unit for operating cleaning assembly 100. In this way, construction of cleaning assembly 100 may be simplified. Further, the cleaning operation may be controlled by the system's workflow and the system may be configured to output information, data, or notifications to the user with respect to the cleaning operation, such as whether the cleaning operation has been performed, and whether the optical fiber face is clean.

In some embodiments, optical fiber cleaning assembly 100 may further include an indicator 152, such as an indicator light that is configured to illuminate to indicate the status of the cleaning operation. Indicator light may include, for example, one or more light emitting diodes (LEDs). In some embodiments, indicator 152 may illuminate in a first color, such as red, when an optical fiber is in contact with cleaning tape, as determined by contact sensor 156. If the user does not properly position optical fiber so that the optical fiber contacts cleaning tape 110 and contact sensor 156, the indicator light might not illuminate, alerting the user that the optical fiber is not properly positioned. Once the optical fiber is in contact with cleaning tape 110, indicator 152 may illuminate and may remain illuminated in the first color as drive mechanism 160 advances cleaning tape 110 from first spool 130 onto second spool 140 such that the optical fiber face is wiped or cleaned by cleaning tape 110. Once the cleaning cycle is complete, indicator 152 may illuminate in a second color, such as green, to indicate to the user that the cleaning cycle is complete and that the optical fiber may be removed from optical fiber cleaning assembly 100.

In this way, illumination of indicator 152 in a first color may alert a user that the optical fiber is properly in contact with cleaning tape 110, which may help to ensure proper positioning of the optical fiber for cleaning. Further, illumination in the second color may help to allow user to easily determine the proper amount of time in which the optical fiber is to remain in contact with cleaning tape 110 to prevent the user from prematurely withdrawing the optical fiber from optical fiber cleaning assembly 100. In another aspect, indicator 152 can illuminate to indicate that cleaning tape 110 in window 115 was used and needs to be changed with an unused portion of cleaning tape 110. In this way, optical fiber cleaning assembly 100 may help to ensure that an unskilled user properly cleans optical fibers by eliminating the need for the user to guess how much pressure to apply and for how long the optical fiber is to remain connected.

In embodiments in which a system controls operation of cleaning assembly 100, the system may include an indicator and may be configured to provide indications to the user as discussed above. The system may be configured to provide more detailed information to the user and may include a display screen for use as an indicator which may output information relating to the cleaning operation.

Figure 6A:
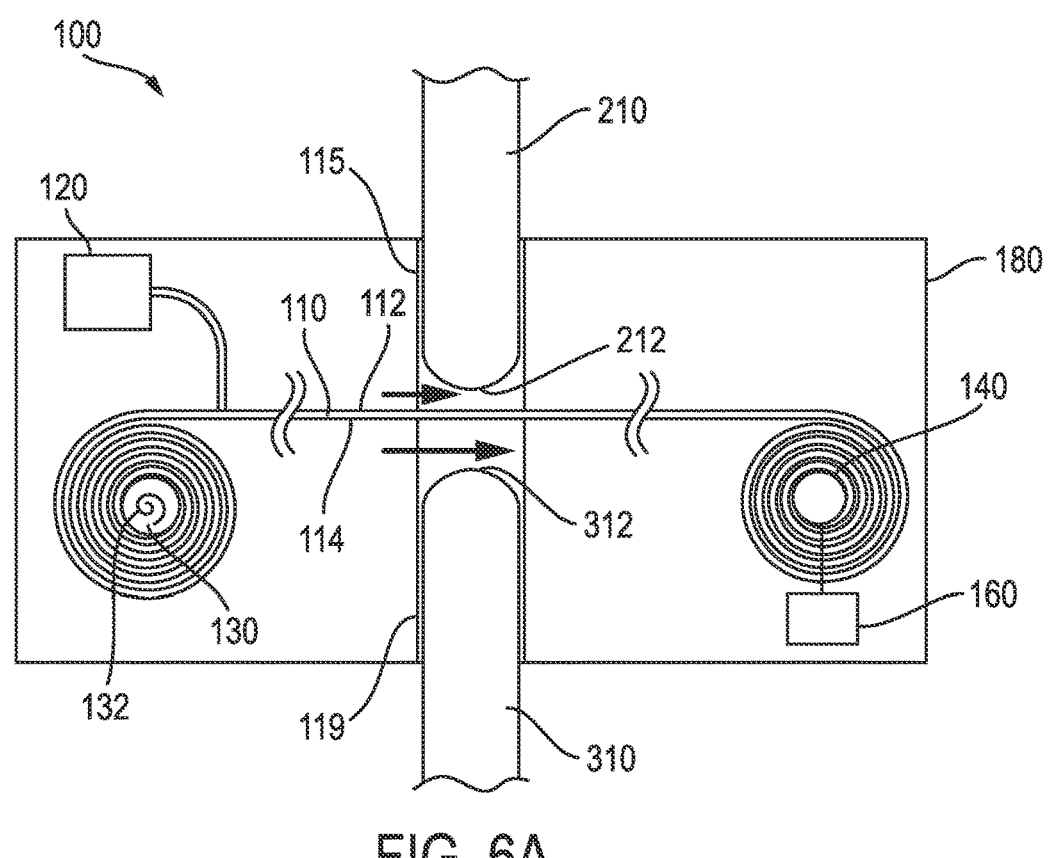
FIG. 6A shows a view of an optical fiber cleaning assembly for cleaning two optical fibers according to some embodiments.

FIG. 6A shows a view of an optical fiber cleaning assembly 100 for cleaning two optical fibers according to some embodiments. For example, optical fiber cleaning assembly 100 may be configured to clean two optical fibers simultaneously. A first optical fiber 210 and a second optical fiber 310 to be connected may be cleaned at the same time, and after cleaning both optical fibers, the optical fibers may be connected to one another. By cleaning two optical fibers simultaneously, the cleaning process may be accomplished more rapidly than cleaning each optical fiber separately, and may further help to conserve cleaning tape. Further, the first and second optical fibers may have different types of connectors, and thus the optical fiber cleaning assembly for cleaning two optical fibers simultaneously may facilitate alignment of the first and second optical fibers on the cleaning tape. However, it is understood that while optical fiber cleaning assembly 100 as shown in FIG. 6A may be used to clean two optical fibers 210, 310 simultaneously, optical fibers need not be cleaned simultaneously and may be cleaned one at a time. Further, a first optical fiber face may be cleaned using a first surface of the cleaning tape and a second optical fiber face may be cleaned subsequently using a second surface of the cleaning tape.

For example, a first optical fiber 210 may be disposed in a medical instrument, such as a catheter, among other instruments. A second optical fiber 310 may be part of a system configured to control operation of the medical instrument connected thereto. The system may also include, for example, a light source for sending light through the second optical fiber 310 and then through the first optical fiber 210 and an interrogator used to analyze reflected light signals. Optical fiber cleaning assembly 100 may be used to simultaneously clean first optical fiber 210 and second optical fiber 310 prior to connection of optical fibers 210, 310.

Optical fiber cleaning assembly 100 of FIG. 6A shares many similar features with embodiments of optical fiber cleaning assembly 100 used to clean a single optical fiber, and may include a housing 180 having a cleaning window 115 through which cleaning tape 110 passes. Optical fiber cleaning assembly 100 further includes a first spool 130 for storing a roll of cleaning tape 110 and a second spool 140 onto which used cleaning tape 110 is wound. Cleaning tape 110 may be impregnated with an index matching fluid 122 prior to or during the use of cleaning assembly 100 as discussed above. A drive mechanism 160, such as an electric motor, may drive first spool 130, second spool 140 or both spools in order to advance cleaning tape 110.

Figure 6B:
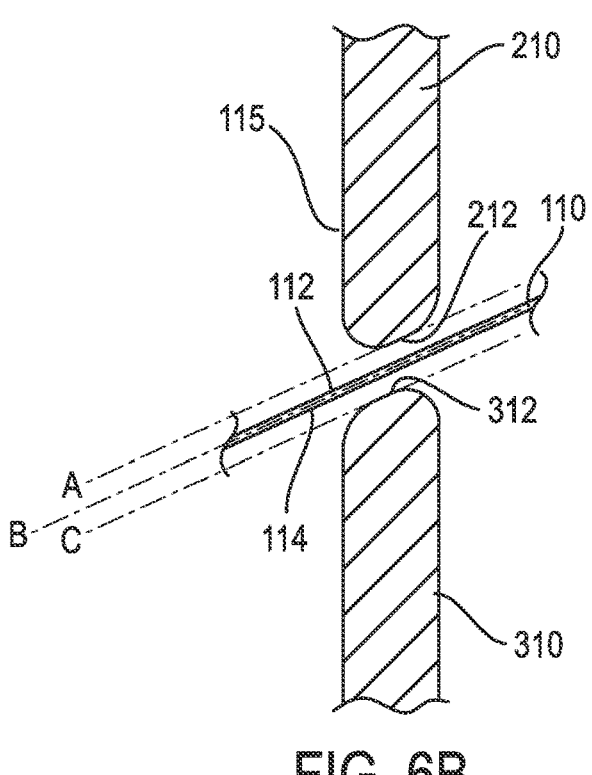
FIG. 6B shows a view of an optical fiber cleaning assembly for cleaning two optical fibers according to some embodiments.

Optical fiber cleaning assembly 100 of FIG. 6A differs from cleaning assembly 100 of FIG. 1 in that cleaning assembly 100 of FIG. 6A may further include a second cleaning window 119 on housing 180 for cleaning a second optical fiber 310. In some embodiments, first and second cleaning windows 115, 119 may be positioned on opposite sides of housing 180 and may be aligned along an axis. In this way, first optical fiber 210 can be positioned so as to contact first surface 112 of cleaning tape 110 and second optical fiber 310 can be positioned so as to contact second surface 114 of cleaning tape 110. Cleaning tape 110 may be arranged perpendicular to each of first optical fiber 210 and second optical fiber 310. With one or both optical fibers 210, 310 in contact with a surface 112, 114 of cleaning tape 110, cleaning tape 110 may be advanced from first spool 130 onto second spool 140. First optical fiber 210 may be wiped or cleaned by first surface 112 as first surface 112 moves across optical fiber 210, and second optical fiber 310 may be simultaneously cleaned by second surface 114 of cleaning tape 110 as second surface 114 moves across optical fiber 310. Cleaning tape 110 and its motion path may also be oriented parallel to an 8 (or other) degree angle polished face of a single optical fiber or the 8 degree faces of two optical fibers contacting opposite sides of cleaning tape 110 as shown for example in FIG. 6B. For example, first optical fiber 210 may have a face 212 arranged generally along axis A, and second optical fiber 310 may have a face 312 arranged generally along axis C. Axis A and C may be substantially parallel to one another. Further, cleaning tape 110 may extend between faces 212, 312 and may extend along an axis B that is parallel to axes A and C, such that first surface 112 of cleaning tape 110 contacts face 212 and second surface 114 contacts face 312.

Figure 7:
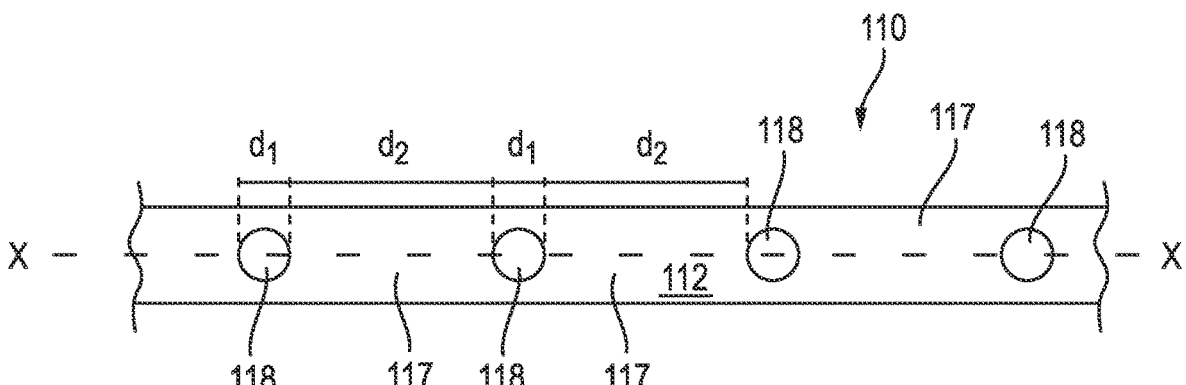
FIG. 7 shows a view of cleaning tape of an optical fiber cleaning assembly according to some embodiments.

FIG. 7 shows a view of cleaning tape 110 of an optical fiber cleaning assembly according to some embodiments. Cleaning tape 110 used in cleaning assembly 100 may include a plurality of apertures 118. Apertures 118 may be arranged along a longitudinal axis X of cleaning tape 110. In some embodiments, each aperture 118 may have a diameter $d_1$ that is the same as or greater than a diameter of an optical fiber 210, 310 (or cores thereof) to be cleaned in order to allow an optical fiber to pass through aperture 118. However, in some embodiments, apertures 118 may have a diameter that is less than a diameter of an optical fiber 210, 310 so that optical fiber is visible through aperture 118 but might not pass through aperture 118. In FIG. 7, each aperture 118 is shown as having a circular shape. However, apertures 118 may have any of various shapes, and may be shaped as an oval, ellipse, square, rectangle, or triangle, among other shapes. Apertures 118 may be spaced from one another along longitudinal axis X by a fixed distance $d_2$ measured along longitudinal axis X from an edge of a first aperture 118 to an edge of a second aperture 118. The length of cleaning tape 110 between apertures 118 may be referred to as a cleaning portion. A distance $d_2$ between apertures 118 may be greater than a diameter of each aperture $d_1$. In some embodiments, $d_2$ may be about 1 cm to about 10 cm, about 2 cm to about 8 cm, or about 4 cm to about 6 cm.

In operation, an optical fiber cleaning assembly 100 (e.g., the optical fiber cleaning assembly 100 of FIG. 6) may position a cleaning portion 117 of cleaning tape 110 at cleaning window 115 of housing 180. A face 212 of an optical fiber 210 may be brought into contact with a first surface 112 of cleaning portion 117 of cleaning tape 110. Face 312 of a second optical fiber 310 can also be brought into contact with a second surface 114 of cleaning tape 110. Drive mechanism 160 advances cleaning tape 110 by a fixed increment so as to wipe optical fibers 210, 310 with cleaning tape 110. The fixed increment may be selected so that when cleaning tape 110 is advanced, optical fibers 210, 310 are aligned with an aperture 118. With each optical fiber cleaned by cleaning tape 110, optical fibers 210, 310 may connect to one another through aperture 118 of cleaning tape 110. In this way, optical fibers 210, 310 may be automatically cleaned when connecting optical fibers 210, 310. If particulate matter is still present after advancing a first portion of cleaning tape 110, a second portion of cleaning tape 110 may be advanced to perform an additional cleaning step prior to connecting optical fibers 210, 310 through aperture 118 of cleaning tape 110.

Figure 8:
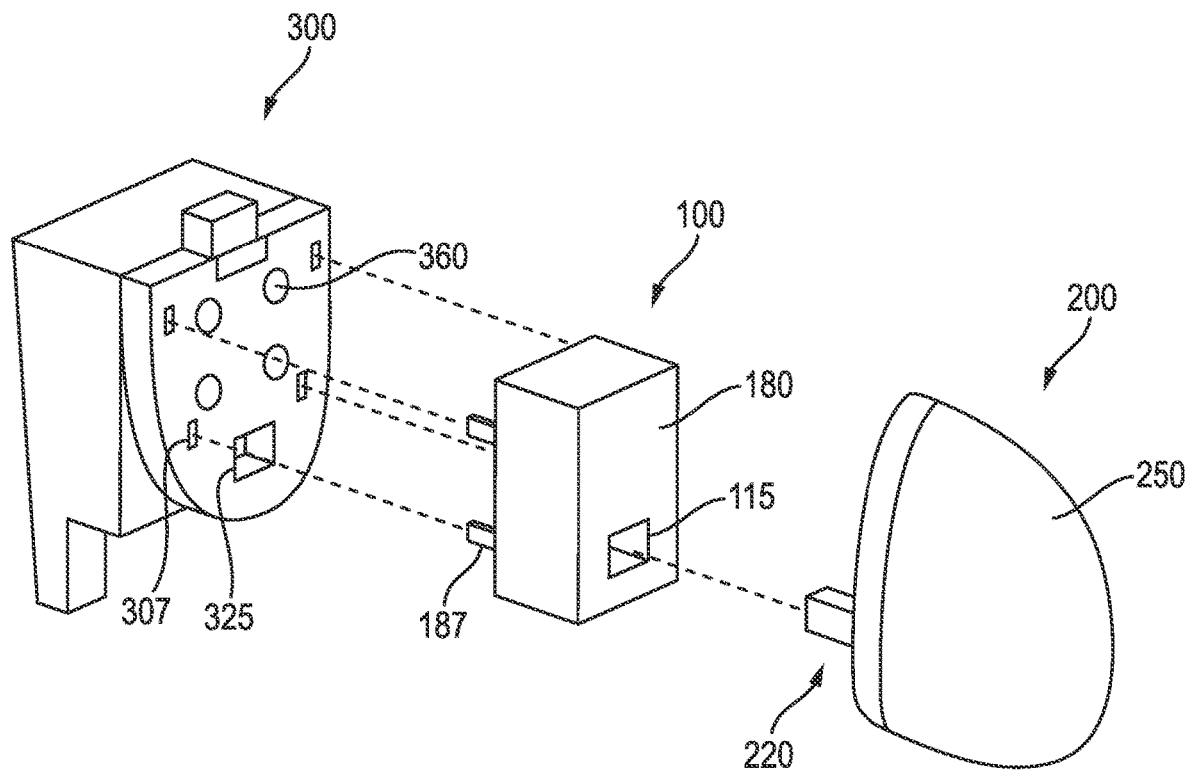
FIG. 8 shows a perspective view of an optical fiber cleaning assembly as positioned for cleaning optical fibers according to some embodiments.

FIG. 8 shows a perspective view of an optical fiber cleaning assembly as positioned for cleaning optical fibers according to some embodiments. A device 200 may be a medical instrument having a housing 250 and an elongate device extending from the housing (not shown). The device 200 may have an optical fiber (not shown) and an optical fiber connector 220 configured to connect the optical fiber of the device 200 to an optical fiber of a system 300. The system 300 may include a socket 325, and the optical fiber of the system 300 may be positioned within the socket 325. The socket 325 may be configured to receive the optical fiber connector 220 of device 200 to connect the optical fiber of device 200 to the optical fiber of system 300. Various examples of the device 200 and system 300 are described in PCT application PCT/US2019/054718 (filed Oct. 4, 2019 and titled "Systems and Methods for Positioning Medical instruments") and PCT application PCT/US2019/031823 (filed May 10, 2019 and titled "Backend Mechanism of a Catheter Control System"), which are both incorporated by reference herein in their entireties.

Optical fiber cleaning assembly 100 may be formed as an independent device, separate from device 200 or system 300 having the optical fibers (e.g., optical fiber 210 and optical fiber 310) to be cleaned. Optical fiber cleaning assembly 100 may be stowed on a chassis 320 of the system 300, or on a cart of system 300 for access by users. Optical fiber cleaning assembly 100 may be temporarily engaged with system 300 to clean system optical fiber 310 and/or temporarily engaged with device 200 to clean device optical fiber 210. After cleaning the faces of the optical fiber(s), cleaning assembly 100 may be removed prior to connecting device 200 to system 300 in order to connect optical fibers 210, 310. As cleaning assembly 100 may be a separate component, cleaning assembly 100 can be removed and replaced as necessary, and various cleaning assemblies 100 may be used to clean optical fibers 210, 310. When configured as a separate device, optical fiber cleaning assembly 100 may be used to clean a single optical fiber at a time, or multiple optical fibers simultaneously, as discussed herein. In some embodiments, after a cleaning operation is complete, optical fiber cleaning assembly 100 may be configured to accept a device 300, such as a medical instrument, and thus allow connection of an optical fiber 210 of the device 200 with an optical fiber 310 of system 300.

Housing 180 of optical fiber cleaning assembly 100 may be configured to be removably secured to the device 200 and/or system 300 when cleaning the optical fiber 210 of device 200 or the optical fiber 310 of system 300. In embodiments in which optical fiber cleaning assembly 100 is configured to clean two fibers simultaneously, optical fiber cleaning assembly 100 may be removably secured to the device 200, system 300, or both. Housing 180 may include an adapter to receive the optical fiber connector 220 of the device 200, and may further include an adapter for insertion into the socket 325 of the system 300 in which an optical fiber 310 is located. In this way, the optical fiber cleaning assembly 100 may be shaped so as to connect with each of the device 200 and system 300 to clean both optical fibers 210, 310.

To facilitate connection of optical fiber cleaning assembly 100 and a device or system having an optical fiber face to be cleaned, housing 180 of optical fiber cleaning assembly 100 may include one or more connectors 187 configured to connect optical fiber cleaning assembly 100 to a device 200 or system 300. Connectors 187 may be formed as protrusions extending from housing 180, and may be formed, for example, as a post or hook. In some embodiments, connectors 187 may be configured to mate with connectors 307 of system 300 or device 200. Connectors 187, 307 may be male and female connectors, and may mate by interference fit, press fit, snap fit, among other removable connections. Connectors 187 of housing 180 may align with connectors 307 of system 300 (or device 200) when optical fiber cleaning assembly 100 is positioned for cleaning optical fiber 310 of system 300 (or optical fiber 210 of device 200).

The system 300 may include one or more drive mechanisms 360. For example, each drive mechanism 360 may include a motor and a rotating disk, and the rotating disk may mate with a corresponding capstan of the device 200 (not shown) when the system 300 is connected to the device 200. Rotation of the drive mechanism 360 causes the corresponding capstan of the device 200 to rotate, and rotation of the capstan may be used to drive a wire wrapped around the capstan to articulate an elongate flexible portion of the device 200 (not shown), for example. Various examples of different drive mechanisms are further described in PCT application PCT/US2019/054718 (filed Oct. 4, 2019 and titled "Systems and Methods for Positioning Medical instruments") and PCT application PCT/US2019/031823 (filed May 10, 2019 and titled "Backend Mechanism of a Catheter Control System").

In embodiments in which optical fiber cleaning assembly 100 is removably securable to a device 200 or system 300, the drive mechanism 360 of the system 300 may be configured to advance cleaning tape 110 of optical fiber cleaning assembly 100, such as by driving first spool 130 or second spool 140 of optical fiber cleaning assembly 100. In this way, optical fiber cleaning assembly 100 need not have its own drive mechanism for advancing the cleaning tape. Instead, spools 130, 140 can be rotated by connection to a drive mechanism 360 of a system 300 or a device 200 to which optical fiber cleaning assembly 100 is connected.

In some embodiments, optical fiber cleaning assembly 100 may be integrally formed with a system 300 having a system optical fiber connector. In such embodiments, a separate optical fiber cleaning assembly 100 is not required to clean a first optical fiber and a second optical fiber. By incorporating an optical fiber cleaning assembly 100 (or portions thereof) into system 300, optical fibers may be cleaned prior to connection of the optical fibers. Further, such embodiments provide convenience for the user and enforce cleaning of optical fibers within the controlled system workflow, as the user is not required to carry or make available a separate optical fiber cleaning assembly.

Figure 9:
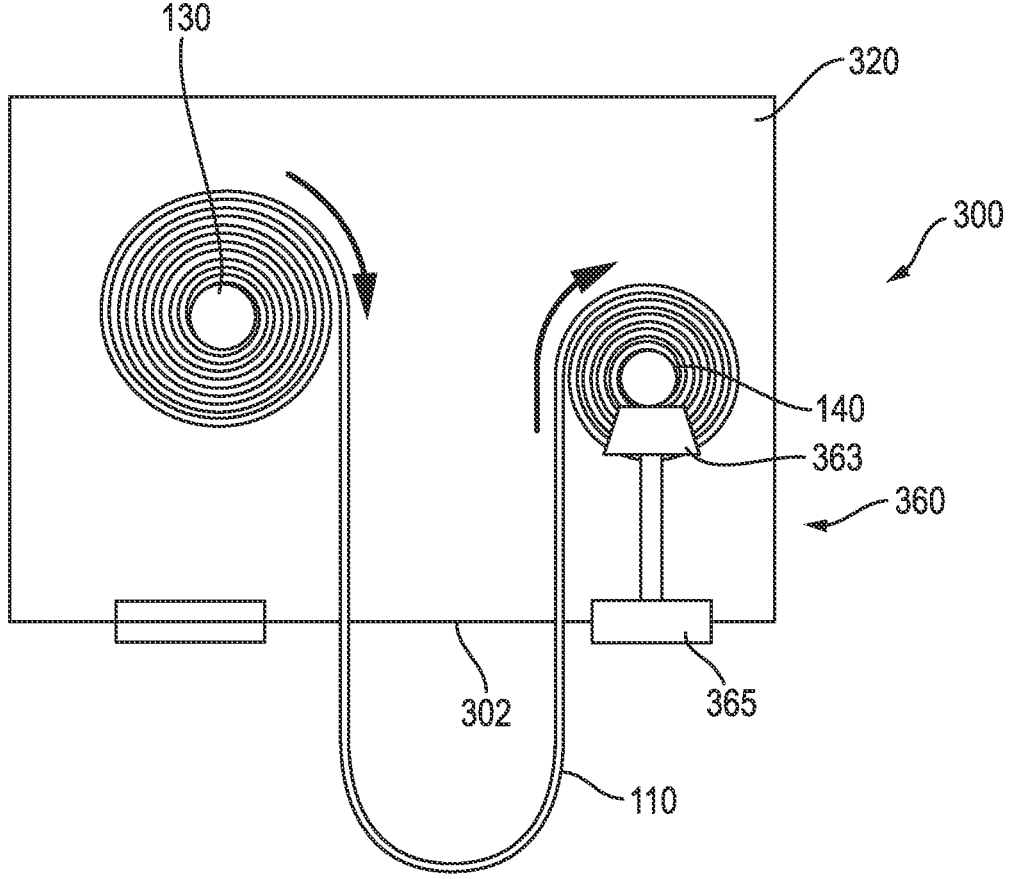
FIG. 9 shows a top down transparent view of a system having an integrated optical fiber cleaning assembly according to some embodiments.

Referring to FIG. 9, cleaning tape 110 may be wound on a first spool 130 and may be drawn from first spool 130 to a second spool 140. Each spool 130, 140 may be contained within system 300, such as within a chassis 320 of system 300. A drive mechanism 360 of system 300 may drive one or both of first spool 130 and second spool 140 to advance cleaning tape 110 from first spool 130 to second spool 140. The drive mechanism 360 may include a motor for driving first spool 130 or second spool 140 to advance cleaning tape 110. In some embodiments, drive mechanism 360 may include a rotating disk 365 of system 300, and rotating disk 365 may be rotated by a motor of the drive mechanism 360 to cause first spool 130 or second spool 140 to rotate and advance cleaning tape 110. In some embodiments, drive mechanism 360 may include a bevel gear 363 for selectively transferring motion of a motor of system 300 to first or second spool 130, 140 of optical fiber cleaning assembly 100. For example, the axis of a drive shaft of the drive mechanism 360 may be at offset from the axis of the second spool 140 by 90 degrees (or another angle). The second spool 140 may include a second bevel gear (not shown) that engages with the bevel gear 363 of the drive mechanism 360 for the drive mechanism 360 to rotate the second spool 140.

Figure 10:
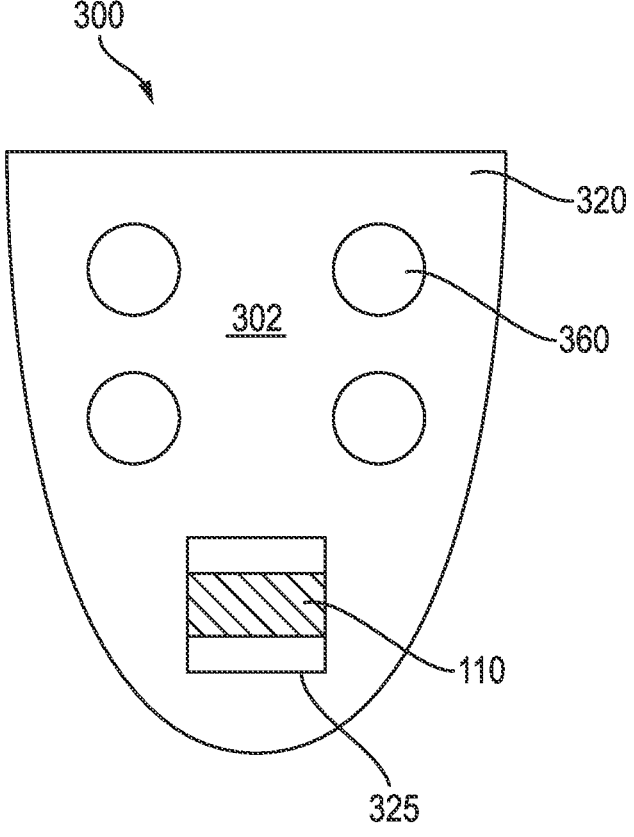
FIG. 10 shows a front view of the system of FIG. 9.

FIG. 10 shows a simplified front view of the system 300. Cleaning tape 110 can extend across a socket 325 (e.g., a cleaning window) containing a system optical fiber. Cleaning tape 110 may be positioned within socket 325 in front of the system optical fiber so as to cover and contact a face of the system optical fiber (see e.g., FIG. 13). Socket 325 may be arranged on a front surface 302 of system 300. Socket 325 may be shaped so as to receive and engage with an optical fiber connector of a device (e.g., device 200) to connect the system optical fiber to a device optical fiber. Front surface 302 of system 300 may further include one or more drive mechanisms 360 configured to control movement (e.g., articulation) of a device connected to system 300.

Figure 11:
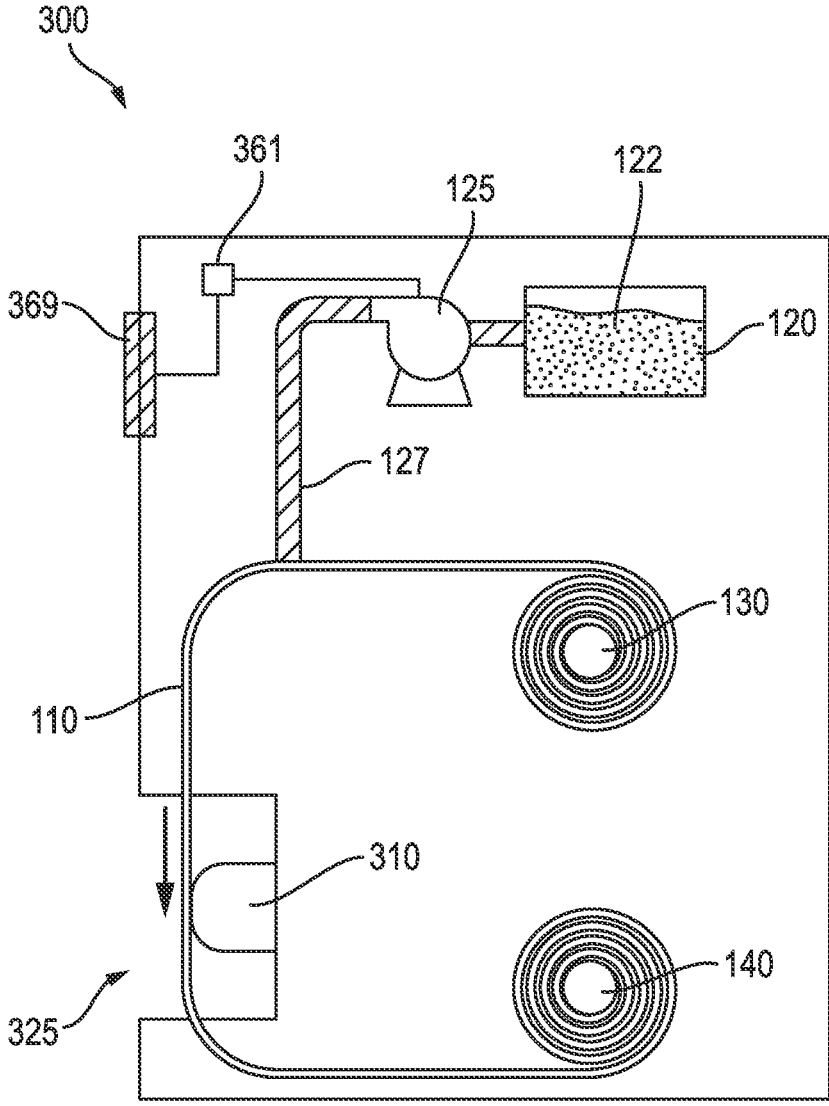
FIG. 11 shows a side transparent view of the system of FIG. 9.

As shown in FIG. 11, system 300 may include a reservoir 120 containing an index matching fluid 122. Reservoir 120 may be enclosed within chassis 320 of system 300 and located remotely from socket 325 across which cleaning tape 110 passes. Index matching fluid 122 may be provided to cleaning tape 110 via a conduit 127 as cleaning tape 110 moves from first spool 130 onto second spool 140. Further, a pump 125 may be used to supply index matching fluid 122 from reservoir 120 to cleaning tape 110, such as prior to use of cleaning tape 110 to clean an optical fiber. Pump 125 may be a peristaltic pump, which may help to prevent index matching fluid 122 from becoming contaminated by particles from pump 125 or its lubricants. In some embodiments, pump 125 may be a positive displacement pump, such as a piston pump. In some embodiments, pump 125 may be actuated by a motor 361 of system 300, such as a motor 361 used to drive rotating disks of system 300, such as rotating disk 369. Additionally or in the alternative, pump 125 may be manually actuated by a user during the cleaning process.

Figure 12:
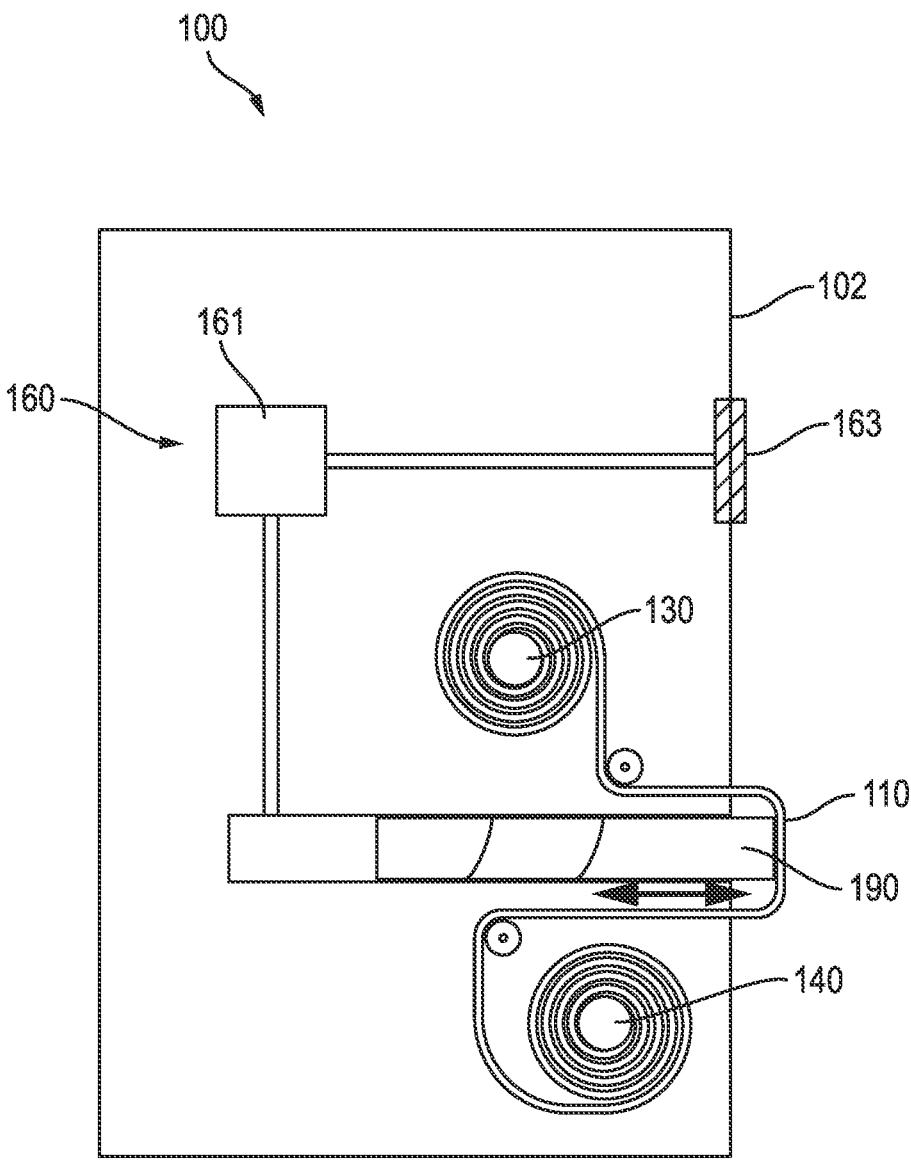
FIG. 12 shows an optical fiber cleaning assembly having an extendable member according to some embodiments.

In some embodiments, an optical fiber cleaning assembly 100 may further include an extendable member 190, as shown for example in FIG. 12. Extendable member 190 may be configured to adjust the position of cleaning tape 110 and facilitate cleaning of a system optical fiber positioned within a socket of the system. Cleaning tape 110 may extend from a first spool 130 onto a second spool 140 and may cover a portion of extendable member 190. Extendable member 190 may be driven by a drive mechanism 160. Drive mechanism 160 may include a motor 161 that may cause extension and retraction of extendable member 190 and may also rotate rotatable disks 163 of optical fiber cleaning assembly 100. Drive mechanism 160 may additionally or alternatively be used to move cleaning tape 110 from first spool 130 onto second spool 140. In some embodiments, extendable member 190 may be driven by rotatable disk 163 which in turn is rotated by a rotating disk and/or drive mechanism of a system (e.g., system 300) to which optical fiber cleaning assembly 100 is engaged. In this way, optical fiber cleaning assembly 100 need not have its own motor. Thus, the drive mechanism of the system may be used to rotate one or more rotatable disks 163 of optical fiber cleaning assembly 100, which in turn may cause cleaning tape 110 to move from first spool 130 onto second spool 140. In examples where optical fiber cleaning assembly 100 includes an extendable member 190, the drive mechanism of the system may be used to rotate one or more rotatable disks 163 and cause extendable member 190 to extend outward during a cleaning operation or retract inward when an optical fiber is not being cleaned. Extendable member 190 may retract inward and extend outward from optical fiber cleaning assembly 100, such as from a front surface 102 of optical fiber cleaning assembly 100 via a screw-drive. Extendable member 190 may be retracted into optical fiber cleaning assembly 100 when not in use to inhibit contamination of cleaning tape 110, or may extend beyond a front surface 102 of optical fiber cleaning assembly 100 when used for cleaning an optical fiber.

Figure 13:
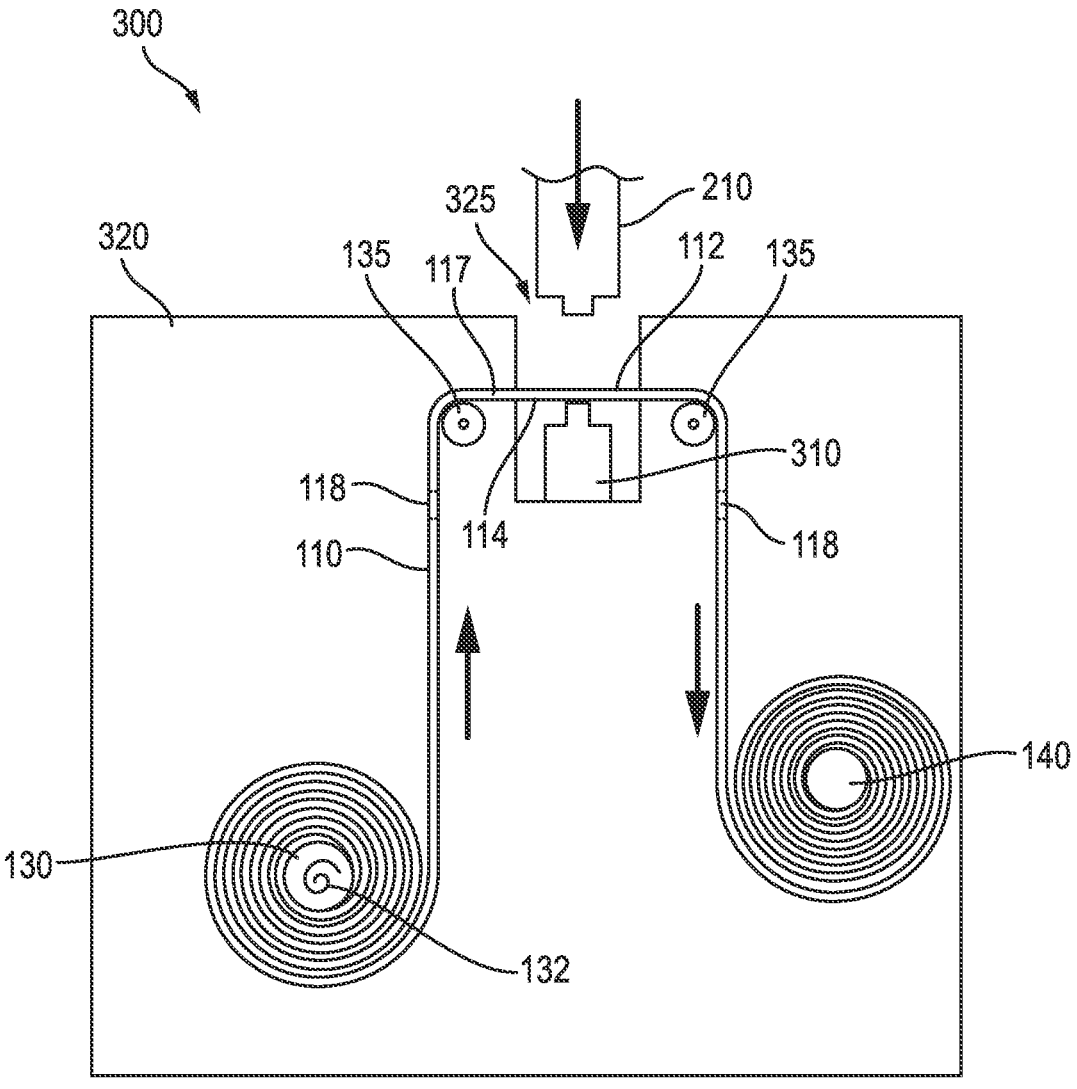
FIG. 13 shows a diagram of components of a system having an integrated optical fiber cleaning assembly according to some embodiments.

As shown in FIG. 13, a system including a system optical fiber 310 may be configured to allow system optical fiber 310 to connect to a device optical fiber 210 through cleaning tape 110. As discussed above, cleaning assembly 100 of system 300 may include a cleaning tape 110 wound on a first spool 130 and drawn from first spool 130 to second spool 140. First spool 130 may include a biasing mechanism 132 for maintaining cleaning tape 110 under tension. Guide members 135, such as rollers or pulleys may help to position cleaning tape 110 across a cleaning window (or socket 325) and maintain cleaning tape 110 under tension. A portion of system optical fiber 310 may be arranged within socket 325, and a face of system optical fiber 310 may be in contact with cleaning tape 110 such that cleaning tape 110 may wipe the face of system optical fiber.

Cleaning tape 110 may include apertures 118 (see, e.g., FIG. 7), so that connection of system optical fiber 310 and device optical fiber 210 may be made through cleaning tape 110 when an aperture 118 of cleaning tape 110 is aligned with optical fibers 210, 310. Thus, when cleaning tape 110 is advanced, a surface of cleaning tape 110 may wipe a face of a system optical fiber 310, and an opposing surface of cleaning tape 110 may simultaneously wipe a face of a device optical fiber 210. In this way, device and system optical fibers 210, 310 may be cleaned at the same time, and can be connected when aligned with an aperture 118 of cleaning tape 110. When optical fibers 210, 310 are subsequently disconnected, cleaning tape 110 may be advanced so that a cleaning portion 117 of cleaning tape 110 (see e.g., FIG. 7) covers a face of system optical fiber 310 in order to prevent particulate matter from accumulating on the face of system optical fiber 310 between optical fiber connections.

Figure 14:
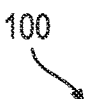
FIG. 14 shows a schematic diagram of components of an optical fiber cleaning assembly according to some embodiments.

FIG. 14 shows a schematic diagram of components of an optical fiber cleaning assembly 100 according to some embodiments. Optical fiber cleaning assembly 100 may be configured to detect particulate matter on a face of an optical fiber. For example, an optical sensor 170 is configured to detect particulate matter on a face of an optical fiber. Optical sensor 170 may be in communication with a control unit 150, and control unit 150 may receive information from optical sensor 170 and use the information to determine if particulate matter is present on a face of an optical fiber. Control unit 150 may further be in communication with an indicator 152 to provide an indication that particulate matter is detected by optical sensor 170. In some embodiments, indicator 152 may be used to indicate to a user whether an amount of cleaning tape or index matching fluid of optical fiber cleaning assembly 100 needs to be replaced as determined by a cleaning tape sensor 157 and an index matching fluid sensor 158, respectively. In embodiments where optical fiber cleaning assembly 100 is integrated into a system (e.g., system 300), control unit 150 may be configured to actuate a drive mechanism 160 to cause a barrier 192 to move from a retracted position to a closed position in order to prevent connection of a contaminated optical fiber (e.g., a system fiber) with another optical fiber (e.g., a device fiber). Examples of the barrier 192 will be described in further detail below with reference to FIG. 15.

Optical sensor 170 may be positioned, for example, at a cleaning window of optical fiber cleaning assembly 100 to detect particulate matter when an optical fiber is positioned adjacent the cleaning window of optical fiber cleaning assembly 100. Optical sensor 170 may capture an image of a face of an optical fiber, and control unit 150 may compare the captured image to a baseline image of a clean face of an optical fiber. Alternatively, optical sensor 170 may detect the outline of an object or dark regions on an optical fiber face, indicative of the presence of particulate matter. Control unit 150 may further be programmed to recognize patterns or shapes corresponding to particulate matter. Optical sensor 170 may be arranged within socket 325, and may be arranged adjacent opening of socket 325. Thus, when an optical fiber is positioned for insertion into socket 325, optical sensor 170 may detect the presence of particulate matter. If particulate matter is detected, the optical fiber can be inserted into socket 325 for cleaning, and when optical fiber is removed, optical sensor 170 may again detect whether particulate matter is present.

In some embodiments, particulate matter may be detected by the use of optical signals from the optical fibers to be connected (e.g., device optical fiber 210 and system optical fiber 310). As particulate matter blocks light and may cause reflections, optical signals sent through an optical fiber may be used to determine the presence of particulate matter on a face of the optical fiber. Optical signals can be used to detect a poor connection by measuring return loss, insertion loss, and/or reflection at each connection from an interrogator of the system, such as a multi-core fiber interrogator. Particulate matter may also be detected by determining the registration quality for the sensor cores in an optical fiber connection. For example, in embodiments in which optical fiber cleaning assembly 100 is integrally formed with a system 300 having a system optical fiber 310, light signals may be generated and transmitted through system optical fiber 310, and the interrogator may detect transmission issues, e.g., insertion loss or reflection, indicating that particulate matter is present on system optical fiber 310 and/or device optical fiber 210 (e.g., if device optical fiber 210 is connected to system optical fiber 310).

Optical fiber cleaning assembly 100 may further include an indicator 152 configured to provide an indication that an optical fiber face has particulate matter thereon, or conversely that optical fiber face is free of particulate matter or otherwise clean. As explained above, indicator 152 may include an indicator light, such as one or more light emitting diodes (LEDs). Indicator 152 may be arranged on housing 180 so that indicator 152 is visible to a user of optical fiber cleaning assembly 100 (see e.g., FIG. 1). Indicator 152 may be configured to illuminate when particulate matter is detected (or when optical fiber face is clean) in order to inform the user whether further cleaning is required. Indicator 152 may illuminate or flash, or may illuminate in a particular color in order to alert the user. For example, indicator 152 may illuminate in a first color, such as red, when particulate matter is detected, and may illuminate in a second color, such as green, when particulate matter is not detected (indicating that the optical fiber is clean). This may help the user to easily determine whether further cleaning is required, or if optical fiber faces are sufficiently clean.

Alternatively or additionally, indicator 152 may include an audio unit, such as a speaker, configured to emit or play an audible tone or alert to indicate that an optical fiber is clean (or conversely that the optical fiber is dirty). For example, indicator 152 may play a first sound to indicate that an optical fiber is clean, e.g., a chime or a bell, and may play a second sound to indicate that an optical fiber is dirty, e.g., a buzzer or alarm. Thus, indicator 152 may prompt a user to further clean an optical fiber prior to connecting the optical fiber in order to prevent damage or contamination of optical fibers, and to ensure a good connection of the optical fibers. In another embodiment, indicator 152 may simply change color (e.g. from red to green) when an initial connector cleaning cycle has been completed without a test for contamination or signal degradation. In some embodiments, system 300, rather than cleaning assembly 100, may include an indicator 152 for indicating a status of the optical fiber cleaning operation.

In some embodiments, optical fiber cleaning assembly 100 may be configured to determine when replacement of cleaning tape 110 or index matching fluid 122 is needed. For example, control unit 150 may store information relating to the number of cleaning cycles that can be performed using a roll of cleaning tape. Further, control unit 150 may count each time a cleaning cycle is performed. When a number of cleaning cycles performed using a roll of cleaning tape approaches a maximum number of cleaning cycles that can be performed using the roll of cleaning tape, control unit 150 may cause an indicator 152, such as an indicator light, to provide an indication alerting a user that the cleaning tape should be replaced. For example, if cleaning tape has a total length of 500 cm, and each cleaning cycle uses 5 cm of cleaning tape, a total of 100 cleaning cycles may be performed using the roll of cleaning tape. Control unit 150 may be configured to cause indicator 152 to illuminate when 5 cleaning cycles remain to indicate to the user that the cleaning tape will soon need to be replaced. Alternatively, a cleaning tape sensor 157 may detect the amount of cleaning tape present on first spool 130 or second spool 140. When an amount of cleaning tape on first spool 130 reaches a predetermined minimum level, or the amount of cleaning tape on second spool 140 reaches a predetermined maximum level, indicator 152 may provide an indication to user that the cleaning tape needs to be replaced. For example, cleaning tape sensor 157 may detect a diameter of a roll of cleaning tape on the first spool 130 or the second spool 140 to determine when the amount of cleaning tape is low.

Further, control unit 150 may track a number of cleaning cycles performed using optical fiber cleaning assembly 100. When a predetermined number of cleaning cycles have been performed (e.g., 20 cleaning cycles), indicator 152 may provide an indication that the index matching fluid needs to be replaced or replenished. Additionally or alternatively, an index matching fluid sensor 158 may detect the amount of index matching fluid within an index matching fluid reservoir. As the index matching fluid is applied to the cleaning tape, the index matching fluid may be consumed during use of the optical fiber cleaning assembly. When a level of index matching fluid within the reservoir reaches a predetermined minimum amount (e.g., as determined by index matching fluid sensor 158), control unit 150 may cause indicator 152 to provide an indication to the user that the index matching fluid needs to be replaced.

In some embodiments, an indicator 152 may be a light that illuminates in a first color if the cleaning tape needs to be replaced and illuminate in a second color if the index matching fluid needs to be replaced. In some embodiments, separate indicators 152 may be used for each of the cleaning tape and index matching fluid.

Figure 15:
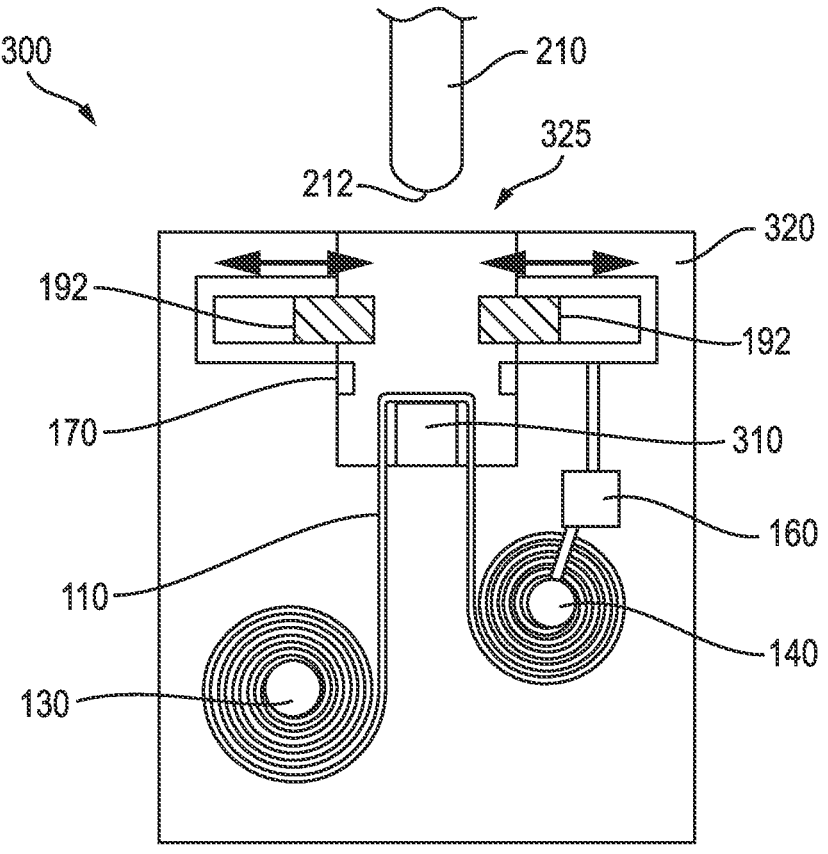
FIG. 15 shows a diagram of an optical fiber cleaning assembly having a barrier according to some embodiments.

FIG. 15 shows a diagram of an optical fiber cleaning assembly having a barrier according to some embodiments. Where an optical fiber cleaning assembly is integrally formed as part of a system 300 having a system optical fiber 310, the optical fiber cleaning assembly may further include a barrier 192. Barrier 192 may be configured to prevent connection of system optical fiber 310 and device optical fiber 210 if a presence of particulate matter is detected on the system optical fiber 310 and/or the device optical fiber 210. In this way, the user may be prevented from contaminating one of the optical fibers by contacting the optical fiber with the optical fiber having particulate matter.

Barrier 192 may be positioned (e.g., recessed) within socket 325 (or a cleaning window) of chassis 320 of system 300. Barrier 192 is movable from a retracted position in which an optical fiber 210 may contact system optical fiber 310, and a blocking (e.g., closed) position in which barrier 192 extends across the socket 325 to prevent an optical fiber 210 from advancing toward and contacting system optical fiber 310. For example, barrier 192 may include a movable gate that, when closed, prevents an optical fiber 210 from contacting optical fiber 310. In a blocking position that prevents optical fibers 210 and 310 from making a connection, barrier 192 may be completely closed or may have a small opening to allow a face 212 of optical fiber 210 to be visible to optical sensors 170 for detecting the presence of particulate matter on face 212.

After a determination that optical sensor 170 does not detect particulate matter, barrier 192 may be configured to remain open for a predetermined period of time. The predetermined period of time may be, for example, 30 seconds, 60 seconds, or another period of time. After the period of time has passed, barrier 192 may move into the blocking position to prevent connection of the optical fibers 210, 310.

After the optical fibers 210 and/or 310 are cleaned, optical fiber 210 may be partially withdrawn and/or optical fiber 310 may be partially retracted to separate optical fiber 210 and/or optical fiber 310 from cleaning tape 110. After the optical fibers are separated, the optical sensor 170 may be used to detect whether there is particulate matter on the face of either of the optical fibers. If particulate matter is detected by optical sensor 170, the user may repeat the cleaning process one or more times until optical sensor 170 determines that no particulate matter is present on the faces of the optical fibers.

Other embodiments of the system 300 or cleaning assembly 100 described herein may similarly include a barrier 192 in order to prevent connection of contaminated optical fibers. For example, a cleaning assembly 100 configured to receive two optical fibers and to allow connection of the same within cleaning assembly 100 may include a barrier to prevent connection of the optical fibers until it is confirmed that the optical fiber faces are free of particulate matter.

Figure 16:
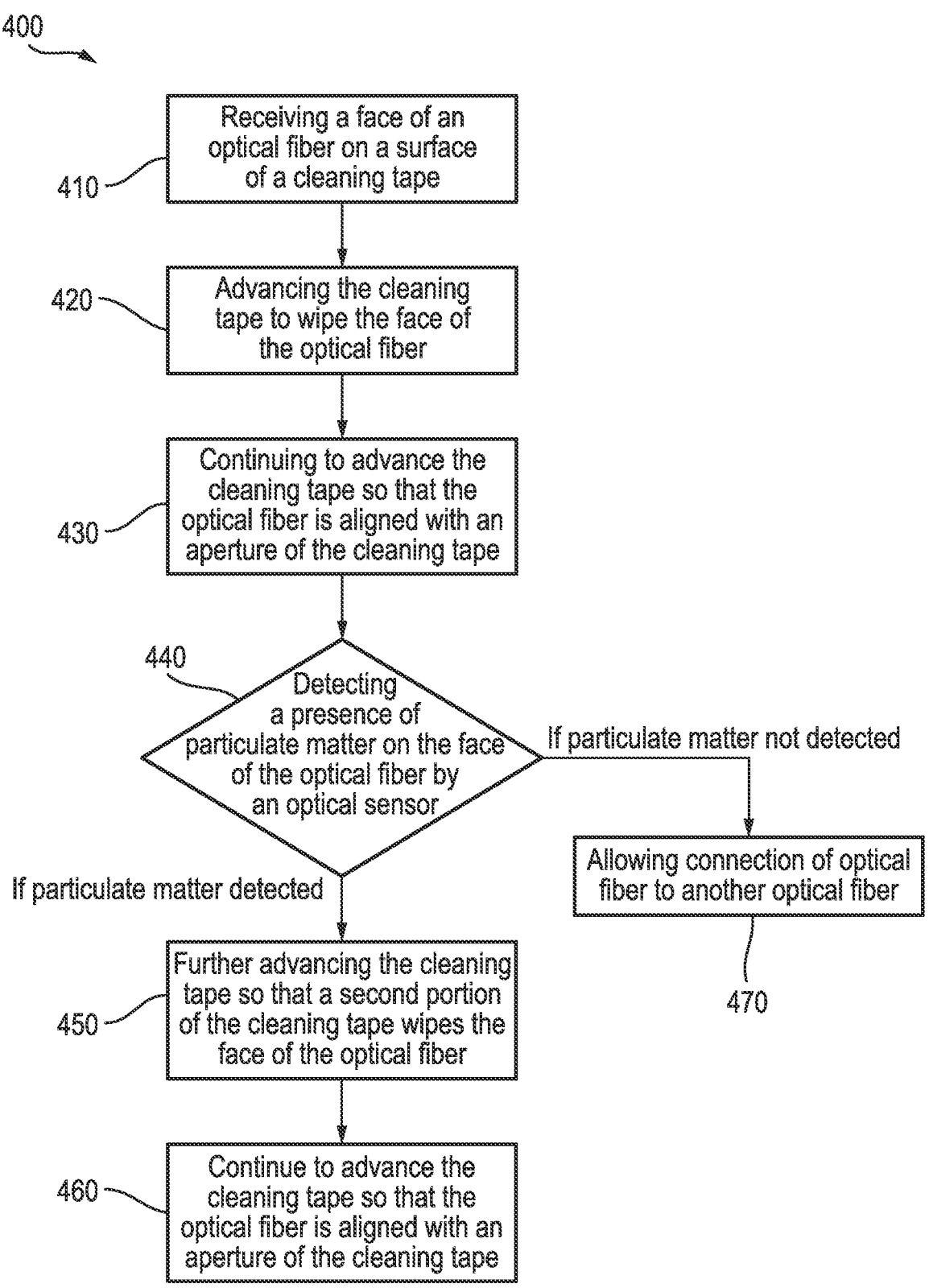
FIG. 16 shows an illustrative method of cleaning an optical fiber according to some embodiments.

An example method 400 of cleaning optical fibers is shown at FIG. 16. Optical fibers may be cleaned using an optical fiber cleaning assembly as described herein. In operation 410, a cleaning portion of a cleaning tape may contact a face of an optical fiber. In some embodiments, the optical fiber may be arranged perpendicularly to the cleaning tape. In operation 420, the cleaning tape may be advanced such that the cleaning tape moves across the face of the optical fiber to wipe the face of the optical fiber. The wiping motion may help to remove particulate matter from the face of the optical fiber. As explained above, the cleaning tape may be impregnated with an index matching fluid, and the index matching fluid may help to release particulate matter from the face of the optical fiber. A coating of the index matching fluid may also be applied to the face of the optical fiber. In operation 430, the cleaning tape may be advanced until an aperture of the cleaning tape is aligned with the face of the optical fiber. The face of the optical fiber may be visible to an optical sensor through the aperture. In operation 440, an optical sensor may be used to detect a presence or absence of particulate matter on the face of the optical fiber. If particulate matter is detected after wiping the face of the optical fiber, in operation 450, the cleaning tape may be advanced so that a second cleaning portion of the cleaning tape wipes the face of the optical fiber. In operation 460, the cleaning tape may continue to be advanced so as to align a second aperture with the face of the optical fiber. Operation 440 may be repeated again so that the optical sensor may again detect the presence or absence of particulate matter on the face of the optical fiber. This process may be repeated until it is determined that the optical fiber is free of particulate matter. In operation 470, if optical fiber is free of particulate matter, optical fiber may be connected to another optical fiber. Depending on the embodiment, a barrier preventing connection of the contaminated optical fiber may be opened or retracted to allow connection of the cleaned optical fibers. Further, an indicator may provide an indication to a user (e.g., a color change) that the optical fiber has been cleaned and is free of particulate matter.

Figure 17:
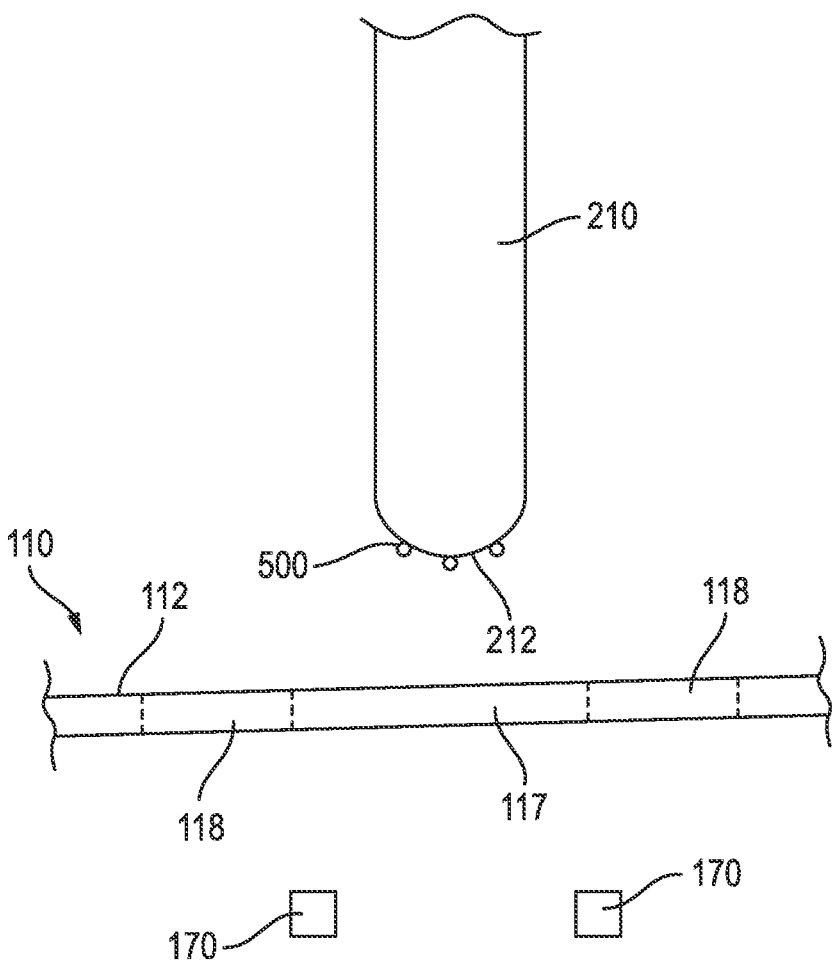
FIG. 17 shows a partial view of an optical fiber positioned for cleaning by a cleaning tape according to some embodiments.
Figure 18:
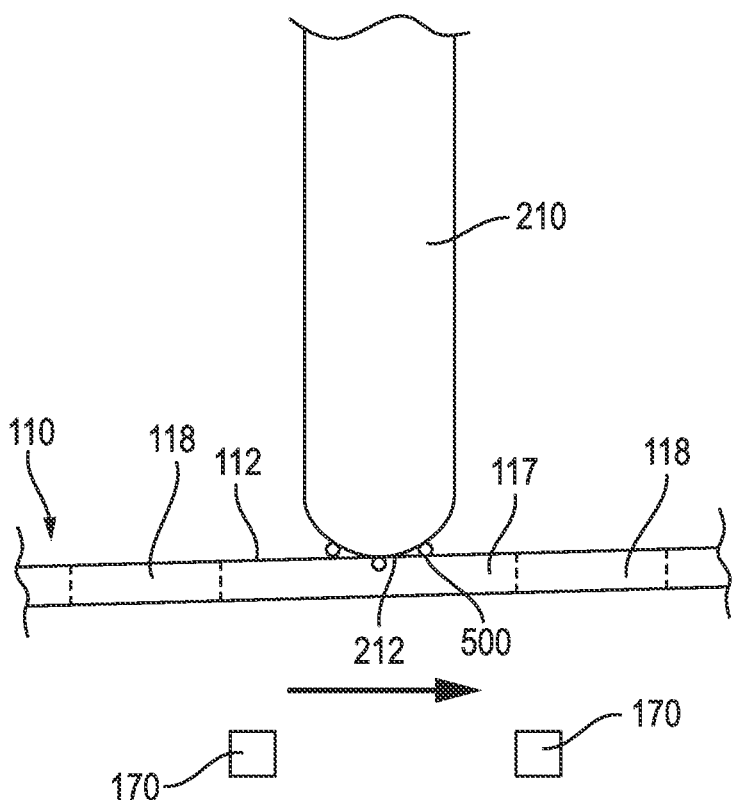
FIG. 18 shows a partial view of an optical fiber in contact with the cleaning tape of FIG. 17.
Figure 19:
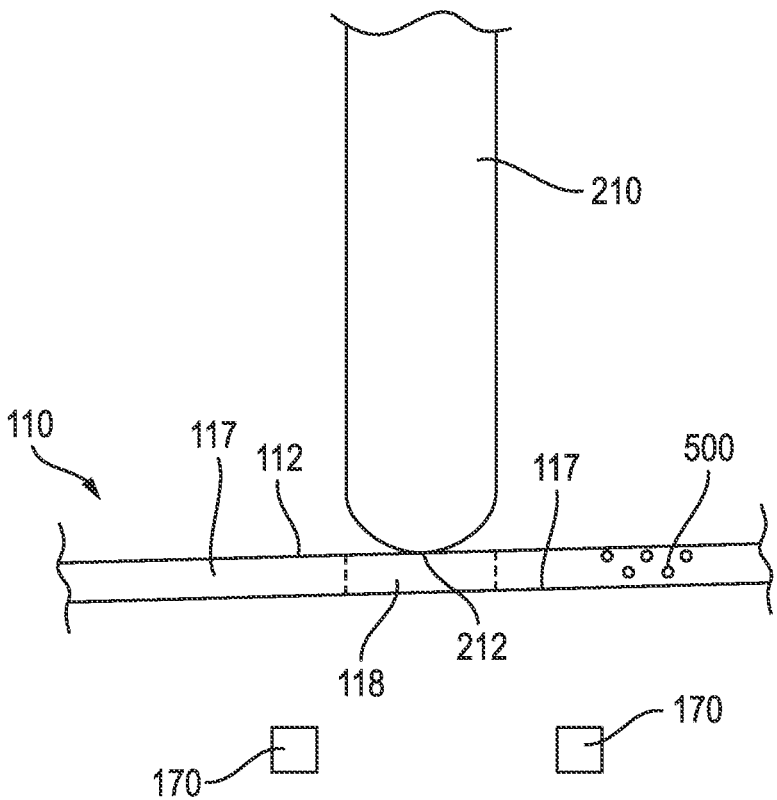
FIG. 19 shows a partial view of an optical fiber aligned with an aperture of the cleaning tape of FIG. 17.

FIGS. 17-19 illustrate an example method of cleaning an optical fiber. FIGS. 17-19 will be described for cleaning a device optical fiber 210, but the method shown in FIGS. 17-19 may also be used to clean a system optical fiber 310. As shown in FIG. 17, an optical fiber 210 to be cleaned may include particulate matter 500 on a face 212 of optical fiber 210. The face 212 of optical fiber 210 may be brought into contact with a cleaning portion 117 of cleaning tape 110, e.g., a portion of cleaning tape 110 between two apertures 118. Optical sensors 170 may be arranged on an opposing side of surface 112 of cleaning tape 110 such that face 212 of optical fiber 210 might not be visible to optical sensors 170 when optical fiber 210 is in contact with cleaning portion 117 of cleaning tape 110.

As shown in FIG. 18, face 212 of optical fiber 210 may contact cleaning tape 110. After face 212 of optical fiber 210 contacts cleaning tape 110, cleaning tape 110 may be advanced to wipe face 212 of optical fiber 210, removing particulate matter 500 from optical fiber 210. Further, cleaning tape 110 may apply a coating of an index matching fluid to face 212 of optical fiber 210. Cleaning tape 110 may be advanced by a fixed increment so that after wiping face 212 of optical fiber 210, optical fiber 210 is aligned with an aperture 118 of cleaning tape 110, as shown in FIG. 19. With optical fiber 210 aligned with aperture 118, optical sensors 170 may detect whether there is particulate matter 500 on face 212 of optical fiber 210. If optical sensors 170 detect particulate matter 500 on face 212, the cleaning tape 110 may be further advanced to wipe face 212, and optical fiber 210 may be aligned with a next aperture 118. This process may be repeated until optical sensors 170 do not detect particulate matter 500 on face 212 of optical fiber 210.

Figure 20:
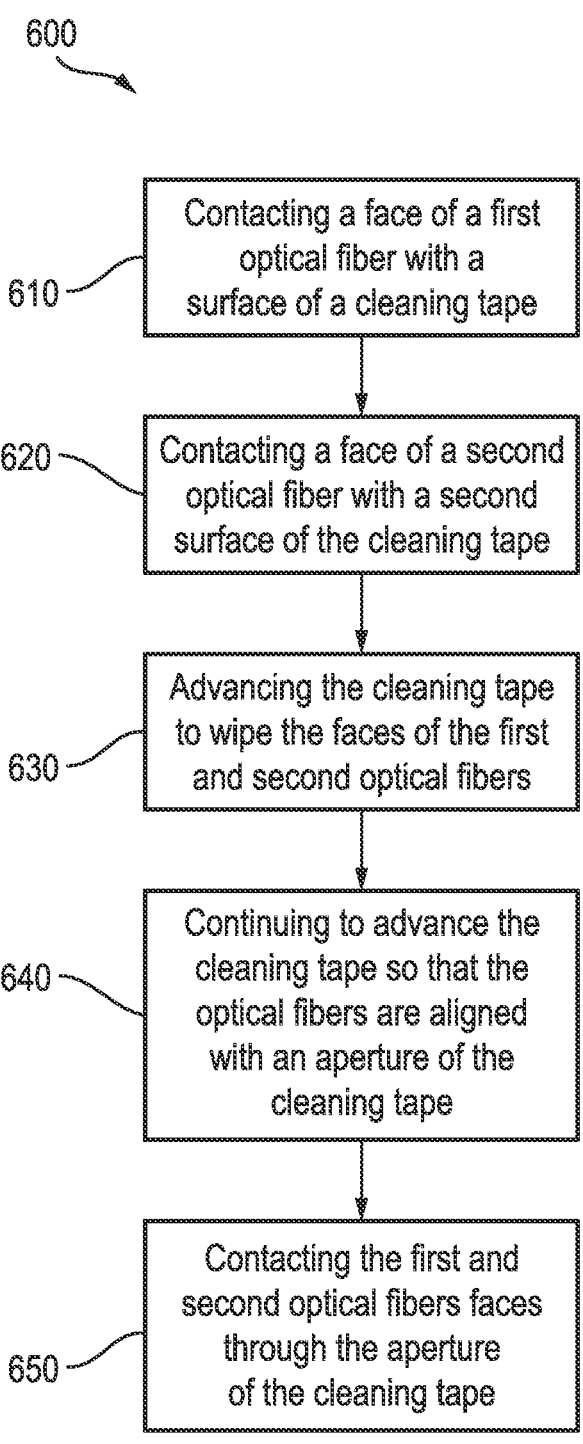
FIG. 20 shows an illustrative method of cleaning and connecting two optical fibers according to some embodiments.

An illustrative method 600 of cleaning and connecting two optical fibers is shown in FIG. 20. In some embodiments, a first optical fiber and a second optical fiber may be cleaned simultaneously and connected to one another within optical fiber cleaning assembly. Operation 610 may include contacting a face of a first optical fiber with a first surface of a cleaning tape. Operation 620 may include contacting a face of a second optical fiber with a second surface of the cleaning tape. It is understood that first optical fiber and second optical fiber need not be brought into contact with cleaning tape in any particular order, and optical fibers may or might not be brought into contact with cleaning tape simultaneously. Operation 630 may include advancing the cleaning tape to wipe the faces of the first and second optical fibers. The cleaning tape may be advanced by a drive mechanism, such as a motor that rotates a spool on which cleaning tape is wound, as discussed in further detail above. Operation 640 may include continuing to advance the cleaning tape so that the first and second optical fibers are aligned with an aperture of the cleaning tape. As discussed above with respect to illustrative method 400, an optical sensor may detect a presence of particulate matter on either optical fiber through the aperture of the cleaning tape. Once aligned with an aperture, operation 650 may include contacting the first and second optical fiber faces through the aperture. In this way, connection of optical fibers can be made within the optical fiber cleaning assembly. This helps to eliminate a step of removing the optical fibers from an optical fiber cleaning assembly and subsequently connecting the cleaned optical fibers. Further, by withdrawing the optical fibers from a cleaning assembly, the optical fibers are exposed and may accumulate particulate matter prior to connection.

PARTS LIST

100—optical fiber cleaning assembly
110—cleaning tape
112—first surface
114—second surface
115—cleaning window
117—cleaning portion
118—aperture
120—reservoir for index matching fluid
122—index matching fluid
125—fluid pump
130—first spool
132—biasing mechanism
135—guide elements
140—second spool
150—control unit
152—indicator
156—contact sensor
157—cleaning tape sensor
158—fluid sensor
160—drive mechanism
165—actuator
170—optical sensor
180—housing
182—door
187—connectors
192—barrier
200—device
210—first optical fiber
212—face of fiber
218—etalon
220—optical fiber connector
212—face of first optical fiber
300—system/carriage
302—surface
307—connectors
310—second optical fiber
312—face of second optical fiber
325—system socket
360—system motor
380—extendable element
500—particulate matter
d1—diameter of aperture
d2—distance between apertures If optical fibers are connected without proper cleaning, one or both of the optical fibers may be contaminated or damaged. Optical fibers may have a single core or may have multiple cores. Optical fibers having multiple cores may be particularly sensitive to particulate matter on a face of the optical fiber. Contamination of a face of an optical fiber may result in particulate matter becoming embedded in the face of the optical fiber or scratching the face of the optical fiber, which may negatively affect the transmission of light signals through the optical fiber connection or cause light signals to be detrimentally reflected from the optical fiber connection.

Further, once one optical fiber face is contaminated, the contaminated optical fiber may in turn contaminate the other optical fiber faces connected to the contaminated optical fiber. Should the optical fiber become contaminated or damaged, the device incorporating the optical fiber (e.g., a medical instrument and/or a medical manipulator system connectable to the medical instrument) may be unable to be used until cleaned or repaired by a skilled technician. Such damage can be very costly to repair and can prevent usage of the device.

An optical fiber cleaning assembly as described herein may be used to clean an optical fiber of a device, such as a catheter having a fiber optic shape sensor with a catheter optical fiber connector, or an optical fiber of a system or portion thereof, such as a medical instrument manipulator. While the present disclosure refers primarily to medical instruments, it will be readily understood by one of ordinary skill in the art that the optical fiber cleaning assemblies as described herein may be used to clean any optical fibers or optical fiber connectors.

Figure 21:
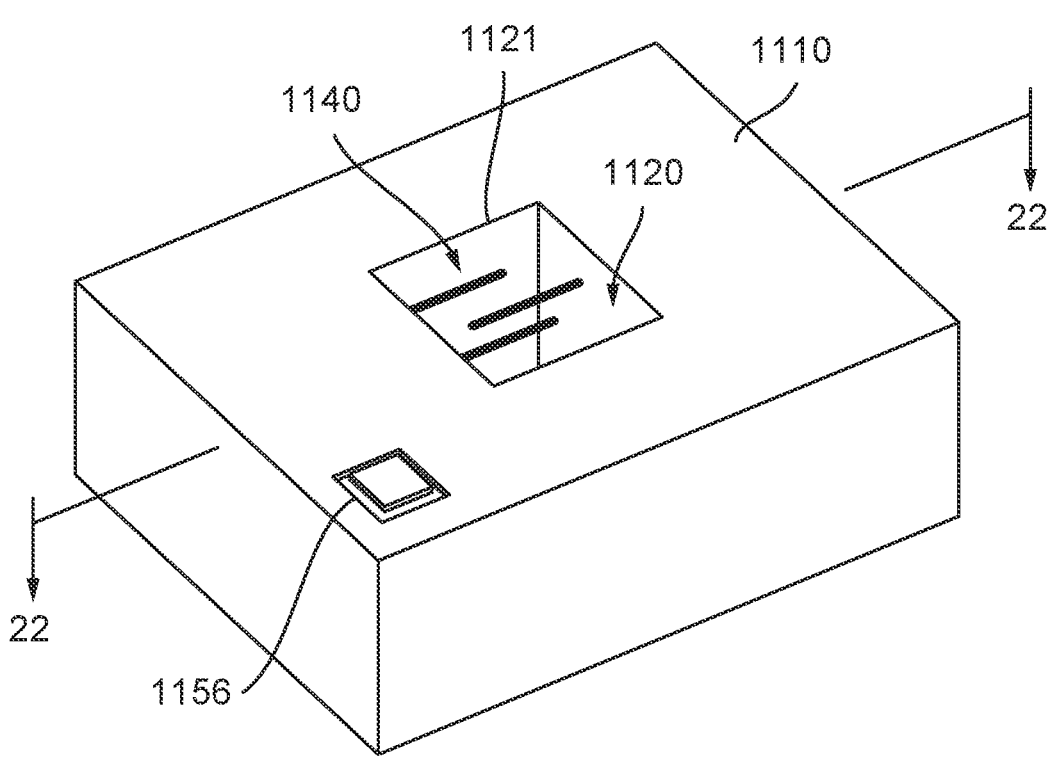
FIG. 21 shows a perspective view of an optical fiber cleaning assembly, according to some embodiments.
Figure 22:
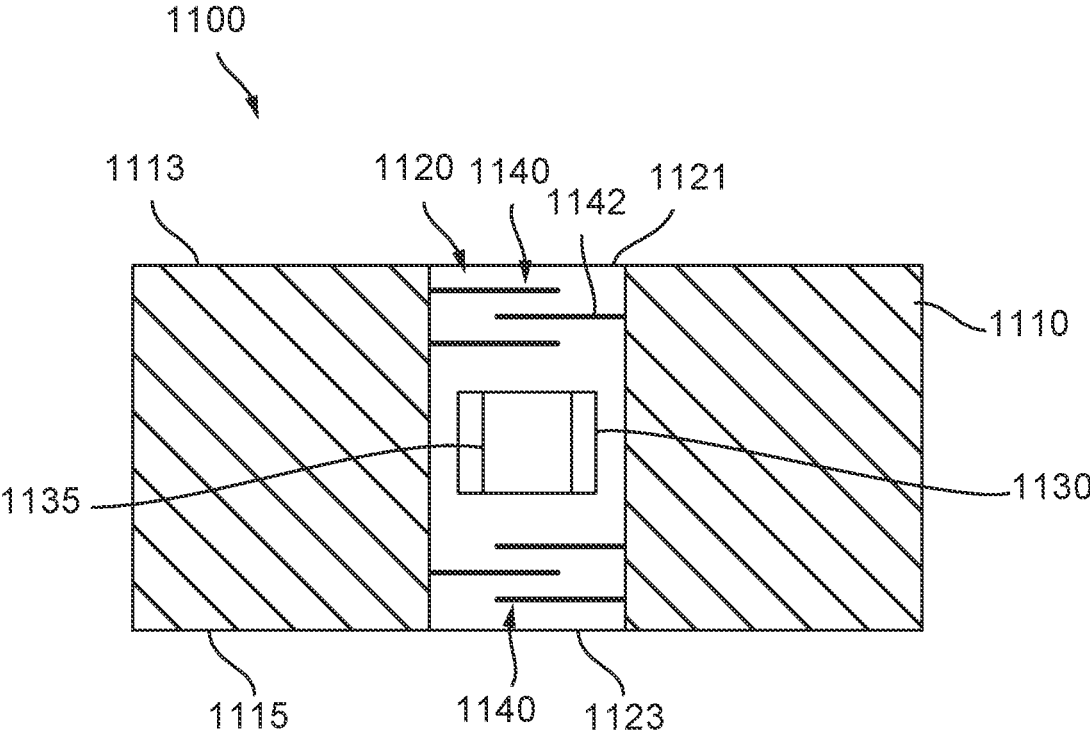
FIG. 22 shows a longitudinal cross sectional view of the optical fiber cleaning assembly of FIG. 21 as taken along line 22-22, according to some embodiments.

FIG. 21 shows a perspective view of an optical fiber cleaning assembly 1100 according to some embodiments. Optical fiber cleaning assembly 1100 may include a housing 1110 having a pocket 1120 for receiving an optical fiber. Pocket 1120 includes an opening 1121 and may have a plurality of openings (e.g., a second opening 1123 as shown in FIG. 22). A cleaning structure 1140 may be arranged within pocket 1120 for cleaning a face of an optical fiber inserted into pocket 1120. Cleaning structure 1140 may be arranged at or adjacent one or both openings 1121, 1123. Cleaning structure 1140 may be configured to wipe a face of an optical fiber inserted into pocket 1120. For example, cleaning structure 1140 may include a plurality of wipers 1142, as shown in FIG. 22. Wipers 1142 may be elongated rods and may be flexible enough to bend when contacted by an optical fiber. In one aspect, wipers 1142 may be configured as bristles. In some embodiments, cleaning structure 1140 may include movable gates that cover a portion of opening and that may be pivotally connected to pocket 1120, such as by a hinge. Movable gates may include two gates that cover an opening 1121 of pocket 1120 in a closed configuration and that pivot to an open configuration to allow an optical fiber to enter pocket 1120. Movable gates may be biased toward the closed configuration so as to apply a force on optical fiber as optical fiber contacts movable gates and enters pocket 1120.

Housing 1110 of optical fiber cleaning assembly 1100 may be shaped generally as a rectangular prism, as shown for example in FIG. 21, or may be any of various shapes and geometries. Housing 1110 can be configured to be held in one hand of a user. Housing 1110 may include a handle or grip (not shown) to facilitate grasping and maneuvering optical fiber cleaning assembly 1100. Alternatively, housing 1110 may have an ergonomic construction so that housing 1110 can be held comfortably in a hand of a user. Housing 1110 may enclose and store components of optical fiber cleaning assembly 1100.

Pocket 1120 of optical fiber cleaning assembly 1100 may be formed as a recessed area or cavity in housing 1110 that defines an interior volume. Pocket 1120 may be large enough to receive an optical fiber for cleaning. For example, the length and width of pocket 1120 may be large enough to receive an optical fiber. Additionally or alternatively, a diameter of the pocket 1120 may be greater than a diameter of an optical fiber to accommodate insertion of the optical fiber into pocket 1120. An optical fiber may be inserted into pocket 1120 along a longitudinal direction of optical fiber and pocket 1120, such that an optical fiber is inserted into pocket 1120 leading with a face of optical fiber. Pocket 1120 may have a transverse cross sectional area that is rectangular, square (as shown in FIG. 21), circular, elliptical, oval shaped, or polygonal.

In some embodiments, optical fiber cleaning assembly 1100 may include an indicator 1156, such as an indicator light, e.g., a light emitting diode (LED). Indicator 1156 may be arranged on housing 1110 to be readily visible to a user of optical fiber cleaning assembly 1100. Indicator 1156 may be configured to indicate whether particulate matter is detected on an optical fiber. This may help a user to quickly assess whether an optical fiber is contaminated and is to be cleaned, or whether an optical fiber is sufficiently clean. For example, indicator 1156 may indicate to a user that an optical fiber face is contaminated (e.g., particulate matter is present on a face of the optical fiber) or that the optical fiber face is clean (e.g., the optical fiber face is free of particulate matter). Indicator 1156 may illuminate or flash, and may display one or more colors in order to alert the user. For example, indicator 1156 may illuminate in a first color, such as red, when particulate matter is present, and may illuminate in a second color, such as green, when particulate matter is not present. This may help the user to easily determine whether further cleaning is required, or if optical fiber faces are sufficiently clean.

In some embodiments, indicator 1156 may alternatively or additionally include an audio unit, such as a speaker, for playing or emitting a tone or sound to indicate whether particulate matter is present. For example, a tone can be played to indicate that an optical fiber face is contaminated by particulate matter. In another aspect, indicator 1156 may play a first sound to indicate that an optical fiber is clean, e.g., a chime or a bell, and may play a second sound to indicate that an optical fiber is dirty, e.g., a buzzer or alarm. Thus, indicator 1156 may provide an audible prompt to a user to further clean an optical fiber prior to connecting the optical fiber in order to prevent damage or contamination of optical fibers and ensure a good connection of the optical fibers.

In some embodiments, optical fiber cleaning assembly 1100 may be connected to a system having an optical fiber, and the system may control the operation of cleaning assembly 1100 as discussed in further detail below. In such embodiments, the system rather than optical fiber cleaning assembly 1100 may include an indicator and may be configured to provide indications to the user. The indicator of the system may include a display screen. The system may be configured to provide more detailed information to the user relating to the optical fiber cleaning, such as displaying an image of the optical fiber face.

FIG. 22 shows a cross sectional view along line 22-22 of the optical fiber cleaning assembly 1100 of FIG. 21, according to some embodiments. Pocket 1120 may extend from a first side 1113 of housing 1110 to an opposing second side 1115 of housing 1110. Thus, pocket 1120 may include a plurality of openings, such as a first opening 1121 on first side 1113 and a second opening 1123 on second side 1115. While optical fiber cleaning assembly 1100 may be used to clean two optical fibers simultaneously, it is understood that optical fiber cleaning assembly 1100 may instead be used to clean a single optical fiber at a time, if desired.

Figure 23:
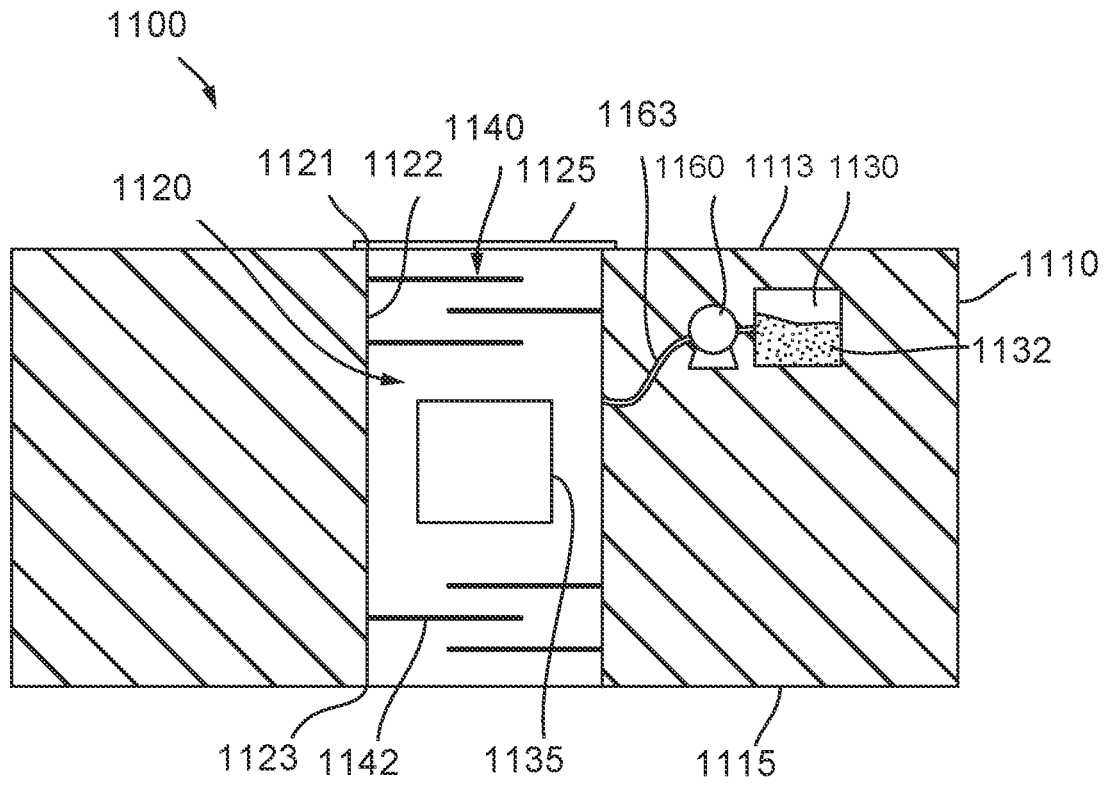
FIG. 23 shows a longitudinal cross sectional view of the optical fiber cleaning assembly of FIG. 21 as taken along line 22-22, according to some embodiments.

As shown in FIGS. 22-23, optical fiber cleaning assembly 1100 may include a reservoir 1130 configured to store an index matching fluid. Reservoir 1130 may be a container or vessel. Reservoir 1130 may alternatively or additionally include a substrate saturated with index matching fluid, such as a porous body or sponge. In some embodiments, reservoir 1130 may be arranged within pocket 1120, as shown for example in FIG. 22, or reservoir 1130 may be remote from pocket 1120, as shown in FIG. 23. As an optical fiber is inserted into pocket 1120, a face of optical fiber may be coated with an index matching fluid 1132.

Optical fiber cleaning assembly 1100 may be a disposable device in some embodiments. When index matching fluid 1132 is used (or when cleaning assembly 1100 has been used a certain number of times), a user can dispose of cleaning assembly 1100. In some embodiments, optical fiber cleaning assembly 1100 may be reusable, and reservoir 1130 containing index matching fluid 1132 may be periodically replenished (e.g., emptied and/or refilled). Index matching fluid 1132 may need to be replaced to remove particulate matter accumulated in the index matching fluid 1132. Housing 1110 may include a door (not shown), for providing access to reservoir 1130. Reservoir 1130 can be removed, emptied, and refilled, or reservoir 1130 may be replaced with a new reservoir 1130 containing clean and unused index matching fluid 1132.

In some embodiments, reservoir 1130 or openings of pocket 1120 may include a seal 1125, such as a metal foil, a plastic film, or the like. Seal 1125 may prevent particulate matter from entering pocket 1120 prior to use of optical fiber cleaning assembly 1100. In operation, an optical fiber may pierce seal 1125 to enter pocket 1120. Seal 1125 may be constructed of a material that does not produce particles or debris when pierced to avoid contaminating optical fibers. Seal 1125 may be a membrane, such as a self-healing membrane, to retain fluid 1132 within reservoir 1130 while allowing passage of optical fibers into and out of pocket 1120 and reservoir 1130

As shown in FIGS. 22-23, optical fiber cleaning assembly 1100 may further include an alignment sleeve 1135 arranged within pocket 1120 to facilitate alignment and connection of optical fibers inserted into pocket 1120. Thus, alignment sleeve 1135 may be configured to receive a first optical fiber and a second optical fiber within pocket 1120. Alignment sleeve 1135 may be arranged centrally within pocket 1120 relative to first side 1113 and second side 1115 of housing 1110. In some embodiments, alignment sleeve 1135 may be defined by or surrounded by reservoir 1130 so that index matching fluid is applied to optical fibers as they enter alignment sleeve 1135.

An optical fiber cleaning assembly 1100 having a reservoir 1130 located remotely from pocket 1120 is shown, for example, in FIG. 23. Optical fiber cleaning assembly 1100 is substantially the same as optical fiber cleaning assembly of FIG. 22, but reservoir 1130 is located remotely from pocket 1120. Reservoir 1130 is enclosed within housing 1110 of optical fiber cleaning assembly 1100. Reservoir 1130 may be in fluid communication with pocket 1120 via a conduit 1163 such that index matching fluid 1132 stored within reservoir 1130 can be supplied to pocket 1120 via conduit 1163. In some embodiments, optical fiber cleaning assembly 1100 may further include a pump 1160 to drive a flow of index matching fluid from reservoir 1130 to pocket 1120. For example, pump 1160 may be a positive displacement pump, such as a piston pump, among others as will be appreciated by one of ordinary skill in the art. Pump 1160 may be actuated by a user to provide the driving force to move the fluid 1132 through conduit 1163 and into pocket 1120. In some embodiments, pump 1160 may automatically actuate upon insertion of one or more optical fibers into pocket 1120. Thus, the insertion pressure provided by an optical fiber may drive pump 1160. In some embodiments, pump 1160 may be electronically controlled such that index matching fluid 1132 is supplied to pocket 1120 upon detection of optical fiber within pocket 1120 by a sensor (not shown), such as a motion sensor, a proximity sensor, or a contact sensor. In an alternate embodiment, a pump or drive mechanism may be external to optical fiber cleaning assembly 1100, such that a flow of index matching fluid from reservoir 1130 may be generated by a drive mechanism of a system to which optical fiber cleaning assembly is connected, as described in further detail below.

Index matching fluid may be sprayed via a nozzle onto the optical fiber(s). In some embodiments, index matching fluid may saturate a substrate, such as a porous body or sponge. In some embodiments, index matching fluid may coat a cleaning structure 1140 such that cleaning structure 1140 applies index matching fluid to optical fiber as optical fiber contacts cleaning structure 1140.

Figure 24:
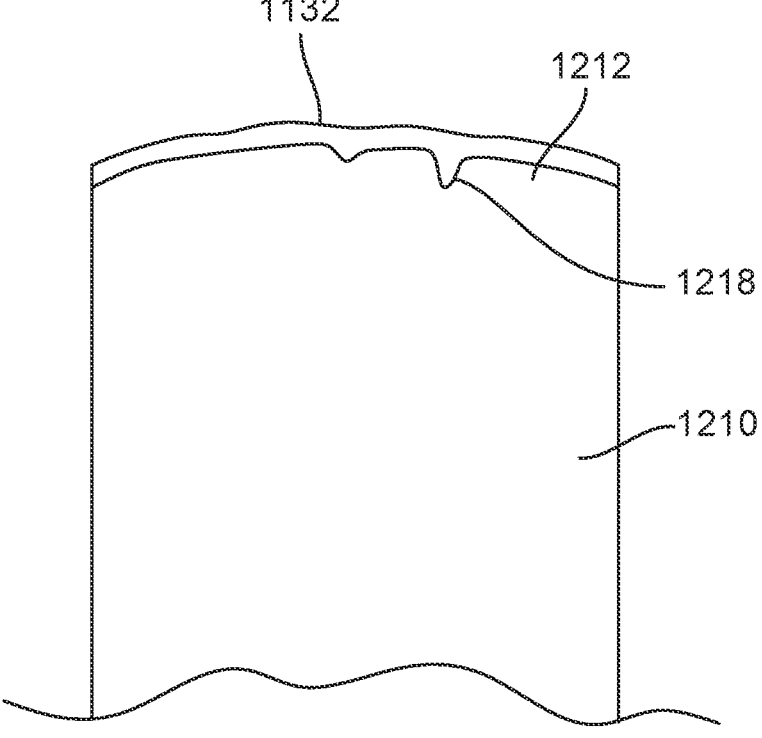
FIG. 24 shows a magnified view of a face of an optical fiber having a coating of an index matching fluid applied by an optical fiber cleaning assembly, according to some embodiments.

FIG. 24 shows a magnified view of a face 1212 of an optical fiber 1210 having a coating of an index matching fluid 1132 applied by an optical fiber cleaning assembly according to some embodiments. An index matching fluid (e.g., fluid 1132) may be a fluid having a refractive index that corresponds to a refractive index of a core of the optical fiber to be cleaned (e.g., optical fiber 1210). The refractive index may be equal to or nearly equal to a refractive index of the fiber core(s) of the optical fiber 1210. In some embodiments, the refractive index of the index matching fluid may range from about 1.4 to about 1.5, such as about 1.47. Thus, index matching fluid may be selected based on the material of the optical fiber core(s). Optical fibers may be formed from, for example, fused silica, germanium-doped silica (e.g., 3% germanium doped fused silica glass), or borosilicate glass, among others. As index matching fluid has a refractive index that corresponds to the cores of the optical fibers to be cleaned, the index matching fluid is selected to have minimal to no effect on the transmission of light through the optical fiber cores. In some embodiments, index matching fluid may include glycerin. Index matching fluid may be in the form of a liquid or gel. Coating of index matching fluid 1132 may serve as a protective barrier when optical fiber 1210 is connected to another optical fiber (e.g., an optical fiber 1310, as will be described in further detail below). Index matching fluid 1132 may help to enhance transmission of light across the connection of two optical fibers when contact is incomplete leaving a gap or when limited by surface defects such as scratches or pits on either optical fiber face. The index matching fluid may help to reduce loss and back reflection at the connection of two optical fibers.

After index matching fluid 1132 is applied to the optical fiber 1210, index matching fluid 1132 may also fill etalons 1218—microscopic gaps or cracks—on a face 1212 of an optical fiber 1210. Further, wetting face 1212 with index matching fluid 1132 may help to release, capture and transport particulate matter on face 1212 of optical fiber 1210 and particulate matter on or within etalons 1218.

Optical fiber cleaning assembly 1100 may include a cleaning structure for cleaning a face of an optical fiber. Cleaning structure may include a plurality of wipers, movable gates, a membrane, such as a self-healing membrane, petals, or strips, among other cleaning structures, and combinations thereof.

Figures 25, 26:
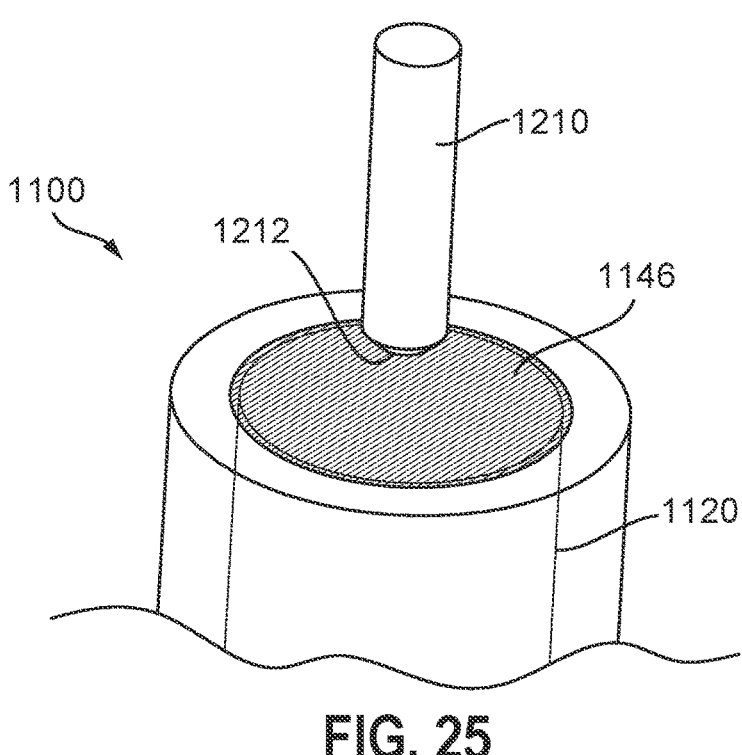
FIG. 25 shows a perspective view of a cleaning structure of an optical fiber cleaning assembly, according to some embodiments.
FIG. 26 shows a perspective view of a cleaning structure of an optical fiber cleaning assembly, according to some embodiments.

FIG. 25 shows an embodiment in which a membrane 1146 extends across an opening of pocket 1120. Membrane 1146 may fully or partially cover the opening of pocket 1120. Membrane 1146 may include, for example, a non-woven material. In operation, as optical fiber 1 210 presses against membrane 1146 and pierces through membrane 1146, membrane 1146 wipes a face 1212 of optical fiber 1210 to clean the same. In some embodiments, pocket 1120 may include additional cleaning structures within pocket 1120. Membrane 1146 may be configured to rupture to allow optical fiber 1210 to pass through membrane 146 into pocket 1120. Thus, membrane 11146 can be used for a single-use application.

In some embodiments, membrane 1146 may be a self-healing membrane having a slit or opening configured to stretch to allow an optical fiber to pass therethrough and subsequently heal or close when the optical fiber is withdrawn from the membrane. The slit may be a small diameter opening or may be fully closed when membrane is in a resting position. The slit may expand to allow optical fiber 1210 to pass through membrane 1146 and enter pocket 1120 as an optical fiber is pressed into membrane 1146, and the slit may return to its original shape and dimensions (i.e., heal) when optical fiber is removed. In such embodiments, membrane 1146 may comprise an elastomer, such as urethane, nitrile, or Hypalon, among other natural and synthetic rubbers.

The material of membrane 1146 may be selected based on compatibility with the index matching fluid of optical fiber cleaning assembly 1100 to avoid degradation or deterioration of membrane 1146 upon exposure to index matching fluid. Further, material of membrane 1146 may be selected to have sufficient abrasion-resistance and toughness to avoid creating particulate matter when contacted by an optical fiber or other object.

FIG. 26 shows an embodiment in which cleaning structure comprises a plurality of petals 1148. Petals 1148 may substantially cover an opening of pocket 1120. Petals 1148 may be shaped as sections of a circle such that petals 1148 are generally triangular. Petals 1148 may each form a point that is arranged at a center of pocket 1120. In an aspect, petals 1148 may overlap one another or may meet in an end-to-end manner. Petals 1148 may be flexible so that when an optical fiber 1210 is inserted into pocket 1120 in a longitudinal direction, petals 1148 fold inwardly. Petals 1148 may be arranged in a common plane. Petals 1148 may be biased in a configuration in which petals 1148 are in the common plane and cover opening of pocket 1120, and may bend or flex when contacted by an optical fiber 1210 such that petals 1148 apply a force to optical fiber 1210. Similar to wipers 1142 (see FIG. 22), petals 1148 may wipe the face 1212 of optical fiber 1210 as optical fiber 1210 passes through petals 1148 to provide a cleaning effect.

Figure 27:
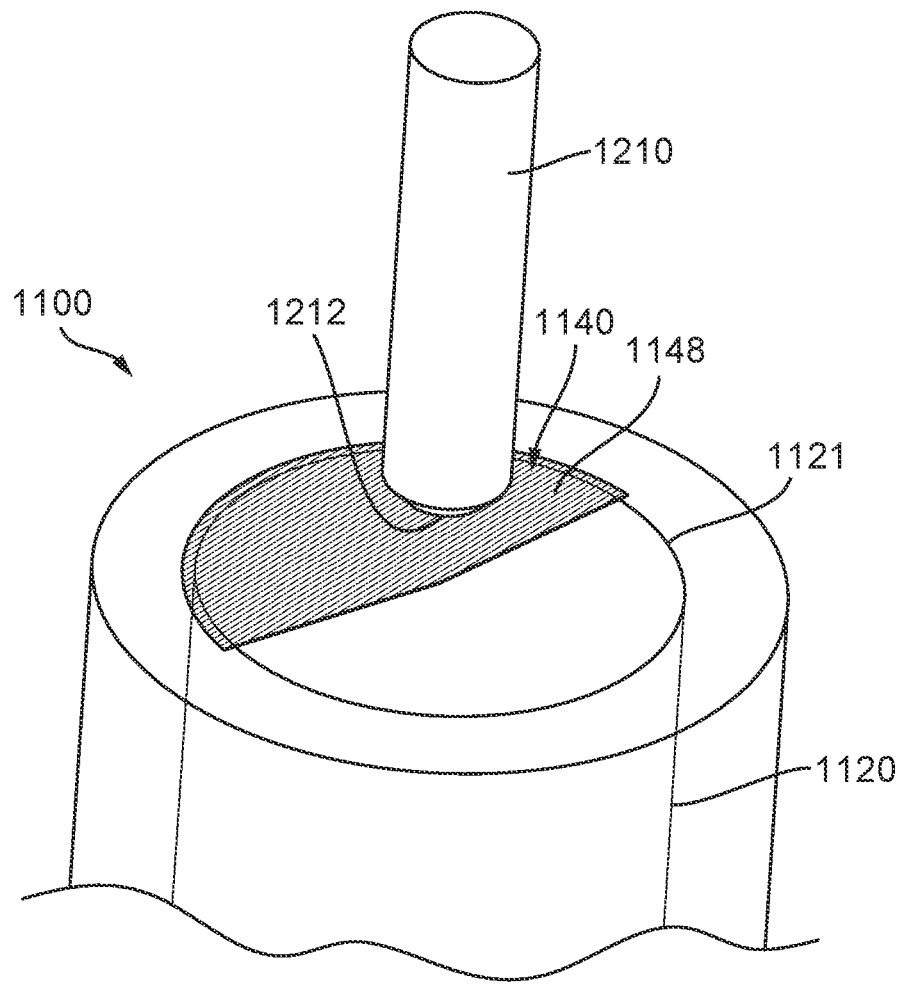
FIG. 27 shows a perspective view of a cleaning structure of an optical fiber cleaning assembly, according to some embodiments.

FIG. 27 shows an embodiment of optical fiber cleaning assembly 1100 in which cleaning structure 1140 includes a single petal 1148. Petal 1148 may be formed as a section of a circle, such as a semi-circle. In an aspect, petal(s) 1148 can cover only a portion of opening 1121 of pocket 1120. Petal 1148 may flex or bend to allow optical fiber 1210 to enter pocket 1120. For example, as optical fiber 1210 presses against petal 1148, petal 1148 can wipe a face 1212 of optical fiber 1210. Petal 1148 may be substantially planar, and a portion of petal 1148 may flex or bend out-of-plane when contacted by an optical fiber 1210. Petal 1148 may return to a planar configuration when optical fiber 1210 is removed from pocket 1120.

Figure 28:
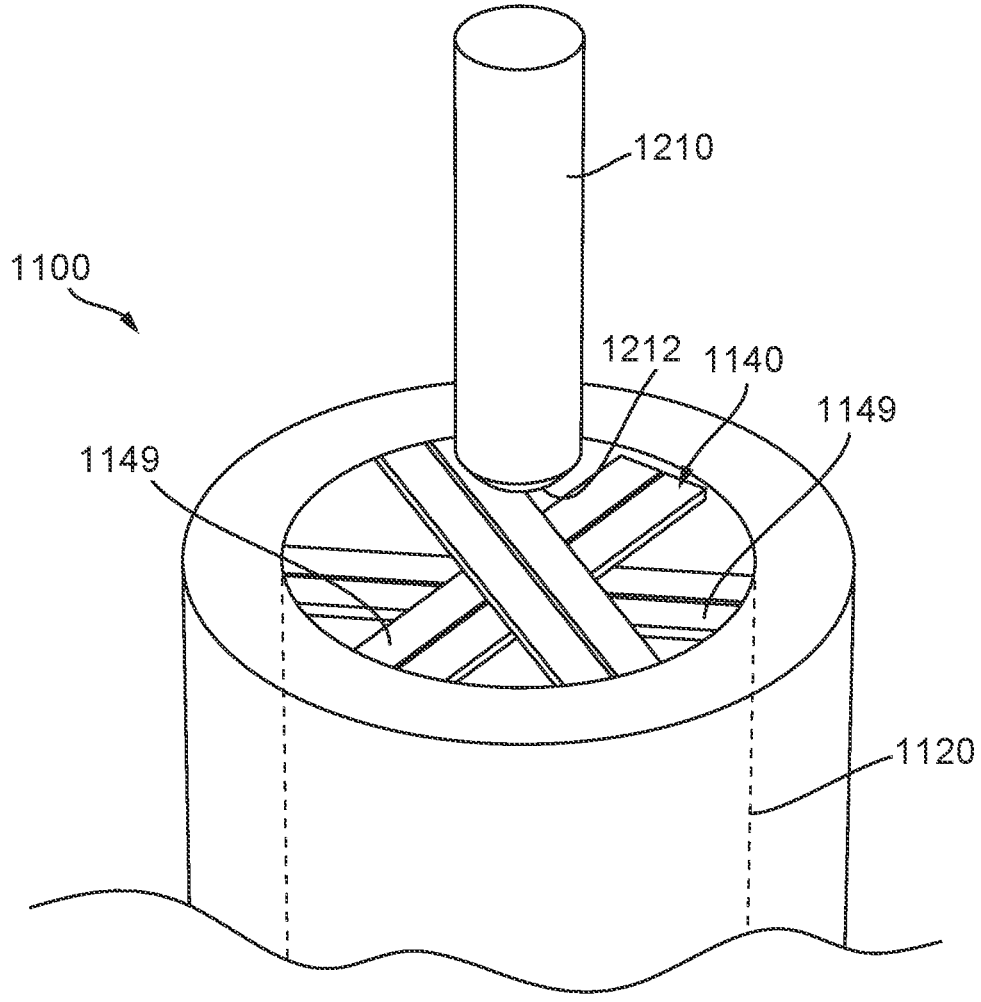
FIG. 28 shows a perspective view of a cleaning structure of an optical fiber cleaning assembly, according to some embodiments.

In some embodiments, as shown for example in FIG. 28, cleaning structure 1140 may include a plurality of strips 1149. Strips 1149 may extend along a diameter or chord of pocket 1120 at opening of pocket 1120. Strips 1149 may be arranged at an angle relative to one another. Strips 1149 may overlap one another to have a stacked configuration. In some embodiments, strips 1149 may resemble a plus sign or asterisk, depending on the number of strips 1149. As optical fiber passes through strips 1149, strips 1149 can flex to allow optical fiber to pass therethrough. Strips 1149 may wipe against a face 1212 of optical fiber 1210 to clean face 1212 as optical fiber 1210 passes through and displaces strips 1149. Strips 1149 may fit closely against optical fiber 1210 as it passes therethrough and strips 1149 may return to their initial position and orientation when optical fiber 1210 is removed from pocket 1120.

Figure 29:
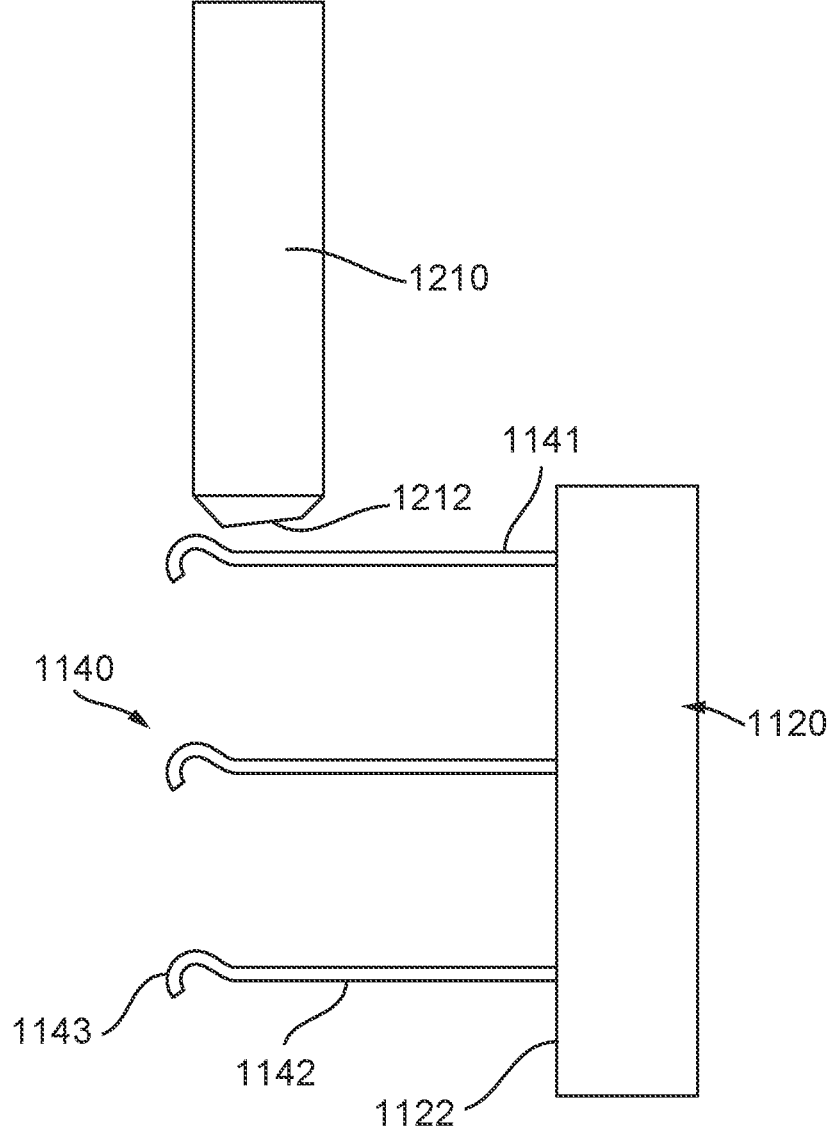
FIG. 29 shows a side view of an optical fiber cleaning assembly having a cleaning structure formed as a plurality of wipers, according to some embodiments.

In some embodiments, cleaning structure 1140 may include a wiper 1142, as shown in FIG. 29. One or more wipers 1142 may extend from an inner wall 1122 of pocket 1120 of cleaning assembly 1100. For example, wipers 1142 can be cantilevered from inner wall 1122 of pocket 1120. In some embodiments, wipers 1142 may extend from one or more inner walls of pocket 1120 and may extend from opposing walls of pocket 1120. Wipers 1142 may be spaced along a longitudinal axis of pocket 1120 so that an optical fiber 1210 contacts additional wipers 1142 as optical fiber 1210 is inserted further into pocket 1120. Wipers 1142 may be arranged to extend generally transversely to a longitudinal axis of pocket 1120 and perpendicular to optical fiber 1210 inserted into pocket 1120. However, in some embodiments, wipers 1142 may be arranged at an angle relative to a transverse axis, such as an angle of approximately 5 degrees to approximately 45 degrees relative to the transverse axis. Wipers 1142 may be flexible to bend when an optical fiber 1210 is inserted into pocket 1120 along a longitudinal axis of pocket 1120. Wipers 1142 may be elongated rods. In an aspect, wipers 1142 may be substantially linear. It is understood that wipers 1142 need not be perfectly linear and may have a slight curvature in some embodiments. In some embodiments, wipers 1142 may include bristles or fibers. In another aspect, wipers 1142 may include a rod having a coating. Rod may be a metal, such as stainless steel, and the coating may be, for example, a plastic coating.

Each wiper 1142 may have a proximal end 1141 opposite a distal end 1143. Proximal end 1141 of wiper 1142 may be attached to inner wall 1122 of pocket 1120, and distal end 1143 may have end geometry, such as a hook-shape, as shown in FIG. 29. Distal end 1143 may curve downwardly so that face 1212 of optical fiber 1210 contacts a convex curvature of wiper 1142. This may help to promote contact of wiper 1142 with face 1212 of optical fiber 1210. In operation of cleaning assembly, a face 1212 of an optical fiber 1210 inserted into pocket 1120 of cleaning assembly can contact wiper 1142. As optical fiber 1210 is inserted further into pocket 1120, wiper 1142 can bend or flex, causing distal end 1143 to move across face 1212 of optical fiber 1210, thus providing a wiping or cleaning effect. As optical fiber 1210 may contact multiple wipers 1142, optical fiber 1210 can be thoroughly cleaned by contact with multiple wipers 1142.

Figure 30:
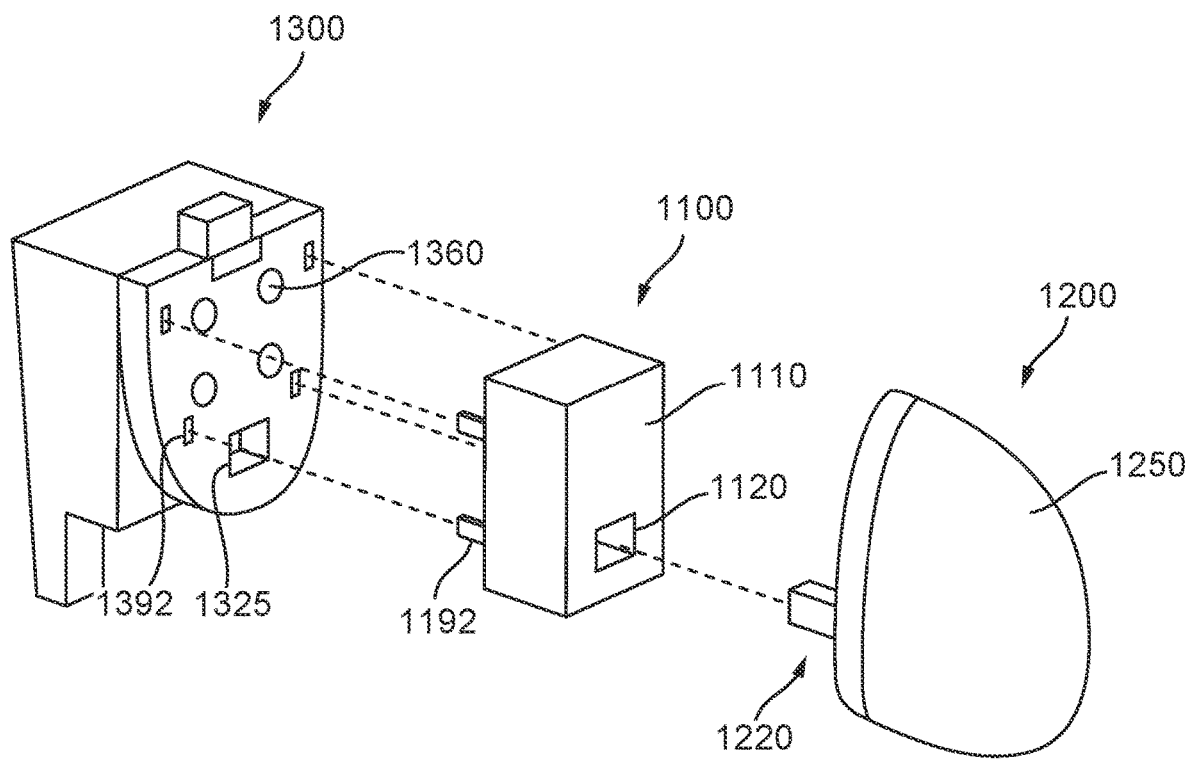
FIG. 30 shows a perspective view of an optical fiber cleaning assembly as positioned for cleaning optical fibers, according to some embodiments.

FIG. 30 shows a perspective view of an optical fiber cleaning assembly as positioned for cleaning optical fibers according to some embodiments. A device 1200 may be a medical instrument having a housing 1250 and an elongate device extending from the housing (not shown). The device 1200 may have an optical fiber (not shown) and an optical fiber connector 1220 configured to connect the optical fiber of device 1200 to an optical fiber of a system 1300. The system 1300 may include a socket 1325, and the optical fiber of the system 1300 may be positioned within the socket 1325. Socket 1325 may be configured to receive the optical fiber connector 1220 of device 1200 to connect the optical fiber of device 1200 to the optical fiber of system 1300.

Various examples of a device 1200 and system 1300 are described in PCT application PCT/US2019/054718 (filed Oct. 4, 2019 and titled "Systems and Methods for Positioning Medical instruments") and PCT application PCT/US2019/031823 (filed May 10, 2019 and titled "Backend Mechanism of a Catheter Control System"), which are both incorporated by reference herein in their entireties. System 1300 may further include a drive mechanism 1360 for controlling a device 1200 connected thereto. Further, system 1300 may include a connector 1392 for connection with a connector of device 1200 or cleaning assembly 1100 (e.g., connector 1192).

Optical fiber cleaning assembly 1100 may be formed as an independent device, separate from device 1200 or system 1300 having the optical fibers (e.g., optical fiber 1210 and optical fiber 1310) to be cleaned. Optical fiber cleaning assembly 1100 may be temporarily engaged with system 1300 to clean system optical fiber 1310 and/or temporarily engaged with device 1200 to clean device optical fiber 1210. After cleaning the ends of the optical fiber(s), cleaning assembly 1100 may be removed prior to connecting device 1200 to system 1300 in order to connect the device and system optical fibers. Alternatively, device 1200 and system 1300 may remain connected to cleaning assembly 1100 during a medical procedure, and cleaning assembly 1100 may be removed after completion of the procedure. As cleaning assembly 1100 may be a separate component, cleaning assembly 1100 can be removed and replaced as necessary, and various cleaning assemblies 1100 may be used to clean optical fibers 1210, 1310. When configured as a separate device, optical fiber cleaning assembly 1100 may be used to clean a single optical fiber at a time, or multiple optical fibers simultaneously, as discussed herein.

Housing 1110 of optical fiber cleaning assembly 1100 may be configured to be removably secured to the device 1200 and/or system 1300 when cleaning the optical fiber 1210 of device 1200 or the optical fiber 1310 of system 1300. In embodiments in which optical fiber cleaning assembly 1100 is configured to clean two fibers simultaneously, optical fiber cleaning assembly 1100 may be removably secured to the device 1200, system 1300, or both. Housing 1110 may include an adapter (not shown) to receive the optical fiber connector 1220 of the device 1200, and may further include an adapter (not shown) for insertion into the socket 1325 of the system 1300 in which an optical fiber 1310 is located. In this way, the optical fiber cleaning assembly 1100 may be shaped to connect with each of the device 1200 and system 1300 to clean the faces of the system and device optical fibers.

To facilitate connection of optical fiber cleaning assembly 1100 and a device 1200 or system 1300 having an optical fiber to be cleaned, housing 1110 of optical fiber cleaning assembly 1100 may include one or more connectors 1192 configured to connect optical fiber cleaning assembly 1100 to a device 1200 or system 1300. Connectors 1192 may be formed as protrusions extending from housing 1110, and may be formed, for example, as a post or hook. In some embodiments, connectors 1192 may be configured to mate with second connectors 1392 of system 1300 or device 1200. Connectors 1192 of housing 1110 may align with second connectors 1392 of system 1300 (or device 1200) when optical fiber cleaning assembly 1100 is positioned for cleaning optical fiber 1310 of system 1300 (or optical fiber 1210 of device 1200). Second connectors 1392 may be a receptacle for receiving connector 1192. Thus, connectors 1192, 1392 may be male and female connectors, and may mate by interference fit, press fit, snap fit, among other removable connections. For example, connector 1192 may be a male connector, and connector 1392 may be a corresponding female connector. Alternatively, connector 1192 may be a female connector, and connector 1392 may be a corresponding male connector. Although not shown, device 1200 may similarly include male or female connector(s) configured to engage with corresponding female or male connector(s) of housing 1110.

The system 1300 may further include one or more drive mechanisms 1360, as shown in FIG. 30. For example, each drive mechanism 1360 may include a motor and a rotating disk, and the rotating disk may mate with a corresponding capstan (not shown) of the device 1200 when the system 1300 is connected to the device 1200. Rotation of the drive mechanism 1360 causes the corresponding capstan of the device 1200 to rotate, and rotation of the capstan may be used to drive a wire wrapped around the capstan to articulate an elongate flexible portion of the device 1200 (not shown), for example. Various examples of different drive mechanisms are further described in PCT application PCT/US2019/054718 (filed Oct. 4, 2019 and titled "Systems and Methods for Positioning Medical instruments") and PCT application PCT/US2019/031823 (filed May 10, 2019 and titled "Backend Mechanism of a Catheter Control System"). In embodiments where the cleaning assembly 1100 is kept on during a medical procedure (e.g., connected to system 1300 and device 1200), the cleaning assembly 1100 may include mechanisms (e.g., rotating disks, shafts, etc.) for translating rotation of the drive mechanisms 1360 of system 1300 to corresponding capstans of the device 1200. In some embodiments, drive mechanism 1360 of system 1300 may be used to actuate a pump of optical fiber cleaning assembly 11100 for driving a flow of index matching fluid when optical fiber cleaning assembly 100 is connected to system 1300.

Figure 31:
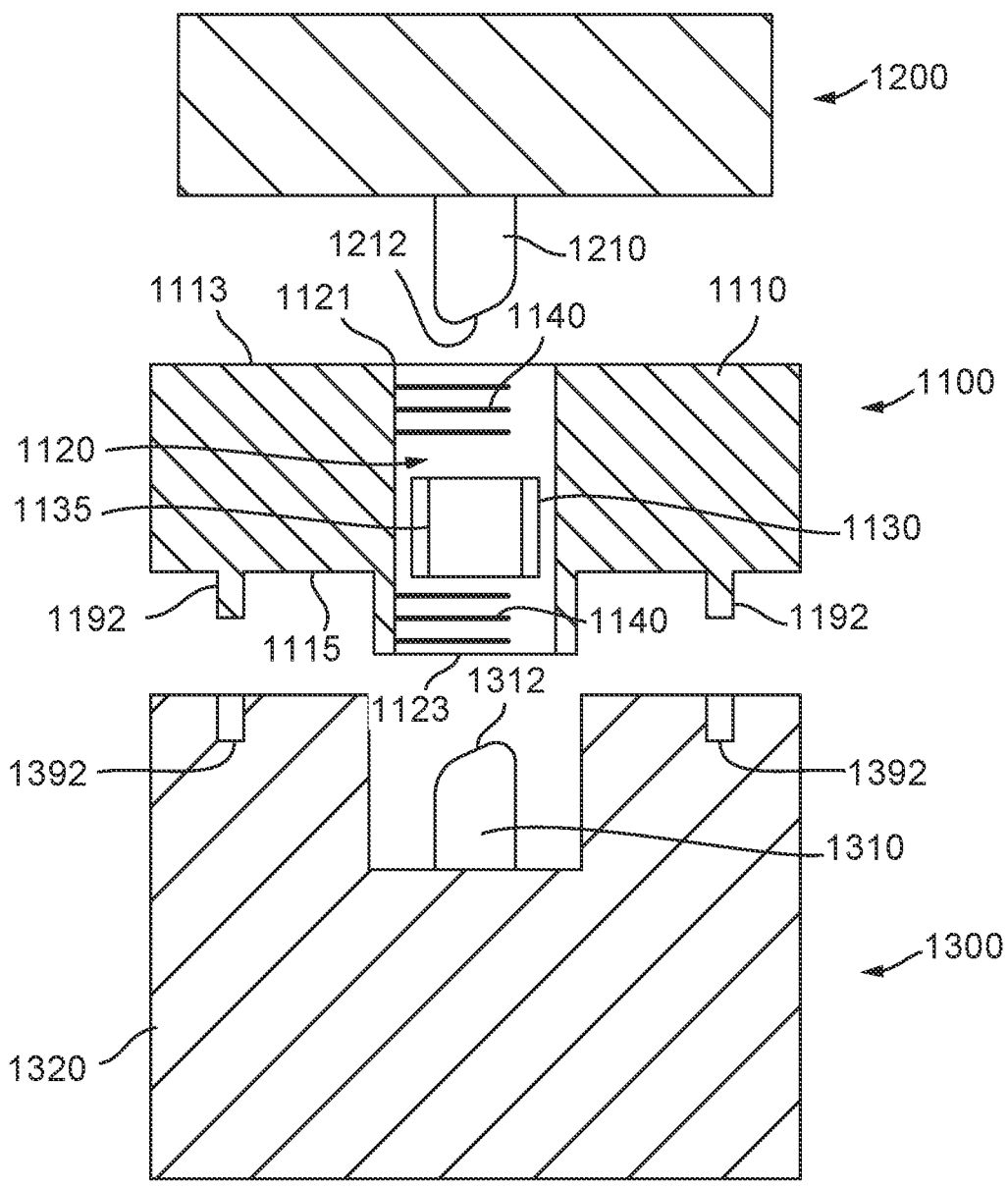
FIG. 31 shows a cross sectional view of an optical fiber cleaning assembly for cleaning two optical fibers, according to some embodiments.

FIG. 31 shows a cross sectional view of an optical fiber cleaning assembly for cleaning two optical fibers according to some embodiments. Optical fiber cleaning assembly 1100 may include a pocket 1120 for cleaning two optical fibers. Housing 1110 of optical fiber cleaning assembly 1100 may include a pocket 11120 that extends through housing 1110 from a first side 1113 to an opposing second side 1115 of housing 1110. A first optical fiber 1210 may be inserted into pocket 1120 from a first opening 1121 on a first side 1113 of housing 1110, and second optical fiber 1310 may be inserted into pocket 1120 from a second opening 1123 from a second side 1115 of housing 1110. Cleaning structures 1140 may be arranged within pocket 1120 adjacent first opening 1121 of pocket 1120 at first side 1113 of housing 1110 and adjacent second opening 1123 of pocket 1120 at second side 1115 of housing 1110 so that each optical fiber 1210, 1310 contacts a cleaning structure 1140 when inserted into pocket 1120. Cleaning structure 1140 may include a plurality of wipers, among other types of cleaning structures as described above. An alignment sleeve 1135 may be configured to facilitate proper alignment of optical fiber 1210 and optical fiber 1310 so that faces 1212, 1312 contact one another within alignment sleeve 1135. Pocket 1120 may include a reservoir 1130 containing index matching fluid 1132 so that each optical fiber 1210, 1310 contacts index matching fluid 1132. Reservoir 1130 may define or may surround alignment sleeve 1135 so that index matching fluid is applied as optical fibers enter alignment sleeve. As discussed above, index matching fluid 1132 may be a gel so that index matching fluid 1132 is retained within reservoir 1130 and pocket 1120. Further, index matching fluid 1132 may be impregnated in a sponge or other porous substrate, such that an optical fiber is wetted when brought into contact with the index matching fluid impregnated sponge.

Optical fiber cleaning assembly 1100 may be configured to be removably secured to a system 1300 having a chassis 1320 and a system optical fiber 1310, or to a device 1200 having a device optical fiber 1210, or to both. Housing 1110 may be shaped so that an optical fiber 1210, 1310 may be inserted into pocket 1120. Housing 1110 may include an adapter shaped to engage with a device optical fiber 1210 or system optical fiber 1310. For example, housing 1110 of optical fiber cleaning assembly 1100 may include a first connector 1192 configured to removably secure cleaning assembly 1100 to system 1300. First connector 1192 may be formed as a post or hook configured to engage with system 1300.

In embodiments having a pocket 1120 configured to receive two optical fibers 1210, 1310, pocket 1120 may allow for connection of optical fibers 1210, 1310 therein. For example and with reference to FIG. 30, optical fiber 1210 and optical fiber 1310 may be inserted into pocket 1120 until face 1212 of first optical fiber 1210 and face 1312 of second optical fiber 1310 meet to form a connection. Thus, optical fibers 1210, 1310 may be automatically cleaned upon inserting optical fibers 1210, 1310 into pocket 1120, and when inserted, optical fibers 1210, 1310 may connect in an end-to-end manner within pocket 1120.

Figure 32:
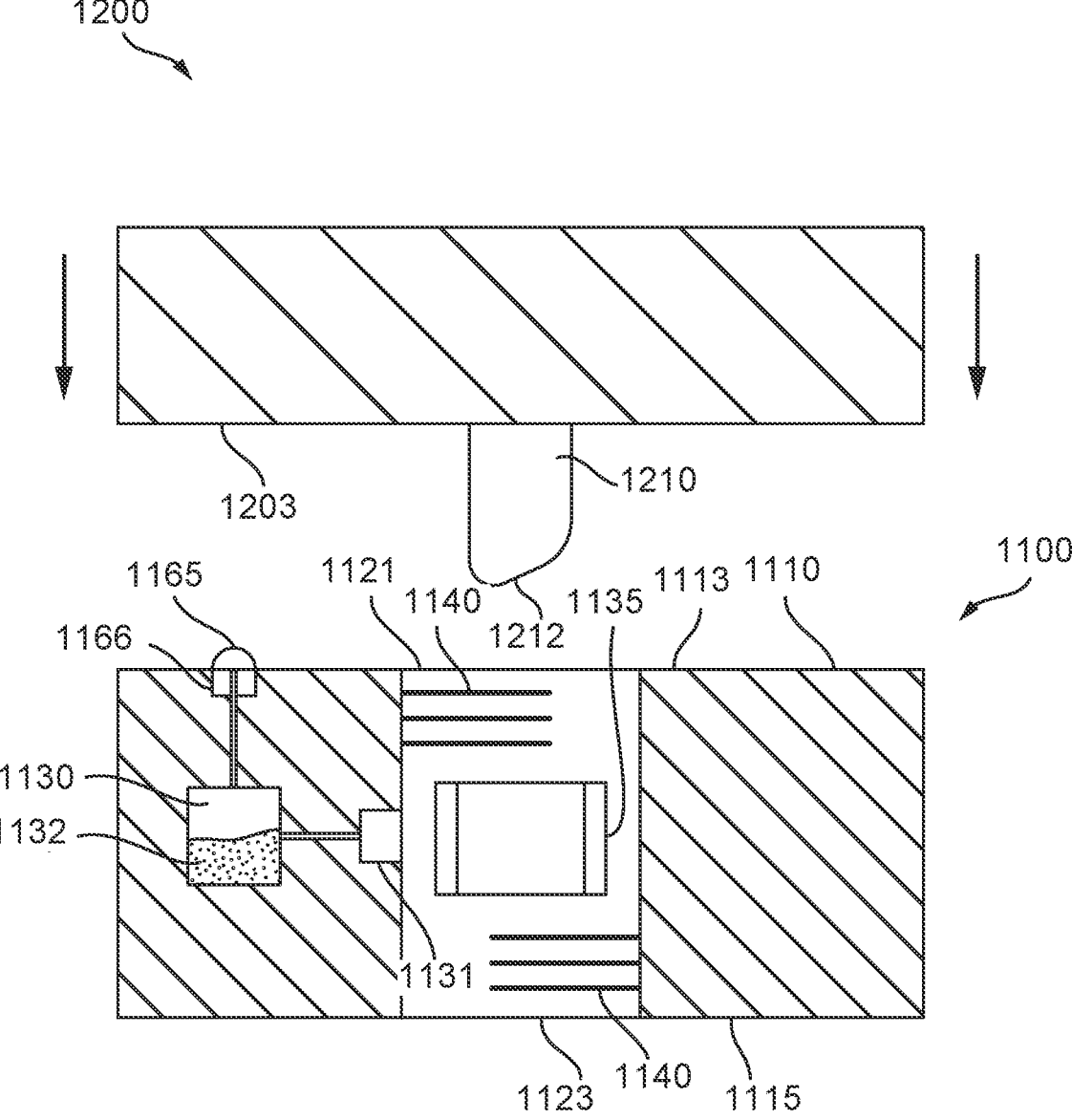
FIG. 32 shows a cross sectional view of an optical fiber cleaning assembly having an actuator, according to some embodiments.

FIG. 32 shows an optical fiber cleaning assembly 1100 according to some embodiments. Similar to optical fiber cleaning assembly 1100 as shown in FIG. 31, cleaning assembly 1100 includes a housing 1110 defining a pocket 1120 that extends from a first side 1113 to a second side 1115 of housing 1110. Pocket 1120 may include a cleaning structure 1140 configured to wipe an optical fiber 1210 inserted into pocket 1120 and may further include an alignment sleeve 1135 for facilitating alignment of optical fiber 1210 with a second optical fiber inserted into an opening 1123 of pocket 1120.

Optical fiber cleaning assembly 1100 may include an actuator 1165 for dispensing index matching fluid from a reservoir 1130, as shown in FIG. 32. Actuator 1165 may control a pump 1166, such that when actuator 1165 is operated, pump 1166 drives index matching fluid 1132 from reservoir 1130 into pocket 1120 of optical fiber cleaning assembly 1100. Cleaning assembly 1100 may include a nozzle 1131 for providing a flow or spray of index matching fluid into pocket 1120. Nozzle 1131 may be arranged within an inner wall of pocket 1120 or may extend into pocket 1120. In some embodiments, actuator 1165 may be actuated when device 1200 is connected to optical fiber cleaning assembly 1100. Specifically, when device 1200 is connected to cleaning assembly 1100, front surface 1203 of device 1200 contacts optical fiber cleaning assembly 1100 and presses actuator 1165. Thus, as device optical fiber 1210 enters pocket 1120, optical fiber 1210 is sprayed with index matching fluid 1132.

Figure 33:
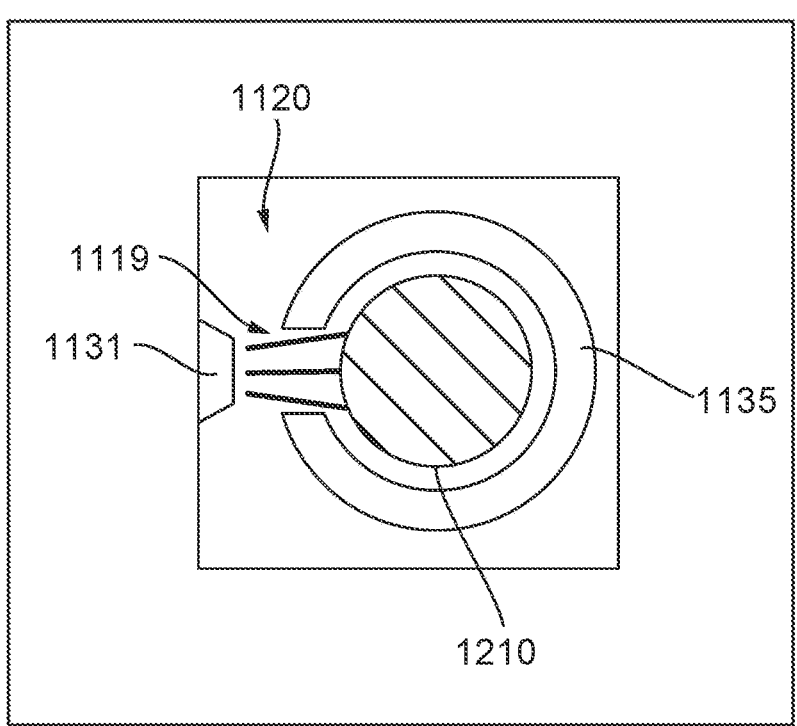
FIG. 33 shows a top-down view of a pocket of an optical fiber cleaning assembly, according to some embodiments.

FIG. 33 shows a top-down view of a pocket of an optical fiber cleaning assembly according to some embodiments. Pocket 1120 may include an alignment sleeve 1135 that facilitates alignment of optical fibers within pocket 1120. Alignment sleeve 1135 may have a generally cylindrical shape such that a cross sectional area is circular. In some embodiments, alignment sleeve 1135 may include a gap 1119. In an aspect, gap 1119 can extend along a longitudinal portion of alignment sleeve 1135. Thus, alignment sleeve 1135 may have a C-shaped cross-sectional area. A nozzle 1131, as described above with respect to FIG. 32, may be arranged within pocket 1120 to spray index matching fluid through gap 1119 and into an area defined within alignment sleeve 1135. In this way, index matching fluid can be sprayed onto an optical fiber within alignment sleeve 1135. Nozzle 1131 may be configured to spray index matching fluid in an upward direction toward opening 1121 and toward optical fiber being inserted into pocket 1120 to direct index matching fluid toward a face of an optical fiber.

Figure 34:
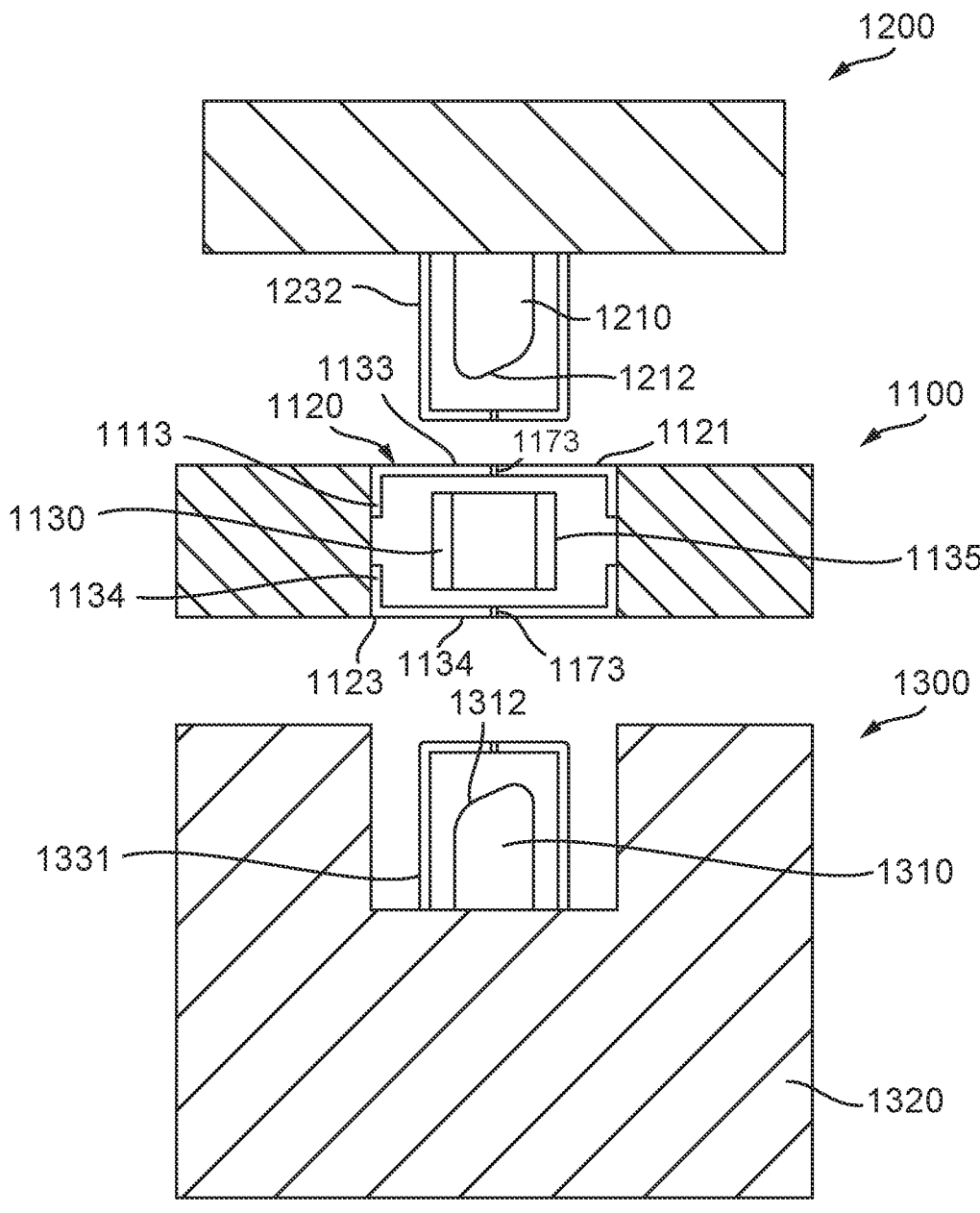
FIG. 34 shows a cross sectional view of an optical fiber cleaning assembly for cleaning two optical fibers, according to some embodiments.

FIG. 34 shows an optical fiber cleaning assembly 1100 according to some embodiments. Optical fiber cleaning assembly 1100 is similar to optical fiber cleaning assembly 1100 as shown in FIG. 31, but includes coverings surrounding optical fibers 1210, 1310, and can further include coverings across one or both of openings 1121, 1123 of pocket 1120 of optical fiber cleaning assembly 1100. Coverings may be membranes, such as self-healing membranes. Each self-healing membrane may include a slit 1173 to facilitate passage of an optical fiber 1210, 1310 therethrough. Optical fiber cleaning assembly 1100 may have a first membrane 1133 at opening 1121, and a second membrane 1134 at opening 1123. Membranes 1133, 1134 cover openings 1121, 1123, respectively, and prevent particulate matter from entering pocket 1120. Device 1200 may include an optical fiber 1210 enclosed by a device membrane 1232. Device membrane 1232 may be flexible so that it compresses upon contact. When membrane 1232 of device 1200 contacts cleaning assembly 1100, device membrane 1232 may compress, allowing device optical fiber 1210 to extend through device membrane 1232. Membrane 1133 at opening 1121 of pocket 1120 may also allow optical fiber 1210 to pass therethrough so that device optical fiber 1210 may enter pocket 1120. Thus, optical fiber 1210 is protected from contamination by device membrane 1232 and membrane 1133 of cleaning assembly 1100. Each membrane may be a self-healing membrane such that when optical fiber 1210 is removed, the membrane elastically returns to its original shape without any openings therethrough. For example, membrane 1133 allows device optical fiber 1210 to pass therethrough, and when optical fiber 1210 is removed seals the opening in membrane 1133 formed by optical fiber 1210.

In some embodiments, however, membrane 1133 may be permanently pierced or ruptured by optical fiber 1210. In this aspect, cleaning assembly 1100 can be used in a single-use application. System 1300 may similarly have an optical fiber 1310 enclosed by a system membrane 1331. When cleaning assembly 1100 contacts system 1300, system membrane 1331 may compress to allow a portion of system optical fiber 1310 to extend through membrane 1331. In some embodiments, opening 1123 of pocket 1120 of cleaning assembly 1100 may also include a second membrane 1134. System optical fiber 1310 may pass through second membrane 1134 at opening 1123 of pocket 1120 to enter pocket 1120. Alternatively, device optical fiber 1210 may pierce or pass through both cleaning assembly membranes 1133, 1134 and further membrane 1331 enclosing system optical fiber 1310 to contact system optical fiber 1310.

Figure 35:
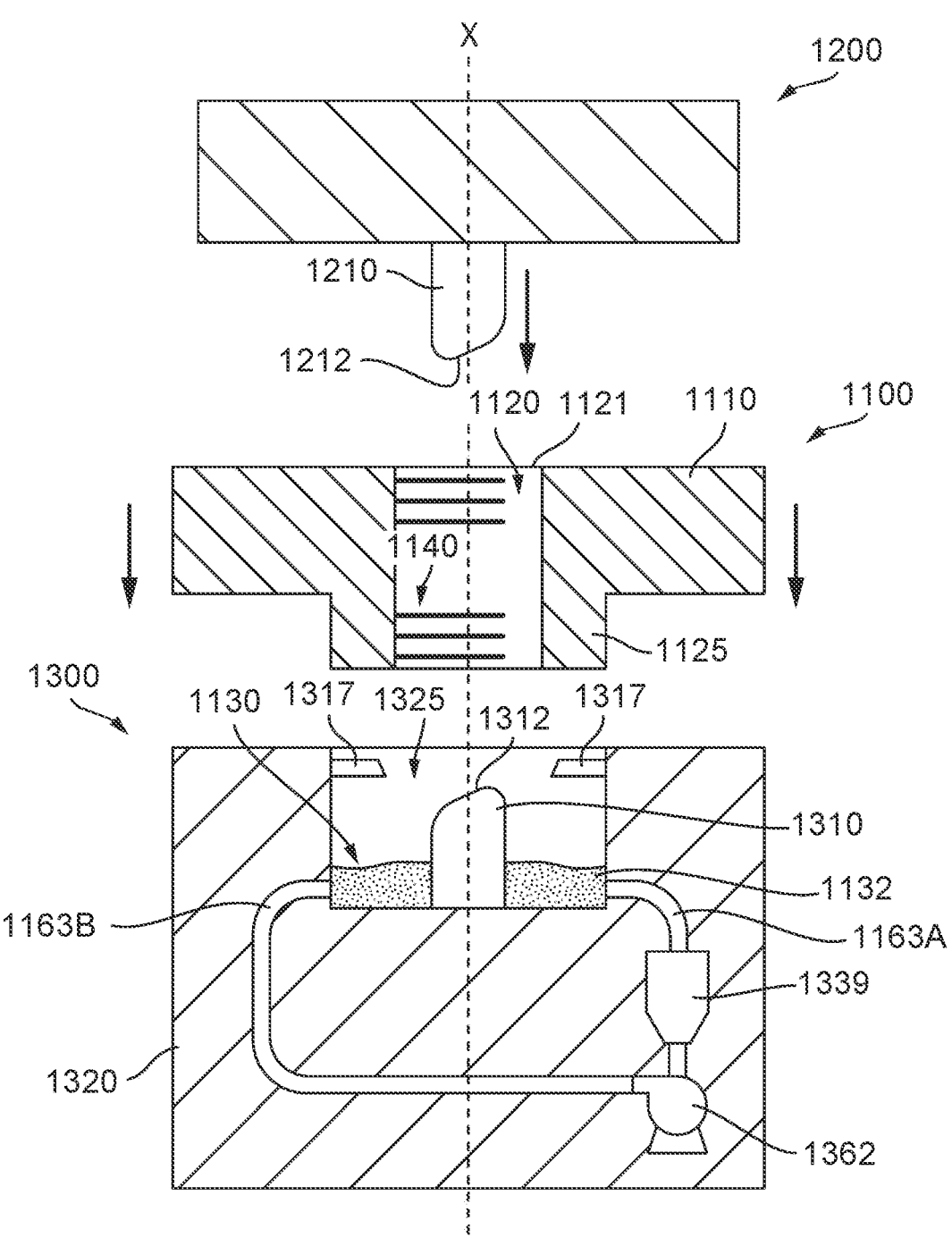
FIG. 35 shows a cross sectional view of an optical fiber cleaning assembly for cleaning two optical fibers, according to some embodiments.

FIG. 35 shows an optical fiber cleaning assembly 1100 according to some embodiments. System 1300 may include a main chassis 1320 and a system optical fiber 1310 arranged within a socket 1325 for connection to device 1200 and device optical fiber 1210. Optical fiber cleaning assembly 1100 may be formed in the same or similar manner as an optical fiber cleaning assembly 1100 described above and may include any of the various features as described above. For example, optical fiber cleaning assembly 1100 of FIG. 35 may include a pocket 1120 having a plurality of openings 1121, 1123 to allow optical fibers to enter pocket 1120, and may further include a cleaning structure 1140 for cleaning an optical fiber 1210, 1310 inserted into pocket 1120.

In some embodiments, socket 1325 may include positioning elements 1317. Positioning elements 1317 may be configured to align device optical fiber 1210 or optical fiber connector with system optical fiber 1310 or system optical fiber connector and align their respective fiber core(s). Further, positioning elements 1317 may help to control insertion depth of device optical fiber 1210 into socket 1325, such as to prevent over-insertion of device optical fiber 1210 into socket 1325 and too much pressure being applied by device optical fiber 1210 to system optical fiber 1310. Device 1200 may alternatively or additionally include positioning elements to prevent over insertion of device optical fiber 1210. In some embodiments, positioning elements may position device optical fiber 1210 within a small distance of system optical fiber 1310 such that there is a gap between the optical fibers 1210, 1310. The gap may be filled with index matching fluid 1132 that acts as a cleaning fluid and a soft barrier between optical fibers 1210, 1310.

In some embodiments, pocket 1120 of cleaning assembly 1100 may have a geometry configured to properly position device optical fiber 1210 with respect to system optical fiber 1310. For example, pocket 1120 may have a geometry such that device optical fiber 1210 is to be inserted into pocket 1120 in a particular orientation, and pocket 1120 may taper or narrow toward second opening 1123 in order to control insertion depth of optical fiber 1210.

The system 1300 rather than optical fiber cleaning assembly 1100 may include a reservoir 1130 for storing index matching fluid 1132, as shown in FIG. 35. Reservoir 1130 may be located within a socket 1325 so that device optical fiber 1210 and/or system optical fiber 1310 contact index matching fluid in socket 1325. Alternatively, reservoir 1130 can be located remotely from socket 1325 and can be in fluid communication with socket 1325 to provide index matching fluid 1132 to socket 1325 for application to device optical fiber 1210 and/or system optical fiber 1310.

Index matching fluid 1132 may be circulated through a filtration system to remove particulate matter removed from optical fibers 1210 and/or 1310. A pump 1362 causes used fluid to exit socket 1325 and pass through a conduit 1163A to filter 1339. Filter 1339 is configured to remove particulate matter from the index matching fluid. Filter 1339 may have pores or openings sized to prevent passage of particulate matter therethrough while allowing index matching fluid to flow therethrough. In such embodiments, filter 1339 may include a sieve or mesh screen. Alternatively, filter 1339 may include a membrane configured to allow index matching fluid 1132 to pass therethrough while preventing particulate matter from passing therethrough. The filtered index matching fluid is then circulated back to socket 1325 through a conduit 1163B. Filter 1339 may be removable for cleaning or replacement. A pump 1362, such as a positive displacement pump, e.g., a piston pump, may be provided for driving a flow of index matching fluid in the filtration system. However, in some embodiments, used index matching fluid may simply be removed from system 1300 in addition to or rather than being filtered, such as by a filter unit 1339.

Figure 36:
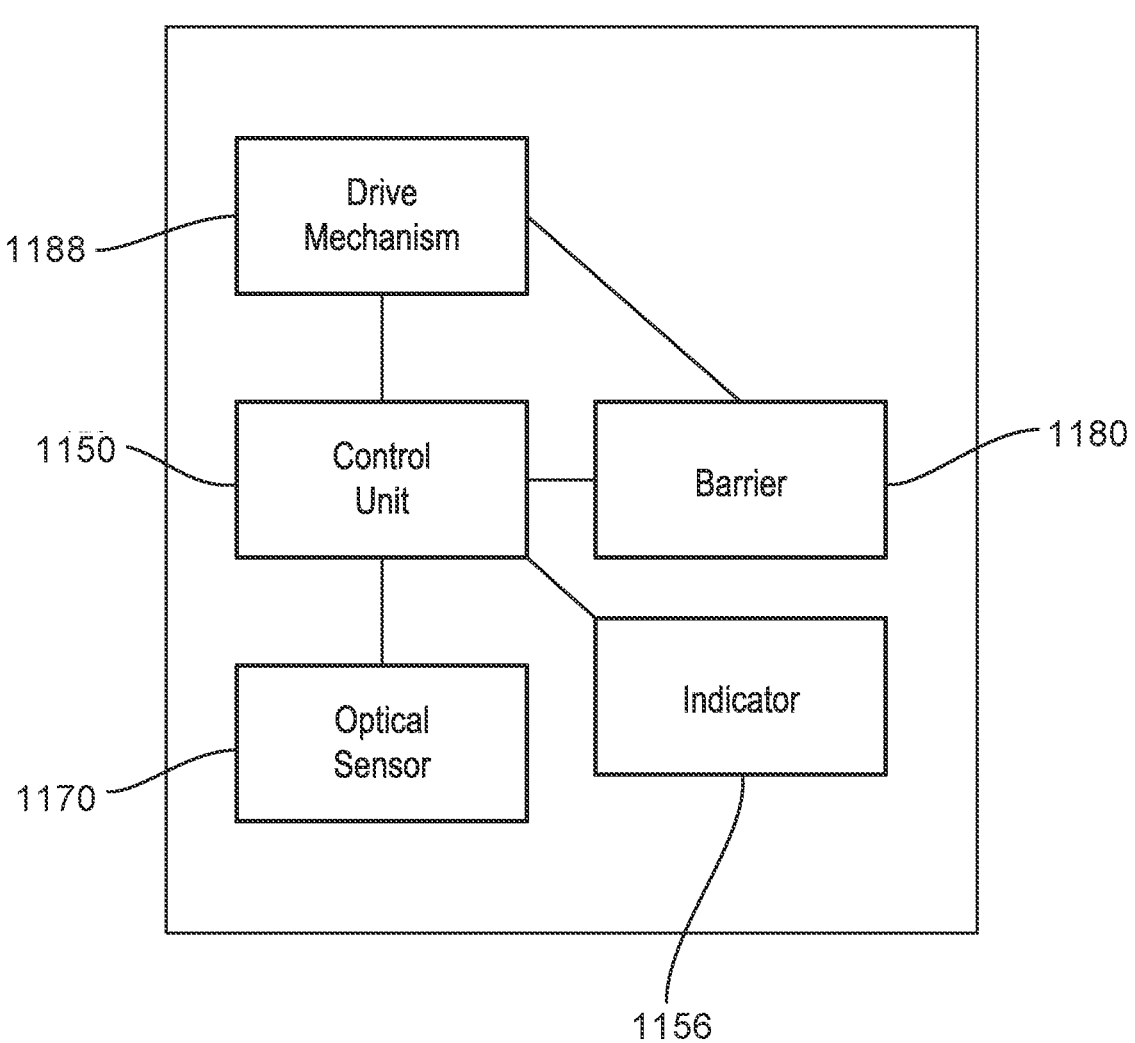
FIG. 36 shows a schematic view of components of a system, according to some embodiments.

FIG. 36 shows a schematic diagram of components of assembly system 1300 according to some embodiments. System 1300 may be configured to detect particulate matter. For example, system 1300 may include an optical sensor 1170 configured to detect the presence of particulate matter on a face of an optical fiber. Optical sensor 1170 may be in communication with a control unit 1150, such that control unit 1150 receives information from optical sensor 1170 and determines if particulate matter is present. Control unit 1150 may further be in communication with a drive mechanism 1188 that moves a barrier 1180, such that if particulate matter is present, control unit 1150 may send instructions to actuate drive mechanism 1188 to move barrier 1180 to prevent an optical fiber from connecting with a system optical fiber. In this way, contamination of the system optical can be prevented without user intervention. Further, system 1300 may include an indicator 1156 (e.g., a display screen) configured to provide an indication if particulate matter is present on a face of an optical fiber as determined by optical sensors 1170.

In some embodiments, a control unit 1150 may have a processor and a memory that stores computer-executable instructions. The processor may be a single processor or a plurality of processors, and may include one or more cores. The memory may include random access memory (RAM), flash memory, or the like. Computer programs, also called computer control logic, may be stored in the memory. When executed, the computer programs enable the processor to implement the processes of the embodiments discussed herein. Control unit 1150 may be part of a system (e.g., system 1300), such that when optical fiber cleaning assembly 1100 is connected to system 1300, control unit 1150 of system 1300 controls operation of optical fiber cleaning assembly 100 and its components.

In some embodiments, optical sensor 1170 may be, for example, a camera. Optical sensor 1170 may capture an image of a face of an optical fiber, and control unit 1150 may compare the captured image to a baseline image of a clean face of an optical fiber. Alternatively, optical sensor 1170 may detect the outline of an object or dark regions on a fiber face, indicative of the presence of particulate matter. Control unit 1150 may further be programmed to recognize patterns or shapes corresponding to particulate matter.

In some embodiments, particulate matter may be detected by the use of optical signals from the first or second optical fibers to be connected. As particulate matter blocks light and may cause reflections, optical signals may be used to determine the presence of particulate matter on face of optical fiber. Optical signals can be used to detect a poor connection by measuring return loss, insertion loss, reflection at each connection from an interrogator of the system, such as a multi-core fiber interrogator. Particulate matter may also be detected by determining the registration quality for the sensor cores in an optical fiber connection. For example, light signals may be generated and transmitted through system optical fiber 1310 and system 1300, particularly the interrogator, may detect transmission issues, e.g., insertion loss or reflection, indicating that particulate matter is present on system optical fiber 1310.

In some embodiments, drive mechanism 1188 may be, for example, a rotary or linear actuator, and may be a servo-motor, such that drive mechanism 1188 is configured to cause a barrier 1180 to move between an extended and retracted positions. Barrier 1180 may be in the form of one or more gates. Barrier 1180 may be composed of a solid and rigid material to prevent an optical fiber from displacing or passing beyond barrier 1180.

In some embodiments, system 1300 and/or optical fiber cleaning assembly 1100 may include an indicator 1156 that is configured to indicate the presence of particulate matter on a face of an optical fiber, as discussed above with respect to FIG. 21. Indicator 1156 may be an indicator light, such as a light emitting diode (LED), arranged on housing 1110 to be readily viewed by a user. Alternatively or additionally, indicator 1156 may include an audio unit, such as a speaker, configured to emit or play an audible tone or alert to indicate that an optical fiber is clean (or conversely that the optical fiber is dirty). Alternatively or additionally, indicator 1156 may be a display screen of system 1300.

In some embodiments, one or more components, such as the barrier 1180, optical sensor 1170, drive mechanism 1188, and control unit 1150 may be arranged within optical fiber cleaning assembly 1100 rather than system 1300. For example, optical fiber cleaning assembly 1100 may provide a drive mechanism for operating a barrier 1180, and in some embodiments, barrier 1180 may be arranged within optical fiber cleaning assembly 1100 rather than in the system 1300.

Figure 37:
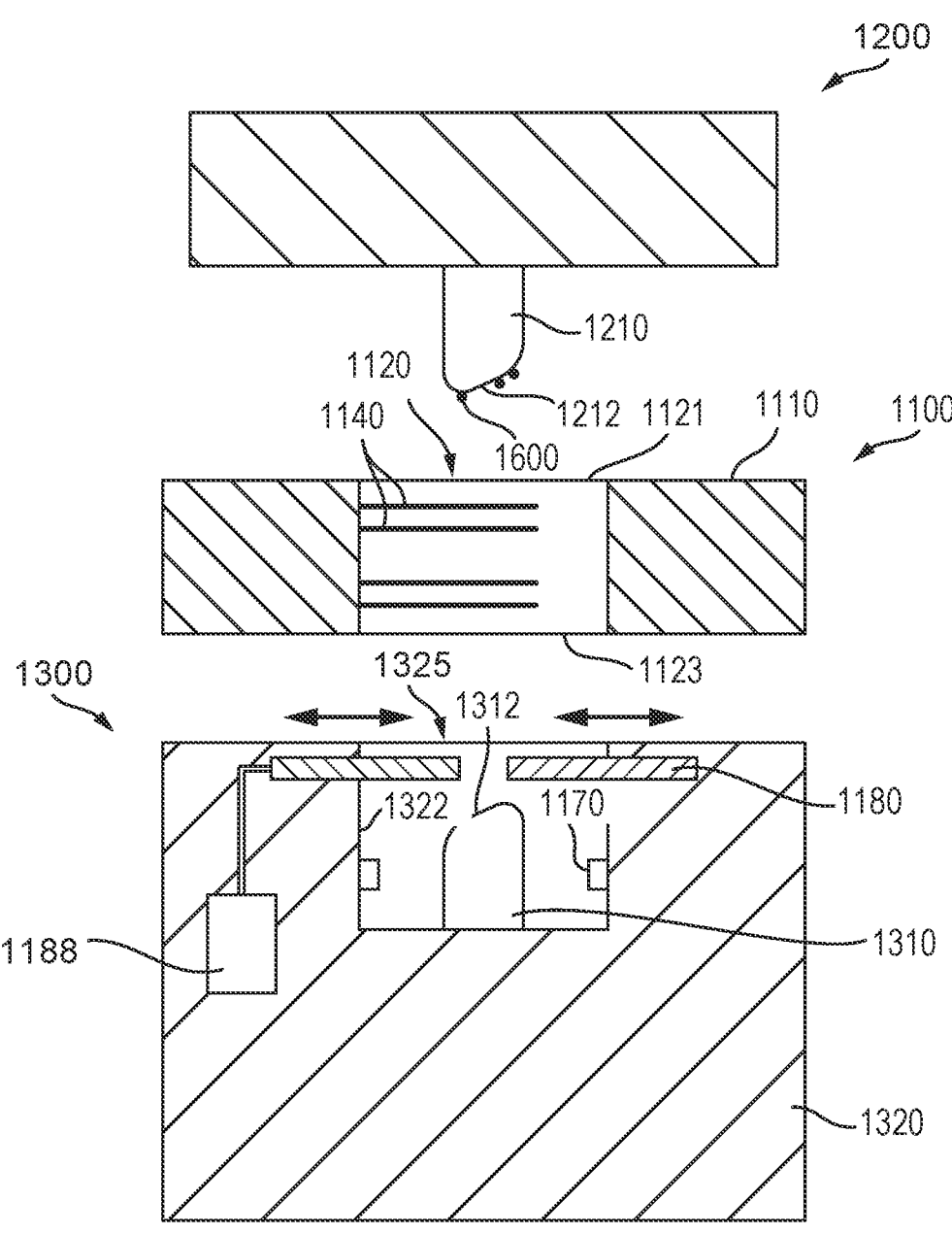
FIG. 37 shows a cross sectional view of an optical fiber cleaning assembly for cleaning two optical fibers, according to some embodiments.

FIG. 37 shows a partial cross-sectional view of an optical fiber cleaning assembly 1100 and a system 1300 having a barrier 1180 according to some embodiments. System 1300 may include a barrier 1180 arranged within socket 1325, wherein barrier 1180 is movable from a retracted position that allows a device optical fiber 1210 to be inserted into socket 1325 to an extended position in which device optical fiber 1210 is prevented from contacting system optical fiber 1310 arranged within socket 1325. Barrier 1180 may move in a direction transverse to a longitudinal axis of socket 1325 and may extend from inner walls of socket 1325 to cause a narrowing of socket 1325 at a location of barrier 1180. Barrier 1180 may extend entirely across socket 1325, or barrier 1180 may extend only partially across socket 1325. When barrier 1180 is extended partially into socket 1325, as shown in FIG. 37, one or more optical sensors 1170 arranged within socket 1325 may be used to detect the presence of particulate matter 1600 on a face 1212 of a device optical fiber 1210. Barrier 1180 may be controlled by control unit 1150 (e.g., as shown in FIG. 36), and control unit 1150 may activate a drive mechanism 1188 that causes barrier 1180 to extend or retract based on whether particulate matter 1600 is detected. If no particulate matter 1600 is detected by optical sensor 1170, control unit 1150 may cause barrier 1180 to move to the retracted position so that device optical fiber 1210 may advance toward and connect with system optical fiber 1310. If particulate matter 1600 is detected on optical fiber 1210, control unit 1150 may activate the drive mechanism 1188 to cause barrier 1180 to move to the extended position to prevent connection of optical fibers 1210, 1310. Barrier 1180 may also be designed to block mating of other engagement and/or latch features of the device and system interface before contact of the optical fiber faces with the barrier 1180.

In some embodiments, barrier 1180 may remain open for a predetermined period of time to allow connection of optical fibers. If device optical fiber 1210 is not connected to system optical fiber 1310 within the predetermined period of time, barrier 1180 may close to prevent the connection, and the device optical fiber 1210 may need to be reinserted and/or cleaned before connecting with system optical fiber 1310. The predetermined period of time, may be for example, 30 seconds. Closing barrier 1180 after a predetermined period of time may help to prevent contamination of the system optical fiber 1310, such as if additional particulate matter 1600 deposits onto device optical fiber 1210 or particulate matter enters through the opening of the pocket 1120.

Figure 38:
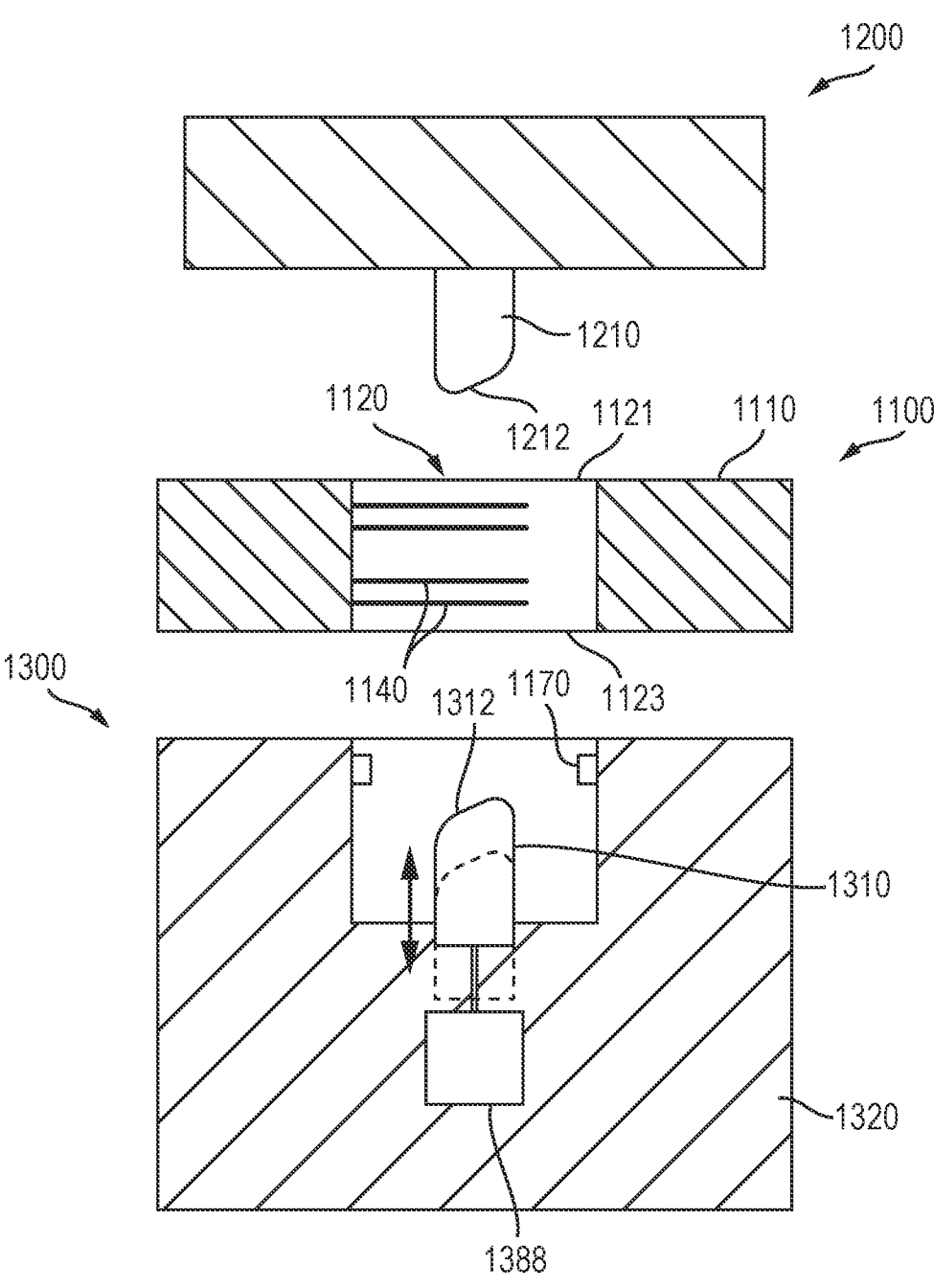
FIG. 38 shows a cross sectional view of an optical fiber cleaning assembly for cleaning two optical fibers, according to some embodiments.

FIG. 38 shows an embodiment in which system optical fiber 1310 is retractable. Similar to FIG. 37, system 1300 may be configured to prevent contact of system optical fiber 1310 with a device optical fiber 1210. In such embodiments, system optical fiber 1310 may be movable along a longitudinal axis of socket 1325 into an extended position or a retracted position. In the retracted position, system optical fiber 1310 may be fully or partially retracted into chassis 1320 of system 1300. System optical fiber 1310 may be moved via a drive mechanism 1388 of system 1300, such as a motor or linear actuator. When optical sensors 1170 detect particulate matter on device optical fiber 1210, system optical fiber 1310 may be in the retracted position to prevent device optical fiber 1210 from contacting system optical fiber 1310. When no particulate matter is detected by sensors 1170, system optical fiber 1310 may be moved by drive mechanism 1388 to the extended position to allow contact with face 1212 of device optical fiber 1210.

Figure 39:
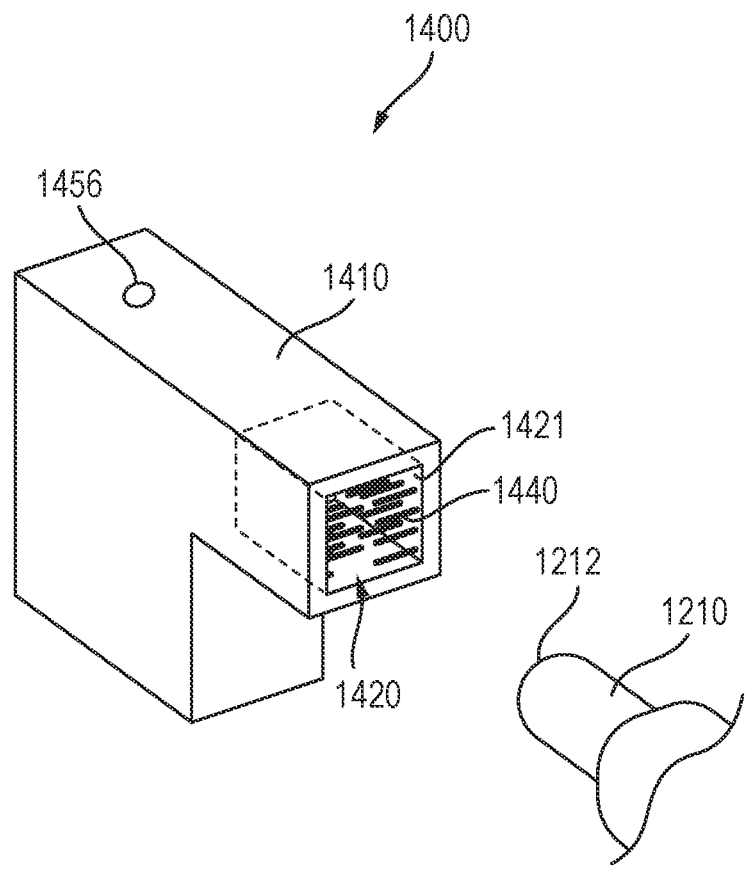
FIG. 39 shows a perspective view of an optical fiber cleaning assembly, according to some embodiments.

FIG. 39 shows a perspective view of an optical fiber cleaning assembly 1400 according to some embodiments. Optical fiber cleaning assembly 1400 may be used to clean a face 1212 of a single optical fiber 1210. Prior to connecting a first optical fiber 1210 to a second optical fiber, optical fiber cleaning assembly 1400 can be used to clean first optical fiber 1210. Optical fiber cleaning assembly 1400 may subsequently be used to clean the second optical fiber. The cleaned optical fibers can then be connected.

Optical fiber cleaning assembly 1400 may include a housing 1410 having a pocket 1420 for receiving optical fibers. Housing 1410 of optical fiber cleaning assembly 1400 may have any of various shapes and geometries, as discussed above with respect to optical fiber cleaning assembly 1100. Optical fiber cleaning assembly 1400 may include a pocket 1420 formed as a recessed area or cavity in housing 1410 that defines an interior volume. Pocket 1420 may be large enough to receive an optical fiber for cleaning. Pocket 1420 may include a single opening 1421. A cleaning structure 1440 may be arranged within pocket 1420 for cleaning a face 1212 of an optical fiber 1210 inserted into pocket 1420. In some embodiments, optical fiber cleaning assembly 1400 may include an indicator 1456, such as an indicator light configured to indicate whether particulate matter is present on face 1212 of optical fiber 1210, as discussed above with respect to indicator 1156.

Figure 40:
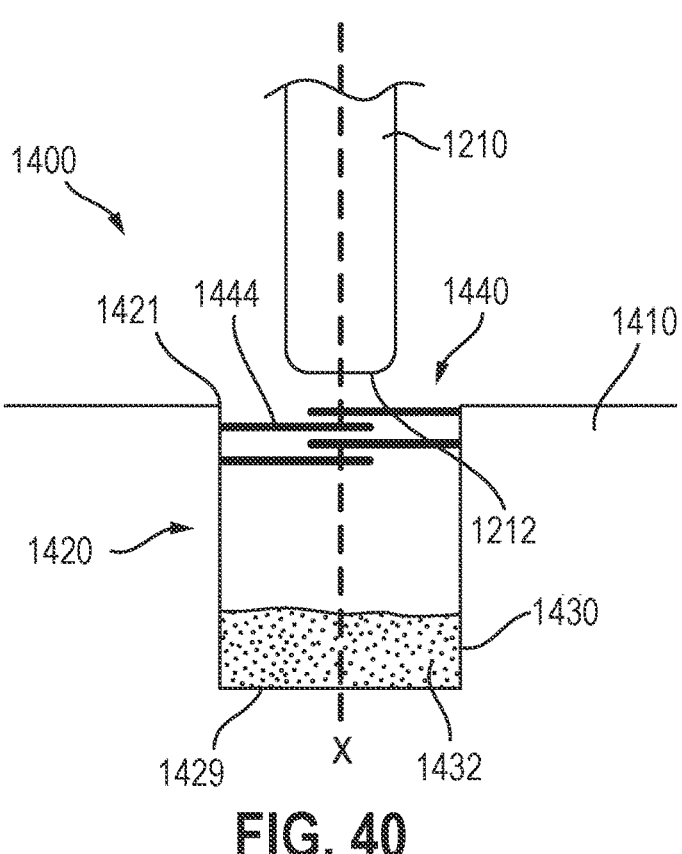
FIG. 40 shows a partial cross sectional view of an optical fiber cleaning assembly having movable gates, according to some embodiments.
Figure 41:
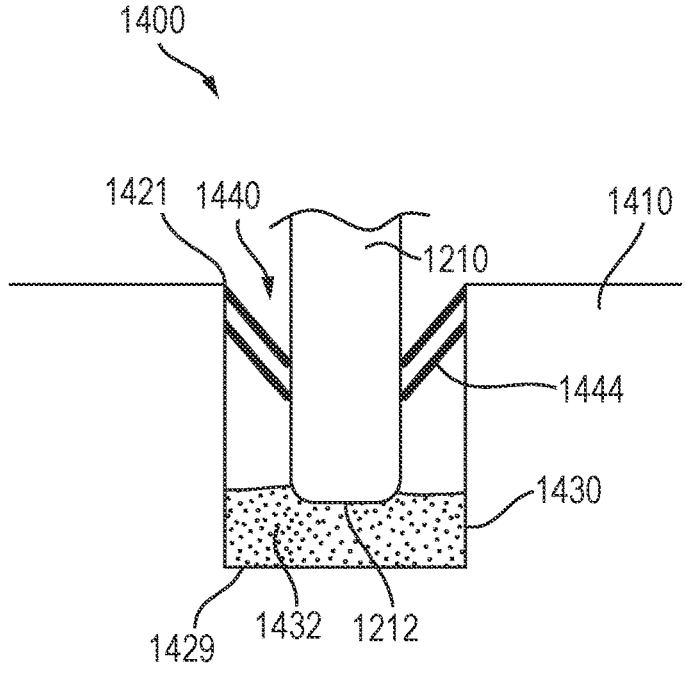
FIG. 41 shows optical fiber cleaning assembly of FIG. 40 in another position.

FIGS. 40 and 41 show partial views of an optical fiber cleaning assembly 1400 according to some embodiments. Optical fiber cleaning assembly 1400 may include a reservoir 1430 containing an index matching fluid 1432. Reservoir 1430 may be enclosed within housing 1410 of optical fiber cleaning assembly 1400. In some embodiments, reservoir 1430 may be located within pocket 1420 so that when an optical fiber 1210 is inserted into pocket 1420, optical fiber 1210 contacts index matching fluid 1432 within reservoir 1430. In some embodiments, reservoir 1430 may be located remotely from pocket 1420, and index matching fluid 1432 may be supplied to pocket 1420 via a conduit, as previously discussed. In such embodiments, reservoir 1430 may be enclosed within housing 1410 but may be separated from pocket 1420. Optical fiber cleaning assembly 1400 may be reusable, and reservoir 1430 can be removed from optical fiber cleaning assembly 1400 and replaced.

Cleaning structure 1440 of optical fiber cleaning assembly 1400 may be formed as described above with respect to cleaning structure 1140 of optical fiber cleaning assembly 1100. In FIGS. 40 and 41, cleaning structure 1440 is shown as movable gates 1444. Movable gates 1444 may be rigid and maintain their shape when contacted by an optical fiber. Movable gates 1444 may cover a portion of an opening of pocket 1420. Movable gates 1444 may extend from inner walls 1422 of pocket 1420 along an axis that is transverse to a longitudinal axis X of pocket 1420. Movable gates 1444 may be movable from a closed position in which movable gates 1444 partially or fully cover opening 1421 of pocket 1420, to an open position in which movable gates 1444 rotate or pivot inwardly toward a lower end 1429 of pocket 1420 to allow optical fiber 1210 to enter pocket 1420. In some embodiments, movable gates 1444 might only partially cover opening 1421 of pocket 1420 to facilitate entry of optical fiber 1210 into pocket 1420. Alternatively, movable gates 1444 may fully cover opening 1421 of pocket 1420.

Movable gates 1444 may be connected to inner walls 1422 of pocket 1420 via hinges. Alternatively, movable gates 1444 may be fixed to inner walls 1422 without hinges. In some embodiments, movable gates 1444 may be made from a flexible material, and movable gates 1444 may bend when optical fiber 1210 is inserted into pocket 1420. In some embodiments, movable gates 1444 may be biased in the closed position, such as by a spring or other biasing mechanism. By maintaining movable gates 1444 in the closed position, movable gates 1444 may help to prevent particulate matter from entering pocket 1420 when optical fiber cleaning assembly 1400 is not in use. When a face 1212 of an optical fiber 1210 is inserted into pocket 1420 for cleaning, face 1212 may contact movable gates 1444 to move gates 1444 into an open position (e.g., as shown in FIG. 41). When gates 1444 are biased toward the closed position, gates 1444 may remain in contact with optical fiber 1210 and wipe face 1212 of optical fiber 1210 as optical fiber 1210 is inserted into pocket 1420. When inserted into pocket 1420, face 1212 of optical fiber 1210 can contact index matching fluid 1432 within pocket 1420. Index matching fluid 1432 may be stored in a reservoir 1430 within pocket 1420, or reservoir 1430 may be remote from pocket 1420 and supplied to pocket 1420 via a conduit as described above for example with respect to FIG. 23.

Figure 42:
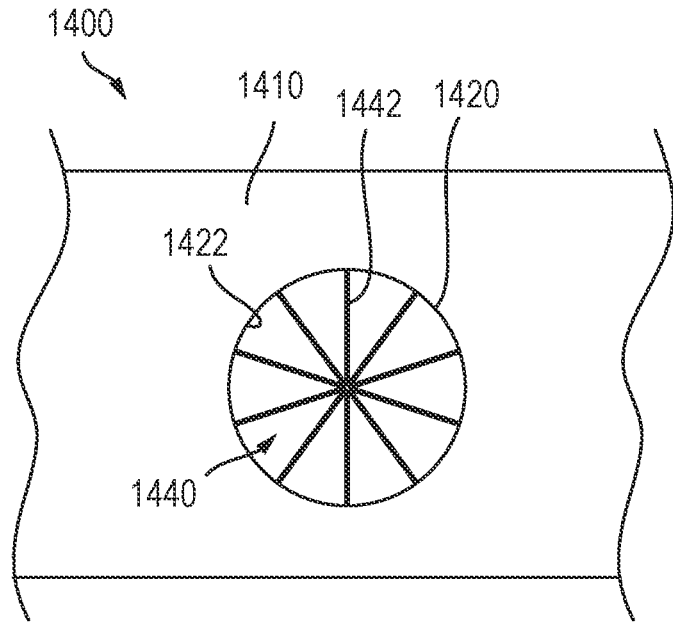
FIG. 42 shows a top-down view of a pocket of an optical fiber cleaning assembly, according to some embodiments.

FIG. 42 shows a top-down view of a pocket 1420 of an optical fiber cleaning assembly according to some embodiments. For example, where pocket 1420 has a circular transverse cross sectional area, cleaning structure 1440 may include wipers 1442 that extend radially from inner wall 1422 toward a center of pocket 1420.

Figure 43:
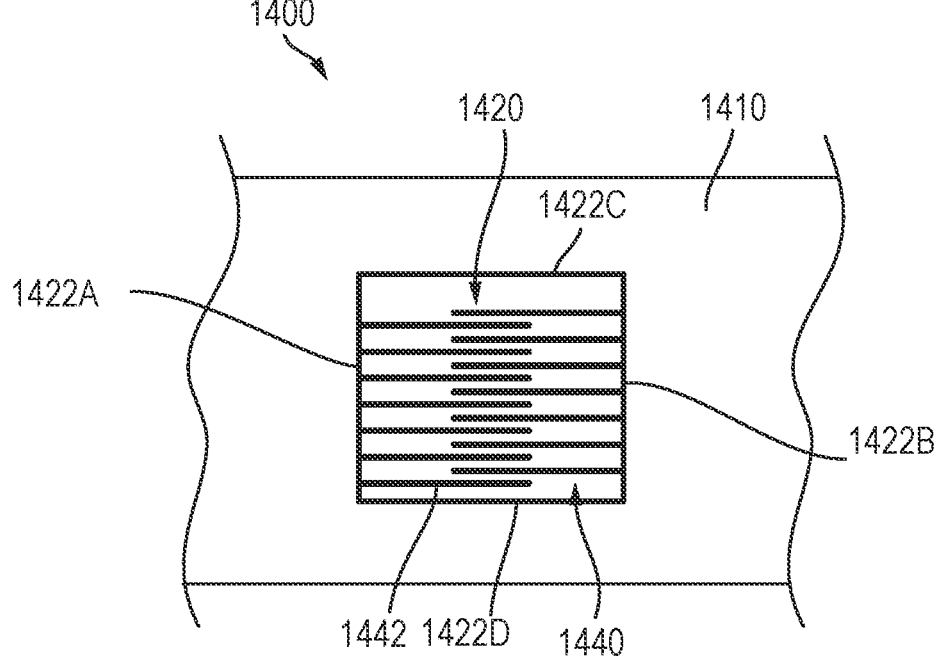
FIG. 43 shows a top-down view of a pocket of an optical fiber cleaning assembly, according to some embodiments.

FIG. 43 shows another top-down view of a pocket 1420 of an optical fiber cleaning assembly according to some embodiments. For example, where pocket 1420 has a rectangular (e.g., square) transverse cross sectional area, wipers 1442 may extend from opposing walls 1422A, 1422B, as shown in FIG. 43. Alternatively, wipers 1442 may extend from the four walls 1422A, 1422B, 1422C, and 1422D of pocket 1420 or extend from a single wall of pocket 1420. Thus, when an optical fiber 1210 is inserted into pocket 1420, wipers 1442 may brush against face 1212 of optical fiber 1210 to remove particulate matter. In addition, optical fiber 1210 can contact index matching fluid 1432 within reservoir 1430 of pocket 1420. Index matching fluid 1432 may coat face 1212 of optical fiber 1210 and may carry away particulate matter from face 1212 of optical fiber 1210. Wipers 1442 may again brush optical fiber 1210 as optical fiber 1210 is withdrawn from pocket 1420.

Figure 44:
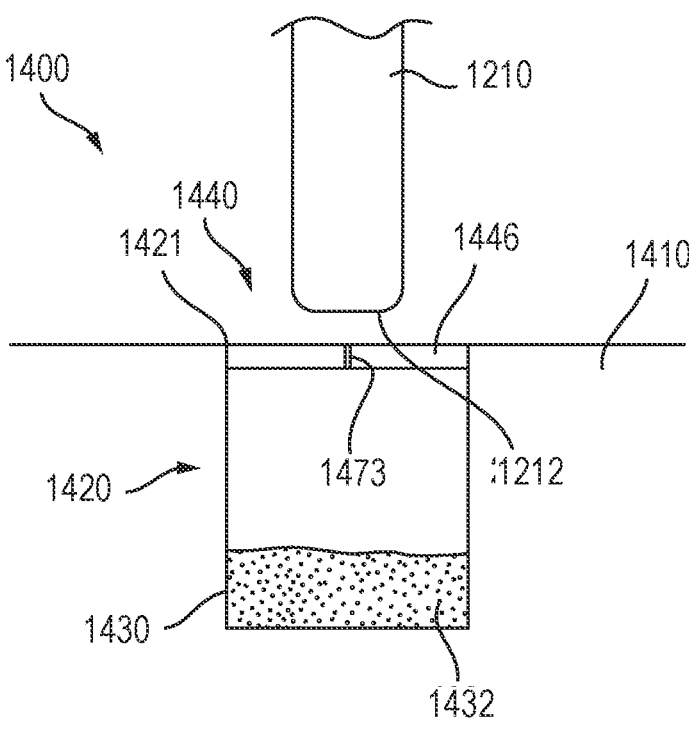
FIG. 44 shows a partial cross sectional view of an optical fiber cleaning assembly having a membrane, according to some embodiments.
Figure 45:
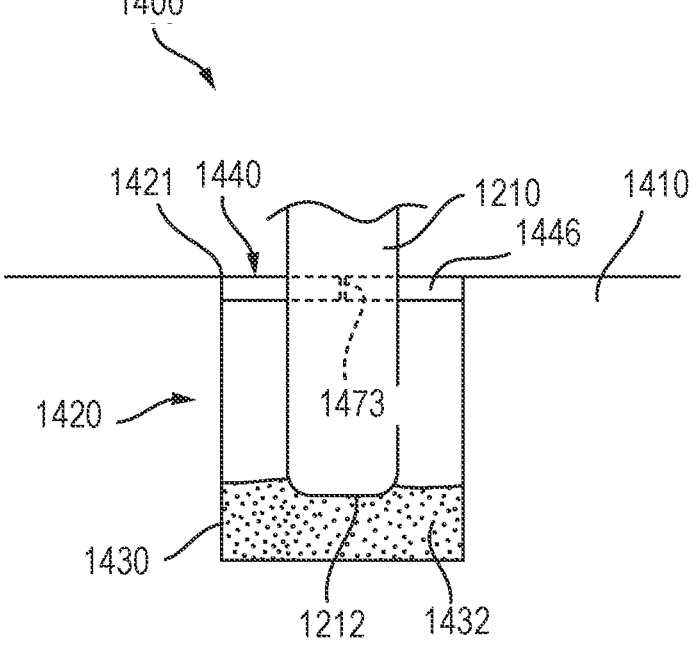
FIG. 45 shows a partial cross sectional view of the optical fiber cleaning assembly of FIG. 24.

FIGS. 44 and 45 show partial cross sectional views of an optical fiber cleaning assembly having a membrane 1446 according to some embodiments. Membrane 1446 may serve as a cleaning structure 1440, or membrane 1446 may be used in combination with another type of cleaning structure 1440, such as movable gates 1444 as described above. Membrane 1446 may fully cover opening 1421 of pocket 1420, and thus membrane 1446 may help to prevent particulate matter from entering pocket 1420 when optical fiber cleaning assembly 1400 is not being cleaned. Membrane 1446 may be a self-healing membrane and may include a slit 1473 to facilitate passage of an optical fiber through membrane 1446.

Figure 46:
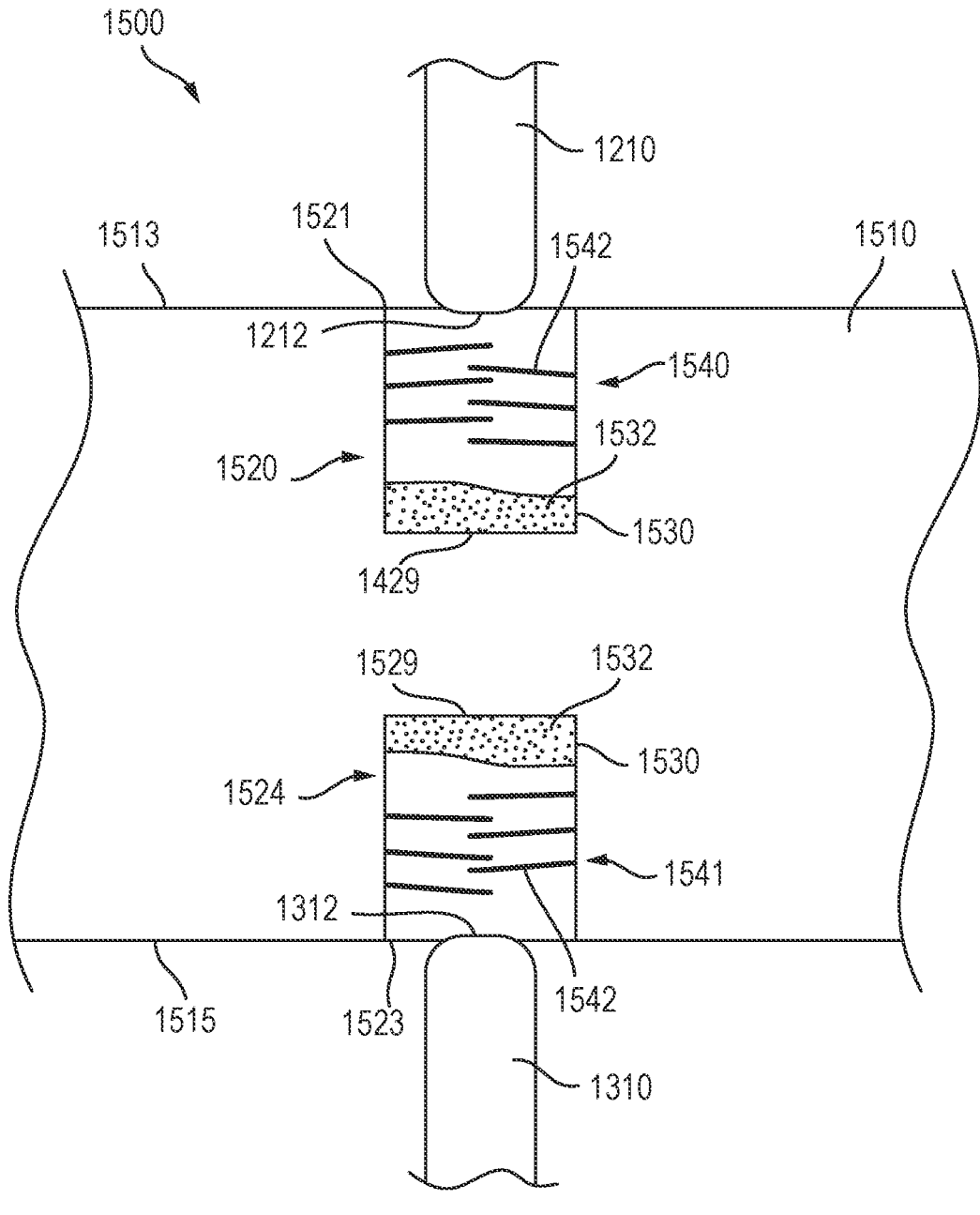
FIG. 46 shows a cross sectional view of an optical fiber cleaning assembly for cleaning two optical fibers, according to some embodiments.

FIG. 46 shows a cross sectional view of an optical fiber cleaning assembly for cleaning two optical fibers according to some embodiments. For example, optical fiber cleaning assembly 1500 may be configured to clean two optical fibers simultaneously. Cleaning both optical fibers simultaneously may help to reduce the time required for cleaning the optical fibers, which may promote cleaning of optical fibers. Optical fiber cleaning assembly 1500 differs from optical fiber cleaning assembly 1100 of FIG. 22 or FIG. 23 in that optical fiber cleaning assembly 1500 does not allow first and second fibers to be connected within optical fiber cleaning assembly 1500. Two optical fibers may be cleaned simultaneously using cleaning assembly 1500, and the two optical fibers may be removed and connected outside of the cleaning assembly 1500.

Housing 1510 of optical fiber cleaning assembly 1500 may include a first pocket 1520 for receiving a first optical fiber 1210 and a second pocket 1524 for receiving a second optical fiber 1310. Opening 1521 of first pocket 1520 may be arranged on a first side 1513 of housing 1510 and opening 1523 of second pocket 1524 may be arranged on a second side 1515 of housing 1510. In some embodiments, first pocket 1520 and second pocket 1524 can both be positioned on the same side of housing 1510 (e.g., first side 1513 or second side 1515). In some embodiments, first side 1513 of housing 1110 is opposite second side 1515 of housing 1510, as shown in FIG. 46. Further, a longitudinal axis of first pocket 1520 may be aligned with a longitudinal axis of second pocket 1524.

First pocket 1520 of optical fiber cleaning assembly 1500 may include a first cleaning structure 1540 for cleaning a first optical fiber 1210 and second pocket 1524 may include a second cleaning structure 1541 for cleaning a second optical fiber 1310. Each pocket 1520, 1524 may include a reservoir 1530 containing an index matching fluid 1532 for cleaning a respective face 1212, 1312 of an optical fiber 1210, 1310 and for applying a coat of index matching fluid 1532 to a respective face 1212, 1312 of optical fiber 1210, 1310. In some embodiments, index matching fluid 1532 may be a gel or may have sufficient viscosity such that index matching fluid 1532 is retained within reservoir 1530. In some embodiments, index matching fluid 1532 may be held in a sponge or other porous substrate, such that the porous substrate may wet an optical fiber that comes into contact therewith. Further, in some embodiments, pocket 1520, 1524 and/or reservoir 1530 may include a membrane (not shown) that allows passage of an optical fiber into reservoir 1530 while inhibiting the escape of fluid 1532 from reservoir 1530. In some embodiments, reservoir 1530 may be arranged within each pocket 1520, 1524, such as at a lower end 1527, 1529 of each pocket 1520, 1524. However, in some embodiments, a reservoir 1530 may be located remotely from either pocket 1520, 1524, and a conduit may supply index matching fluid 1532 from reservoir 1530 to each pocket 1520, 1524.

PARTS LIST

1100—optical fiber cleaning assembly
1110—housing
1113—first side
1115—second side
1117—positioning element
1119—gap 1120—pocket
1121—first opening
1122—inner walls
1122A—inner wall
1122B—inner wall
1122C—inner wall
1122D—inner wall
1123—second opening
1125—seal
1129—lower end
1130—reservoir
1131—nozzle
1132—index matching fluid
1133—membrane
1134—membrane
1135—alignment sleeve
1140—cleaning structure
1141—proximal end
1142—wiper
1143—distal end
1144—gate
1146—membrane
1148—petal
1149—strips
1150—control unit
1156—indicator
1160—pump
1163—conduit
1163A—conduit
1163B—conduit
1165—actuator
1166—pump
1170—optical sensor
1173—slit
1180—barrier
1188—drive mechanism
1192—first connector
1200—device
1203—surface
1210—first optical fiber
1212—face
1218—etalon
1220—connector
1232—membrane
1250—housing
1300—system
1310—optical fiber
1312—face
1317—positioning elements
1320—chassis
1325—socket
1331—membrane
1339—filter
1360—drive mechanism
1362—pump
1388—drive mechanism
1392—connector
1400—optical fiber cleaning assembly
1410—housing
1420—pocket
1421—opening
1422—inner wall
1429—lower end
1430—reservoir
1432—index matching fluid
1440—cleaning structure
1442—wipers 1444—wipers
1446—membrane
1456—indicator
1473—slit
1500—optical fiber cleaning assembly
1510—housing
1513—first side
1515—second side
1520—pocket
1521—opening
1523—opening
1524—pocket
1527—lower end
1529—lower end
1530—reservoir
1532—index matching fluid
1540—cleaning structure
1541—cleaning structure
1600—particulate matter The technology described below generally relates to methods and apparatuses for reducing particle formation at a non-permanent optical fiber connection joint. Various medical systems may include optical fiber connectors configured to receive an optical fiber connector positioned on one or more modular medical instruments. To aid insertion of the optical fiber connectors, the system connectors may be configured to reduce friction or otherwise reduce particle generation during connection/disconnection of the connectors. Reducing or preventing particle generation during installation can reduce the potential of damage to the optical fibers of the system and can allow the ends of the optical fibers to make a proper and complete connection.

The present disclosure describes various instruments and portions of instruments in terms of their state in three-dimensional space. As used herein, the term position refers to the location of an object or a portion of an object in a three-dimensional space (e.g., three degrees of translational freedom along Cartesian X, Y, and Z coordinates). As used herein, the term orientation refers to the rotational placement of an object or a portion of an object (e.g., three degrees of rotational freedom, such as roll, pitch, and yaw). As used herein, the term pose refers to the position of an object or a portion of an object in at least one degree of translational freedom and to the orientation of that object or portion of the object in at least one degree of rotational freedom (e.g., up to six total degrees of freedom). As used herein, the term shape refers to a set of poses, positions, or orientations measured along an object.

Figure 47A:
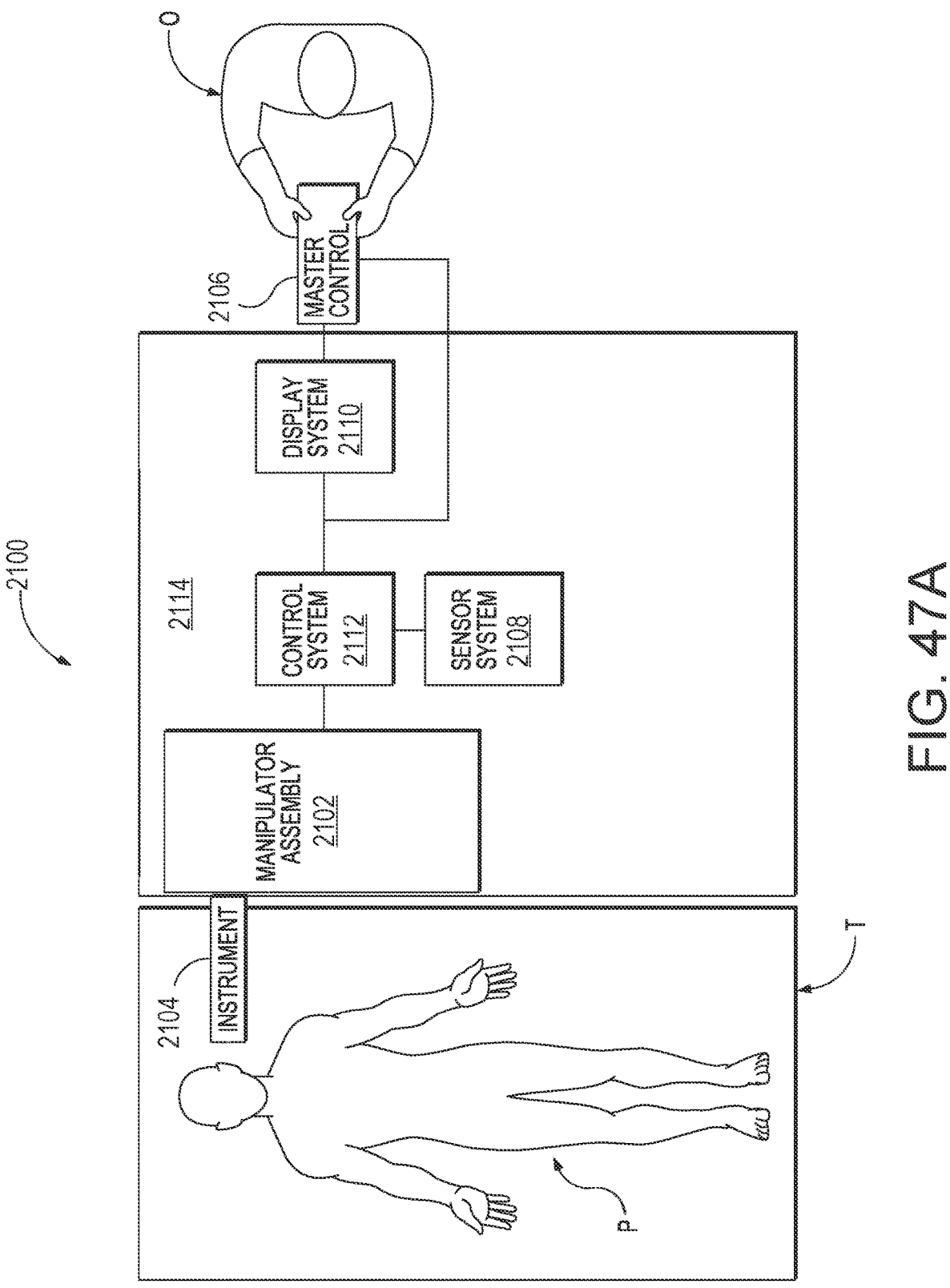
FIG. 47A is a simplified diagram of a medical system configured in accordance with an embodiment of the present technology.
Figure 47B:
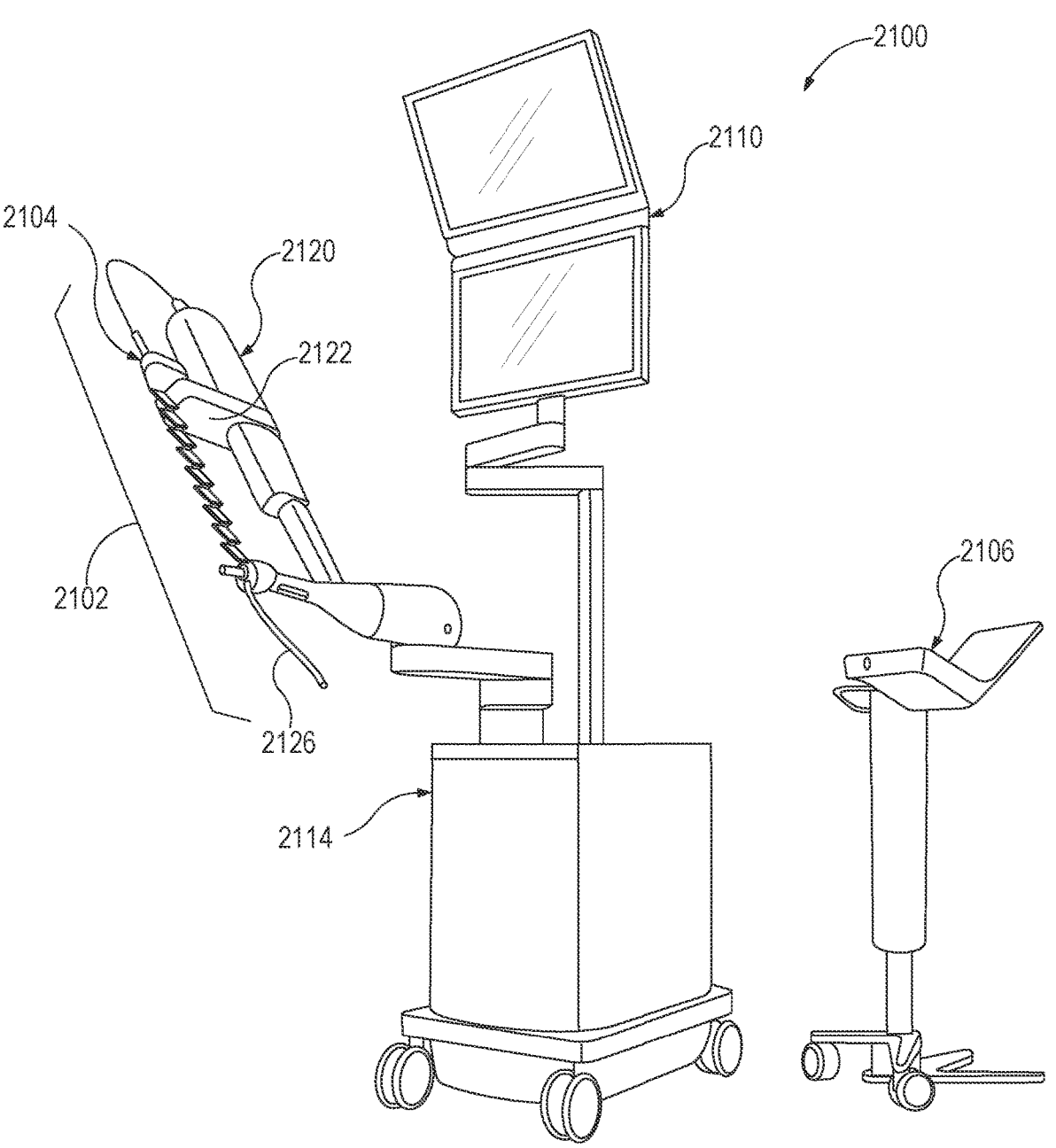
FIG. 47B is a perspective view of a structural representation of the medical system of FIG. 1A.

FIG. 47A is a simplified diagram of a medical system ("system 2100") and FIG. 47B is a perspective view of the system 2100 configured in accordance with embodiments of the present technology. The system 2100 may be suitable for use in surgical, diagnostic, therapeutic, or biopsy procedures, among others. While some embodiments of the system 2100 are described herein with respect to such procedures, references to specific medical or surgical instruments and medical or surgical methods is not intended to limit the scope of the present technology. The systems, instruments, and methods described herein may be used for humans, animals, human cadavers, animal cadavers, portions of human or animal anatomy, and/or non-surgical diagnosis, as well as industrial systems and general robotic or teleoperational systems.

As shown in FIGS. 47A and 47B, the system 2100 generally includes a manipulator assembly 2102 having an instrument manipulator 2120 (see FIG. 47B) to manipulate a medical instrument 2104 while performing various procedures on a patient P. The manipulator assembly 2102 may be teleoperated, non-teleoperated, or a hybrid teleoperated and non-teleoperated assembly with select degrees of freedom of motion that may be motorized and/or teleoperated, and select degrees of freedom of motion that may be non-motorized and/or non-teleoperated. The manipulator assembly 2102 can be mounted to an operating table T, or to a main support 2114 (e.g. a movable cart, stand, second table, etc.). The system may include a master control 2106 configured to allow an operator O (e.g., a surgeon, clinician, physician, etc.) to view the interventional site and to control the manipulator assembly 2102.

The master control 2106 of the system 2100 may be located near or in the same room as the operating table T. In some embodiments, for example, the master control 2106 is positioned near the side of a surgical table T on which the patient P is located. However, it should be understood that the operator O can be located in a different room or any distance away from the patient P. The master control 2106 generally includes one or more input and control devices (not shown) for controlling the medical instrument 2104 via the instrument manipulator 2120. The input and control devices may include any number of a variety of input devices, such as joysticks, trackballs, data gloves, trigger-guns, hand-operated controllers, voice recognition devices, body motion or presence sensors, etc. The input and control devices may be provided with the same degrees of freedom as the associated medical instrument to take advantage of the familiarity of the operator O in directly controlling like instruments. In this regard, the control devices may provide operator O with telepresence or the perception that the control devices are integral with the medical instruments. However, the input and control devices may have more or fewer degrees of freedom than the associated medical instrument 2104 and still provide operator O with telepresence. In some embodiments, the control devices may optionally be manual input devices that move with six degrees of freedom, and which may also include an actuatable handle for actuating instruments (e.g., for closing grasping jaws, applying an electrical potential to an electrode, delivering a medicinal treatment, etc.).

The input and control devices of the master control 2106 may include a scroll wheel and a trackball. In an example implementation of the system 2100, the scroll wheel may be rolled forwards or backwards in order to control the advancement or retraction of the medical instrument 2104 with respect to the patient anatomy, and the trackball may be rolled in various directions by the operator O to steer the position of the distal end portion and/or distal tip of the medical instrument 2104, e.g., to control bend or articulation. Various systems and methods related to motion control consoles are described in PCT Pub. No. 2019/027922 (filed Jul. 30, 2018, titled "Systems and Methods for Safe Operation of a Device"), and U.S. Patent Pub. No. 2019/0029770 (filed Jul. 30, 2018, titled "Systems and Methods for Steerable Elongate Device"), which are incorporated by reference herein in their entireties.

As shown in FIG. 47B, the instrument manipulator 2120 may be configured to support and manipulate the medical instrument 2104 with a kinematic structure of one or more non-servo-controlled links (e.g., one or more links that may be manually positioned and locked in place, generally referred to as a set-up structure (SUS)), and/or one or more servo-controlled links (e.g., one or more powered links that may be controlled in response to commands). The instrument manipulator 2120 may include a plurality of actuators or motors that drive inputs on the medical instrument 2104 in response to commands from a control system 2112. The actuators may include drive systems that when coupled to the medical instrument 2104 may advance the medical instrument 2104 into a naturally or surgically created anatomic orifice in the patient P. In some embodiments, the kinematic structure may be locked in place or unlocked to be manually manipulated by the operator O interacting with switches, buttons, or other types of input devices.

The instrument manipulator 2120 may be configured to position the medical instrument 2104 at an optimal position and orientation relative to patient anatomy or other medical devices. In this regard, drive systems may be included in the instrument manipulator 2120 to move the distal end of the medical instrument 2104 according to any intended degree of freedom, which may include three degrees of linear motion (e.g., linear motion along the X, Y, and/or Z Cartesian axes) and three degrees of rotational motion (e.g., rotation about the X, Y, and Z Cartesian axes). Additionally, the actuators can be used to actuate an articulable end effector (not shown) of the medical instrument 2104 for grasping tissue in the jaws of a biopsy device or the like. Actuator position sensors, such as resolvers, encoders, potentiometers, and other mechanisms, may provide sensor data to the system 2100 describing the rotation and orientation of the motor shafts of the instrument manipulator 2120. Such position sensor data may be used to determine motion of the objects manipulated by the actuators.

In some embodiments, the optimal location and orientation can include alignment of the manipulator assembly 2102 with respect to anatomy of the patient P, for example, to minimize friction of the medical instrument 2104 positioned within the anatomy of the patient P (e.g. in anatomical openings, patient vasculature, patient endoluminal passageways, etc.), or within medical devices coupled to patient anatomy (e.g. cannulas, trocars, endotracheal tubes (ETT), laryngeal esophageal masks (LMA), etc.). Optimal location and orientation of the manipulator assembly 2102 can additionally or alternatively include optimizing the ergonomics for the operator O by providing sufficient workspace and/or ergonomic access to the medical instrument 104 when utilizing various medical tools such as needles, graspers, scalpels, grippers, ablation probes, visualization probes, etc. with the medical instrument 2104.

Each adjustment of the manipulator assembly 2102 (e.g., insertion, rotation, translation, etc.) can be actuated by either robotic control or by manual intervention by the operator O. For example, each rotational or linear adjustment may be maintained in a stationary configuration using brakes. In this regard, depression of one or more buttons and switches releases one or more corresponding brakes, allowing the operator O to manually position the medical instrument 2104 through positioning of the instrument manipulator 2120. One or more adjustments may also be controlled by one or more actuators (e.g., motors) such that an operator may use a button or switch to actuate a motor to alter the manipulator assembly 2102 in a desired manner to position the manipulator assembly 2102 in the optimal position and orientation. In some embodiments, robotic control of the manipulator assembly 2102 can be actuated by activating a button or switch. In one example, one position of the button or switch may initiate powered rotation of the manipulator assembly 2102 in a first direction of rotation and another position of the button or switch may initiate powered rotation of the manipulator assembly 2102 in the other direction.

The manipulator assembly 2102 may be configured such that when a button or switch is activated, the operator O may adjust the instrument manipulator 2120 along a linear path that corresponds to inserting or retracting the medical instrument 2104. For safety purposes, the manipulator assembly 2102 might only be manually movable in one translation direction, such as retraction, and might not be manually movable in the direction of insertion of the medical instrument 2104, to prevent the operator O from inadvertently or undesirably advancing the medical instrument into the anatomy of the patient O.

As shown in FIG. 47A, the system 2100 may include a sensor system 2108 with one or more sub-systems for receiving information about the instruments coupled to the instrument manipulator 2120. Such sub-systems may include a position/location sensor system (e.g., an electromagnetic (EM) sensor system); a shape sensor system for determining the position, orientation, speed, velocity, pose, and/or shape of a distal end, and/or of one or more segments along a flexible body that may make up a portion of the medical instrument 2104; and/or a visualization system for capturing images from the distal portion of the medical instrument 2104, among other possible sensors.

Referring again to FIGS. 47A and 47B together, the system 2100 also may include a display system 2110 for displaying an image or representation of the surgical site and the medical instrument 2104 generated the sensor system 2108, recorded pre-operatively or intra-operatively. The display system 2110 may use image data from imaging technology and/or a real time image, such as by computed tomography (CT), magnetic resonance imaging (MRI), fluoroscopy, thermography, ultrasound, optical coherence tomography (OCT), thermal imaging, impedance imaging, laser imaging, nanotube X-ray imaging, endoscopic images, and the like, or combinations thereof. The pre-operative or intra-operative image data may be presented as two-dimensional, three-dimensional, or four-dimensional (including e.g., time based or velocity-based information) images and/or as images from models created from the pre-operative or intra-operative image data sets. The display system 2110 and the master control 2106 may be oriented such that the operator O can control the medical instrument 2104 and the master control 2106 with the perception of telepresence.

The display of visual indicators, markers, and or images on the display system 2110 may be altered by input devices (e.g., buttons, switches, etc.) on the manipulator assembly 2102 and/or the master control 2106. For example, actuating a button or switch can cause a marker to be placed in a rendered model of patient anatomy displayed on the display system 2110. The marker could correspond to an area within the patient at which a procedure (e.g., biopsy) has been performed, or otherwise indicate an actual location within the patient anatomy where the medical instrument has been positioned. Such a virtual navigational marker may be dynamically referenced with registered preoperative or concurrent images or models. Systems and methods for registration are provided in PCT Pub. No. WO 2016/191298 (published Dec. 1, 2016, titled "Systems and Methods of Registration for Image Guided Surgery"), and in U.S. Pat. No. 8,900,131 (filed May 13, 2011, titled "Medical System Providing Dynamic Registration of a Model of an Anatomic Structure for Image-Guided Surgery"), which are incorporated by reference herein in their entireties.

The control system 2112 may include at least one memory and at least one computer processor (not shown) for effecting control between the medical instrument 2104, the master control 2106, the sensor system 2108, and the display system 2110. The control system 2112 may also include programmed instructions, which may be stored on a non-transitory machine-readable medium, to implement some or all of the methods described in accordance with aspects of the present technology disclosed herein, including instructions for providing information to the display system 2110. The control system 2112 may include two or more data processing circuits with one portion of the processing optionally being performed on or adjacent to the manipulator assembly 2102, another portion of the processing being performed at the master control 2106, etc. The processors of the control system 2112 may execute instructions for the processes disclosed herein. Any of a wide variety of centralized or distributed data processing architectures may be employed. Similarly, the programmed instructions may be implemented as a number of separate programs or subroutines, or they may be integrated into a number of other aspects of the teleoperational systems described herein. In one embodiment, the control system 2112 supports wireless communication protocols, such as Bluetooth, IrDA, HomeRF, IEEE 802.11, DECT, Wireless Telemetry, and the like.

The control system 2112 may receive force and/or torque feedback from the medical instrument 2104. In response, the control system 2112 may transmit signals to the master control 2106. In some embodiments, the control system 2112 may transmit signals instructing one or more actuators of the manipulator assembly 2102 to move the medical instrument 2104. The medical instrument 2104 may extend into an internal surgical site within the body of patient P via openings in the body of patient P. Any suitable conventional and/or specialized actuators may be used with the manipulator assembly 2102. The one or more actuators may be separate from, or integrated with, the manipulator assembly 2102. In some embodiments, the one or more actuators and the manipulator assembly 2102 are provided as part of the main support 2114, which can be positioned adjacent to the patient P and the operating table T. In some embodiments, the manipulator assembly 2102, control system 2112, sensor system 2108, and display system 2110 may be supported by the main support 2114, or some or all of these components may be integrated into the main support 2114. Alternatively, one or more of these components may be mounted to the operating table T or integrated into the master control 2106.

The control system 2112 may further include a virtual visualization system to provide navigation assistance to the operator O when controlling the medical instrument 2104 during an image-guided surgical procedure. Virtual navigation using the virtual visualization system may be based upon reference to an acquired preoperative or intraoperative dataset of anatomic passageways. During a virtual navigation procedure, the sensor system 2108 may be used to compute an approximate location of the medical instrument 2104 with respect to the anatomy of the patient P. The location can be used to produce both macro-level tracking images (external to the anatomy of patient P) and virtual images (internal to the anatomy of patient P). The control system 2112 may implement one or more EM sensor, fiber optic sensors, and/or other sensors to register and display a medical implement together with preoperatively recorded surgical images, such as those from a virtual visualization system. For example, PCT Pub. No. WO 2016/191298 (published Dec. 1, 2016, titled "Systems and Methods of Registration for Image Guided Surgery"), which is incorporated by reference herein in its entirety, discloses one such system. Various systems and methods for monitoring the shape and relative position of an optical fiber in three dimensions are described in U.S. Pat. No. 7,781,724 (filed Sep. 26, 2006, titled "Fiber Optic Position and Shape Sensing Device and Method Relating Thereto"); U.S. Pat. No. 7,772,541 (filed on Mar. 12, 2008, titled "Fiber Optic Position and/or Shape Sensing Based on Rayleigh Scatter"); and U.S. Pat. No. 6,389,187 (filed on Jun. 17, 1998, titled "Optical Fiber Bend Sensor"), which are all incorporated by reference herein in their entireties.

The system 2100 may further include optional operations and support systems (not shown) such as illumination systems, steering control systems, irrigation systems, and/or suction systems. In some embodiments, the system 2100 may include more than one manipulator assembly and/or more than one master control. The exact number of teleoperational manipulator assemblies can be tailored for the surgical procedure to be performed and/or the space constraints within the operating room, among other factors. Multiple master controls may be collocated or positioned in separate locations. Multiple master controls allow more than one operator to control one or more teleoperational manipulator assemblies in various combinations.

The instrument manipulator 2120 can be configured to support and position an elongate device 2126 of the medical instrument 2104. Various elongate devices are described in PCT Pub. No. WO 2019/018736 (filed Jul. 20, 2018, titled "Flexible Elongate Device Systems and Methods"), which is incorporated by reference herein in its entirety.

The system 2100 may be configured to allow positioning of the display system 2110 and main support 2114 at a desired location relative to the operating table T and the patient P. Various systems and methods relating to a display system and a main support are described in PCT Pub. No. WO 2018/132386 (filed Jan. 9, 2018, titled "Systems and Methods for Using a Robotic Medical System"), which is incorporated by reference herein in its entirety. The main support 2114 may include hardware (e.g., processor(s), firmware, etc.) and/or or software to perform functions for performing shape-sensing with respect to a flexible elongate device.

Figure 48A:
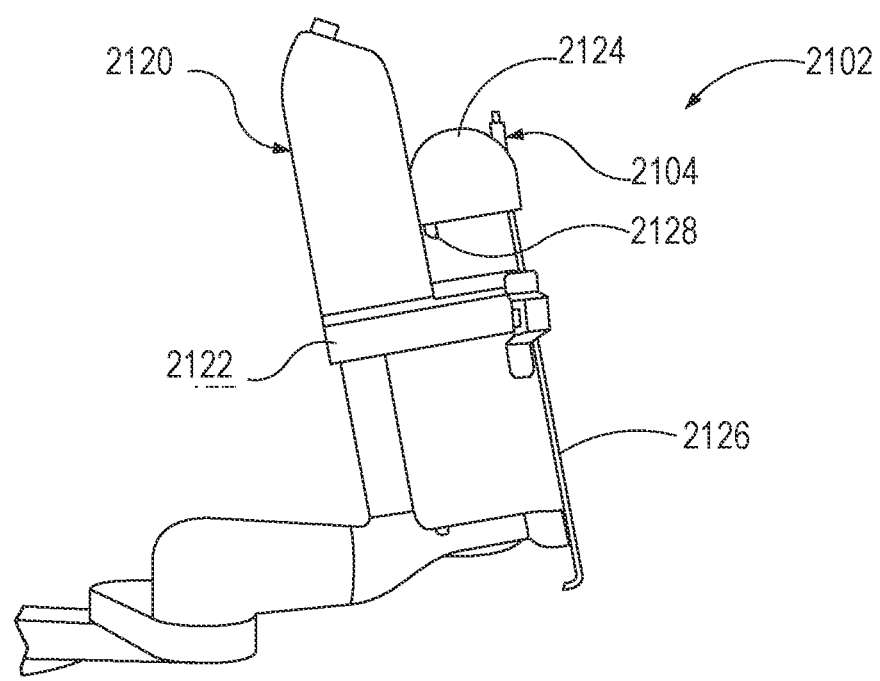
FIGS. 48A and 48B are left side views of a manipulator assembly and medical instrument of the medical system of FIG. 47B.
Figure 48B:
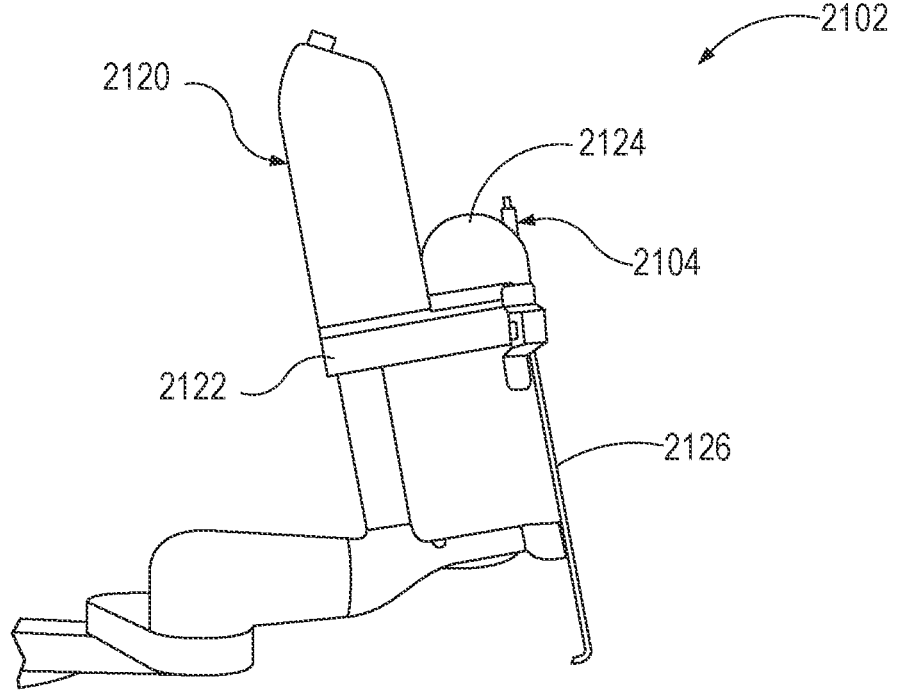

FIGS. 48A and 48B are left side views of the manipulator assembly 2102 of the system 2100, configured in accordance with embodiments of the present technology. The manipulator assembly 2102 generally includes the instrument manipulator 2120, which has a carriage 2122 for mounting one or more instruments. The carriage 2122 may be configured to receive an instrument interface 2124 of the medical instrument 2104, such that the medical instrument 2104 is selectively coupled to the instrument manipulator 2120 before conducting a medical operation. FIG. 48A shows the medical instrument 2104, having an instrument optical fiber connector 2128 protruding from the instrument interface 2124, uninstalled from the carriage 2122; and FIG. 48B shows the medical instrument 2104 installed on the carriage 2122. When the medical instrument 2104 is installed on the carriage 2122, at least a portion of the elongate device 2126 of the medical instrument 2104 may extend beyond the carriage 2122 to interface with the patient P when the elongate device 2126 is manipulated by the instrument manipulator 2120 during use of the system 2100. In this regard, the instrument manipulator 2120 may be configured for insertion and retraction of the elongate device 2126 with respect to the patient anatomy by moving in a telescoping manner relative to the patient, and may affect other movements within the degrees of freedom of the elongate device 2126. Various manipulation configurations related to a manipulator assembly are described in PCT Application No. PCT/US19/54718 (filed Oct. 4, 2019, titled "Systems and Methods for Positioning Medical Instruments"), which is incorporated by reference herein in its entirety.

Figure 49:
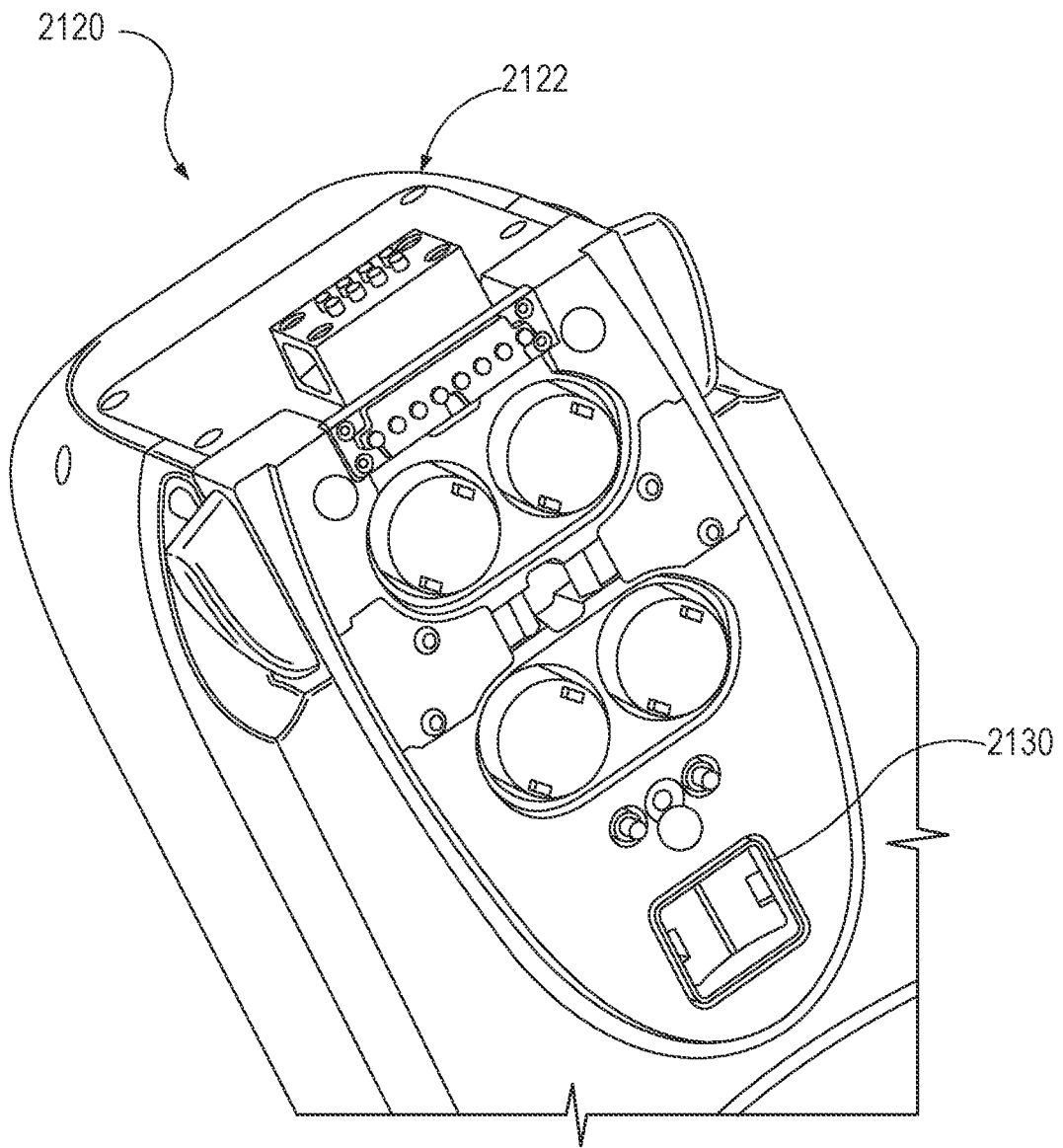
FIG. 49 is a perspective view of a carriage of the medical system of FIG. 47B showing a carriage optical fiber connector.

FIG. 49 is a perspective view of a portion of the carriage 2122 of the instrument manipulator 2120 configured to receive the instrument interface 2124, in accordance with embodiments of the present technology. As noted above, the carriage 2122 of the instrument manipulator 2120 may include a plurality of actuators or motors that drive corresponding inputs on the instrument interface 2124 in response to commands from the control system 2112. As shown, the carriage 2122 includes a shuttered carriage optical fiber connector ("carriage optical fiber connector 2130") configured to receive the instrument optical fiber connector 2128. The carriage optical fiber connector 2130 may be configured as a floating fiber interface to enable easy connection of a fiber with forgiveness in multiple degrees of freedom. Thus, when the instrument optical fiber connector 2128 is inserted into and connected to the carriage optical fiber connector 2130 of the instrument interface 2124, the operator O might not be required to perfectly align the end of the instrument optical fiber connector 2128 during insertion, thereby providing flexibility to the operator O. The floating interface may also prevent a misalignment of the connectors, thereby reducing the potential of damaging the fiber, and allowing the cleaved ends of the fibers to make a proper and complete connection.

Figure 50A:
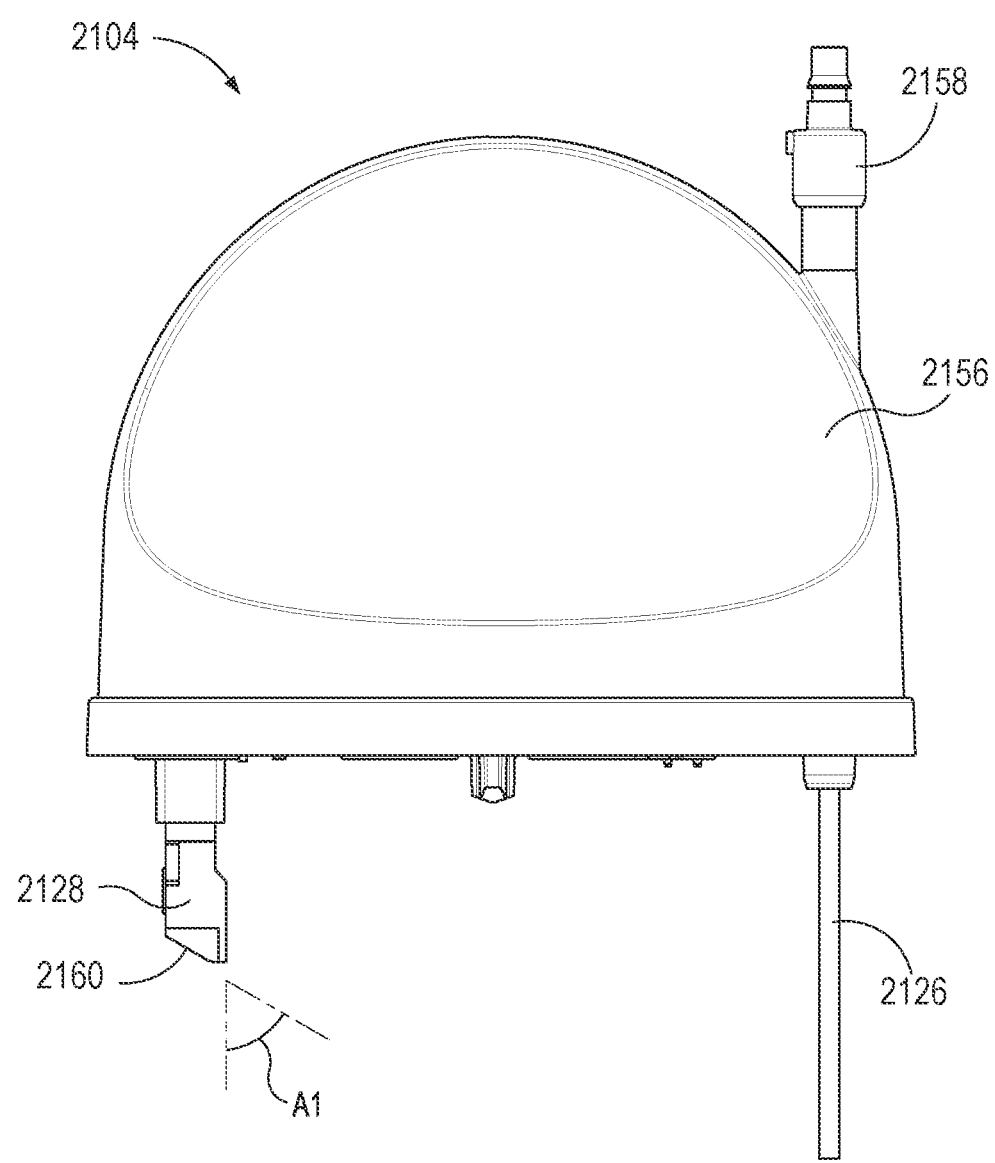
FIG. 50A is a side plan view of a medical instrument configured in accordance with an embodiment of the present technology.
Figure 50B:
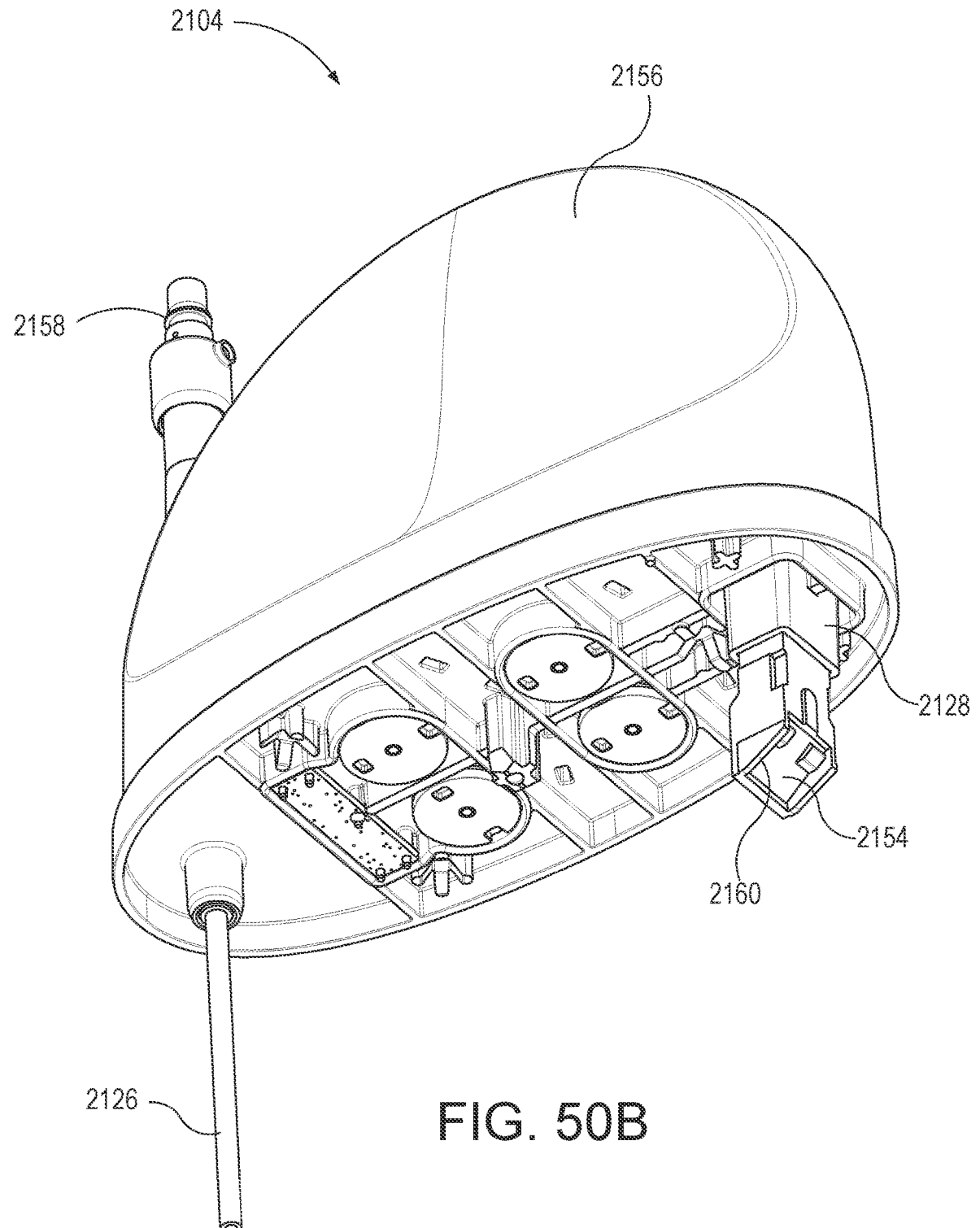
FIG. 50B is a lower perspective view of the medical instrument of FIG. 50A.

FIGS. 50A and 50B are side and perspective plan views, respectively, of the medical instrument 2104. Referring to FIGS. 50A and 50B together, the medical instrument 2104 can include a housing 2156 from which the elongate device 2126 extends. In some embodiments, the medical instrument 2104 further includes an access port 2158. The access port 2158 extends from the housing 2156 and is in fluid communication with the elongate device 2126. The access port 2158, for example, can be configured to facilitate insertion of instruments, tools, and other devices into the elongate device 2126. In some embodiments, the instrument optical fiber connector 2128 extends from a same side of the housing 2156 as the elongate device 2126. As described above with reference to FIGS. 48A and 48B, the instrument optical fiber connector 2128 can be configured to connect with the carriage optical fiber connector 2130.

The instrument optical fiber connector 2128 can include a sloped surface 2160 at or near the distal end or free end (e.g., the end of the instrument optical fiber connector 2128 opposite the housing 2156). The sloped surface 2160 can be at an angle A1 (FIG. 50A) with respect to a longitudinal axis of the instrument optical fiber connector 2128. The sloped surface 2160 can extend along all or most of the distal end of the instrument optical fiber connector 2128 when observed from the side (e.g., the frame of reference of FIG. 50A). The angle A1 of the sloped surface 2160 can be, for example, between 20°-80°, between 25°-75°, between 35°-60°, and/or between 40°-50°. In some embodiments, the angle A1 of the sloped surface 2160 is approximately 45°. In some embodiments, all or most of the distal end of the instrument optical fiber connector 2128 is perpendicular or substantially perpendicular to the longitudinal axis of the instrument optical fiber connector 2128.

As shown in FIG. 50B, the fiber connector 2128 can include a door 2154 at a distal portion thereof. The door 2154 is configured to limit or prohibit access to an interior of the instrument optical fiber connector 2128 (e.g., into an interior of a housing 2162 of the instrument optical fiber connector 2128) by the outside environment when the door 2154 is in a first (e.g., closed) position/configuration. The door 2154 may be biased to the closed position (e.g., via a spring or other biasing structure). The door 2154 can be configured to open (e.g., transition to a second position/configuration) upon contact with one or more portions of the carriage 2122, as described in more detail below. In some embodiments, the instrument optical fiber connector 2128 includes a pair of hinged doors instead of the illustrated single door 2154.

Figure 51A:
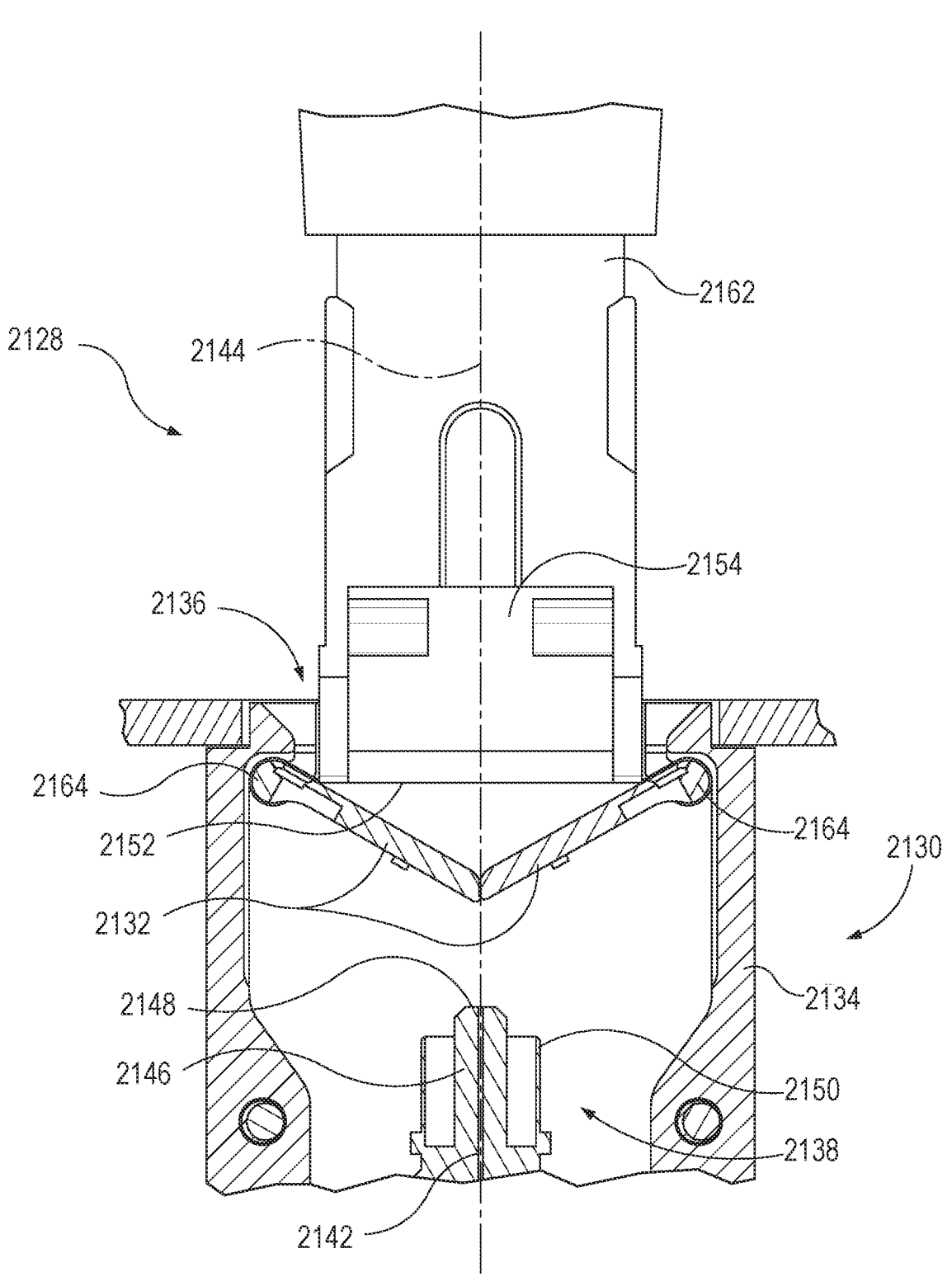
FIG. 51A is a partial cross-section view of an instrument optical fiber connector and carriage optical fiber connector.

FIG. 51A is a partially schematic cross-section view illustrating the instrument optical fiber connector 2128 coming into initial contact with doors 2132 of the carriage optical fiber connector 2130. The doors 2132 can be constructed from a polymer, metal, composite, ceramic, and/or some other material or combination of materials. For example, the doors 2132 can be at least partially constructed from a metal (e.g., aluminum) plated with another metal (e.g., nickel). As illustrated, the carriage optical fiber connector 2130 can further include a housing 2134 having a port or opening 2136. A carriage fiber optic assembly 2138 can be positioned at least partially within the housing 2134 of the carriage optical fiber connector 2130. The carriage fiber optic assembly 2138 can include an optical fiber 2142 positioned at or near the center of the opening 2136 when observed parallel to a longitudinal axis 2144 of the carriage optical fiber connector 2130 within the housing 2134. The optical fiber 2142 can be constructed at least partially from silica or other similar materials. In some embodiments, the optical fiber 2142 comprises a plurality of individual cores. The optical fiber 2142 can be surrounded by a ferrule 2146 or collar. The ferrule 2146 can be constructed from a polymer, metal, composite, ceramic, and/or some other material or combination of materials. For example, the ferrule 2146 can be constructed from a polymer with an embedded material such as zirconia. A portion (e.g., a proximal end 2148) of the optical fiber 2142 can be exposed and/or surrounded by the ferrule 2146. In some embodiments, the ferrule 2146 is at least partially surrounded by a sleeve 2150. The ferrule 2146 can be affixed to the sleeve 2150 in a direction parallel to the longitudinal axis 2144 of the carriage optical fiber connector 2130. In some embodiments, the ferrule 2146 can rotate and/or translate about or parallel to the longitudinal axis 2144 of the carriage optical fiber connector 2130 with respect to the sleeve 2150.

Figure 51B:
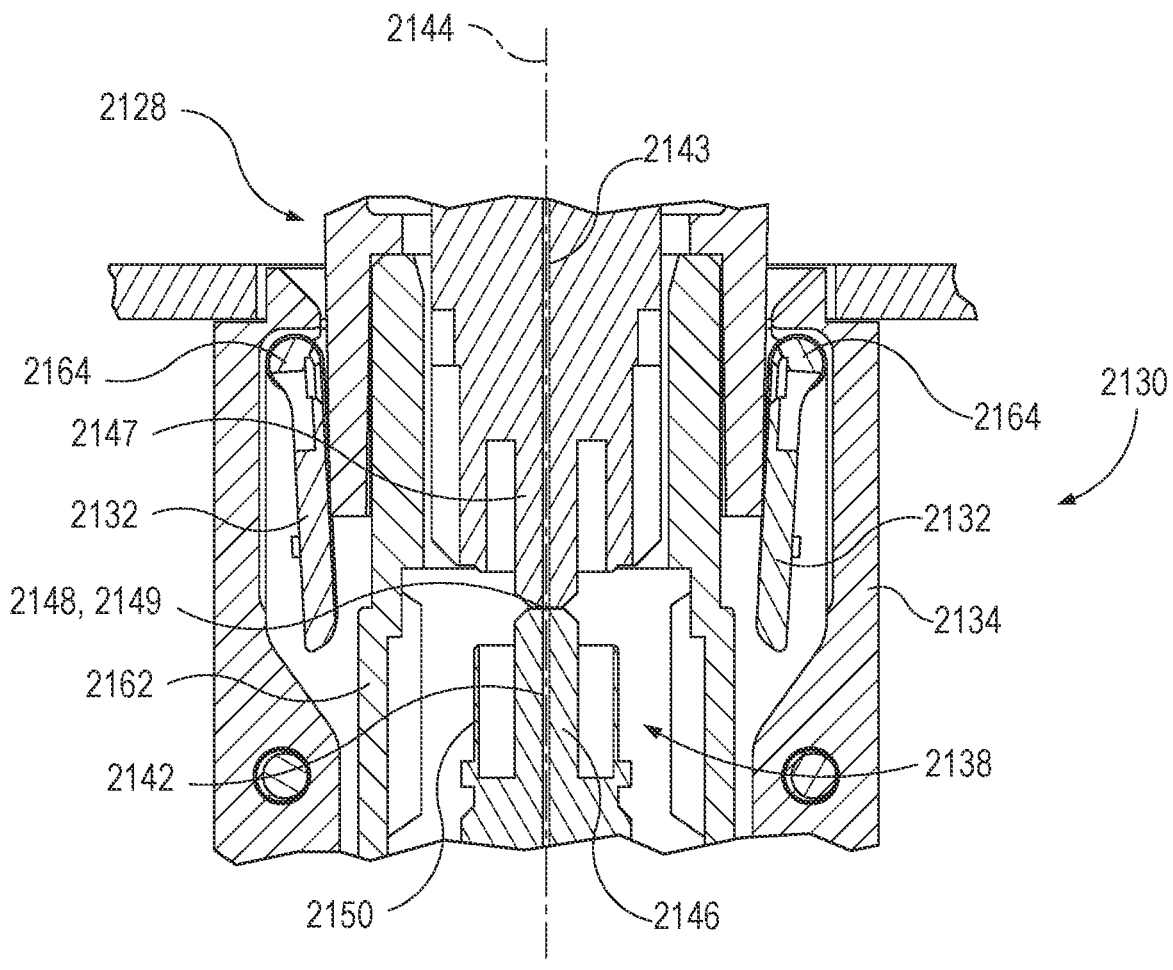
FIG. 51B is a cross-section view of the instrument optical fiber connector and carriage optical fiber connector of FIG. 51A, wherein the optical fiber of the instrument optical fiber connector is in contact with the optical fiber of the carriage optical fiber connector.

The doors 2132 of the carriage optical fiber connector 2130 may be configured to inhibit or prevent access to an interior of the carriage optical fiber connector 2130 via the port or opening 2136 of the carriage optical fiber connector 2130 when the doors 2132 are in a first (e.g., closed) position/configuration. In the configuration shown in FIG. 51A, for example, a distal end 2152 of the instrument optical fiber connector 2128 contacts the doors 2132 before the doors 2132 open (e.g., transition to a second position/configuration). As the instrument optical fiber connector 2128 is pushed further toward and into the carriage optical fiber connector 2130, the distal end 2152 of the instrument optical fiber connector 2128 may rub against and/or slide along the doors 2132 as the doors 2132 open about their respective hinges 2164. Contact between the instrument optical fiber connector 2128 and the doors 2132, as well as subsequent rubbing/sliding between the instrument optical fiber connector 2128 and the doors 2132, can create loose particles of the material of the instrument optical fiber connector 2128 and/or of the doors 2132. These particles can settle on the exposed face of the optical fiber 2142. The presence of particles on the exposed face the optical fiber 2142 can damage the optical fiber 2142 when the instrument optical fiber connector 2128 is fully connected to the carriage optical fiber connector 2130 as illustrated in FIG. 51B. For example, the particles can be trapped between the optical fiber 2142 of the carriage optical fiber connector 2130 and an optical fiber 2143 (e.g., a distal end 2149 of the optical fiber 2143) of the instrument optical fiber connector 2128. These particles can scratch, chip, and/or otherwise damage the exposed portions of the optical fiber 2142 and/or the optical fiber 2143. Particles can also damage the ferrule 2146 of the carriage optical fiber connector 2130 and/or a ferrule 2147 of the instrument optical fiber connector 2128. Damage to the optical fiber(s) 2142 and/or 2143 can damage and/or destroy the quality and reliability of information passed through the optical fiber(s) 2142, 2143 and/or from various components of the medical system 2100.

Another potential source of damage to the optical fiber 2142 can occur when the door 2154 on the instrument optical fiber connector 2128 contacts the ferrule 2146 and/or optical fiber 2142 of the carriage fiber optic assembly 2138. For example, after the distal end 2152 of the instrument optical fiber connector 2128 passes through the doors 2132, the door 2154 of the instrument optical fiber connector 2128 is opened via contact with the carriage fiber optic assembly 2138. Further movement of the instrument optical fiber connector 2128 into the carriage optical fiber connector 2130 can eventually bring the optical fiber 2142 of the carriage optical fiber connector 2130 into contact with the optical fiber 2143 of the instrument optical fiber connector 2128, as illustrated in FIG. 51B.

Conventional remedies or solutions for avoiding the above-described particle damage include wiping the optical fiber 2142 and/or ferrule 2146 of the carriage optical fiber connector 2130 with a cloth, swab, or other cleaning material. Other solutions include, for example, inserting a cleaning instrument into the carriage optical fiber connector 2130 before connecting the instrument optical fiber connector 2128 to the carriage optical fiber connector 2130. While the solutions can be useful for removing pre-existing particles from the optical fibers, the solutions do not address or resolve generation of particles occurring during connection between the instrument optical fiber connector 2128 and the carriage optical fiber connector 2130.

As described in more detail below, the present disclosure includes several solutions for inhibiting or preventing damage to the optical fibers from particles (e.g., particles produced via contact between the instrument interface optical fiber connector and the doors or other features of the carriage optical fiber connector). In some embodiments, the solutions are on the instrument side of the medical system 2100. In further embodiments, the solutions are on the carriage side of the medical system 2100. In still other embodiments, solutions include modifications to both the instrument interface optical fiber connector and the carriage side optical fiber connector.

Figure 52A:
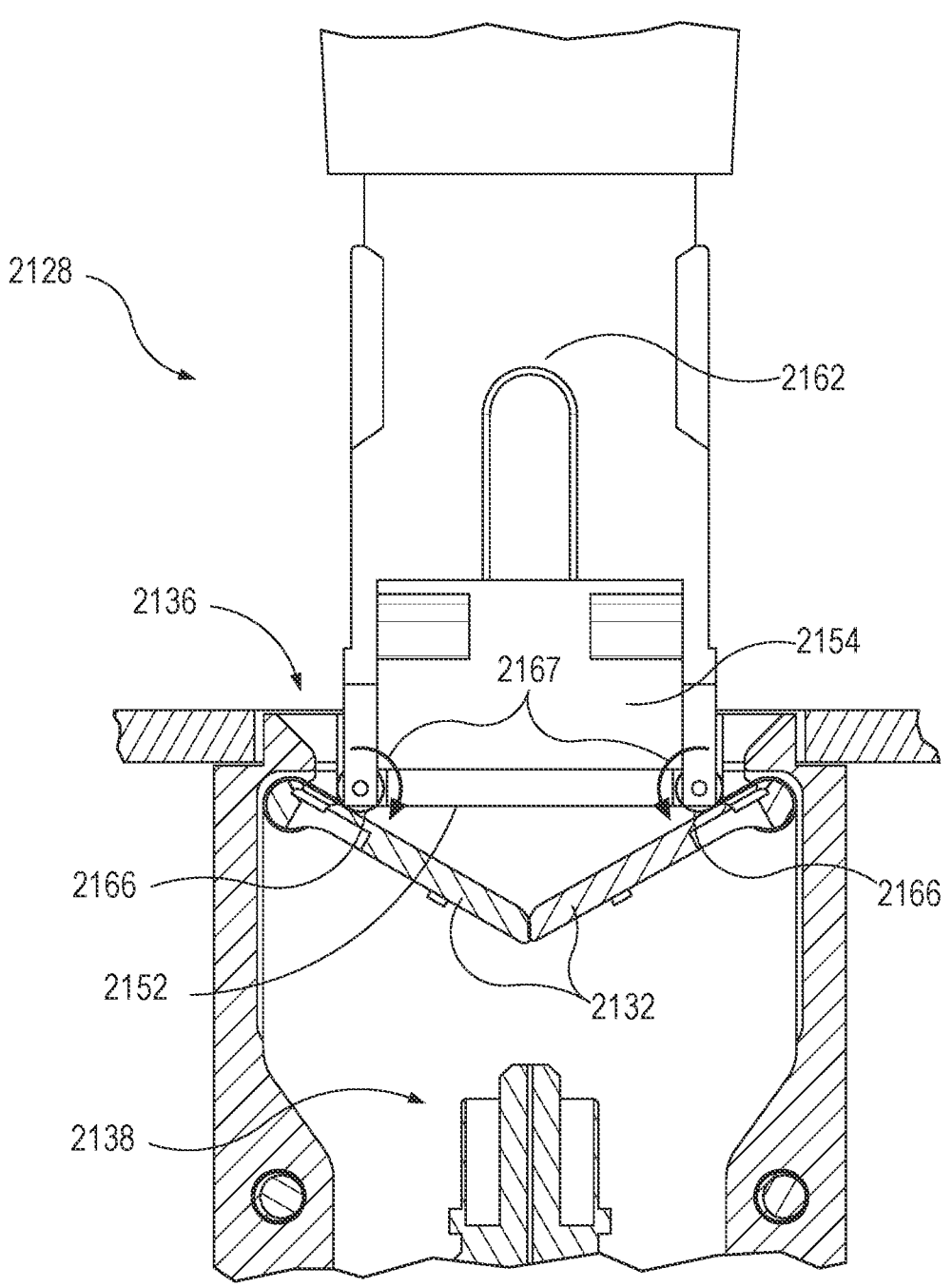
FIG. 52A is a partial cross-section view of an instrument optical fiber connector with rollers and a carriage optical fiber connector configured in accordance with an embodiment of the present technology.
Figure 52B:
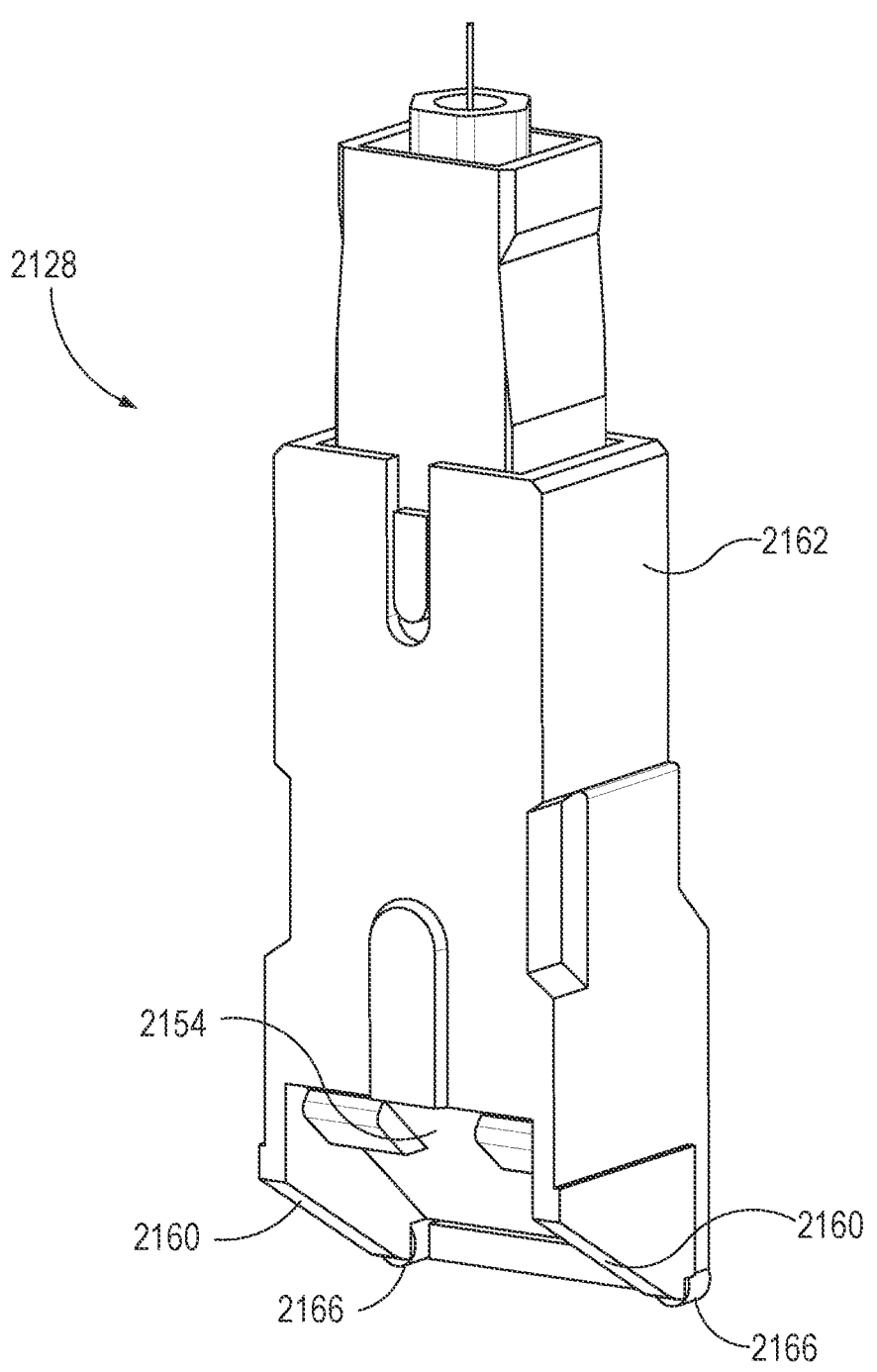
FIG. 52B is an upper perspective view of the instrument optical fiber connector of FIG. 6A.

One example of an instrument-side modification configured in accordance with an embodiment of the present technology is illustrated in FIGS. 52A and 52B. In this embodiment, the distal end 2152 of the instrument optical fiber connector 2128 can include one or more rollers 2166. The rollers 2166 can be positioned on all or a portion of the sides of the distal end 2152 of the instrument optical fiber connector 2128 that contact the doors 2132 of the carriage optical fiber connector 2130. The rollers 2166 are configured to reduce friction between the instrument optical fiber connector 2128 and the doors 2132 during engagement between the instrument optical fiber connector 2128 and the carriage optical fiber connector 2130. For example, as the instrument optical fiber connector 2128 is inserted into the carriage optical fiber connector 2130, the rollers 2166 may rotate in the direction indicated by the arrows 2167 in FIG. 52A as the rollers 2166 contact the doors 2132. The rollers 2166 may act as a buffer between the doors 2132 and any hard and/or sharp edges of the distal end 2152 of the instrument optical fiber connector 2128.

In some embodiments, the rollers 2166 are constructed from a durable, tough, fracture-resistant, and/or soft material. For example, the rollers 2166 can be constructed from a polymer configured to resist cracking, flaking, pitting, and/or otherwise producing particles. In some embodiments, the rollers 2166 are constructed from a material softer than the optic fibers of the system 2100.

The rollers 2166 extend along at least a portion of the distal end 2152 of the instrument optical fiber connector 2128. In some embodiments, more than one roller is positioned on one or more sides of the distal end 2152 of the instrument optical fiber connector 2128. As shown in FIG. 52B, for example, all or a portion of the lateral walls of the housing 2162 of the instrument optical fiber connector 2128 form the sloped surfaces 2160 of the distal end 2152. Each roller 2166 can be positioned at least partially on the sloped surfaces 2160 of the distal end 2152. In some embodiments, the rollers 2166 are positioned on portions of the lateral walls of the distal end 2152 of the instrument optical fiber connector 2128 that are perpendicular to the longitudinal axis of the instrument optical fiber connector 2128.

Figure 53A:
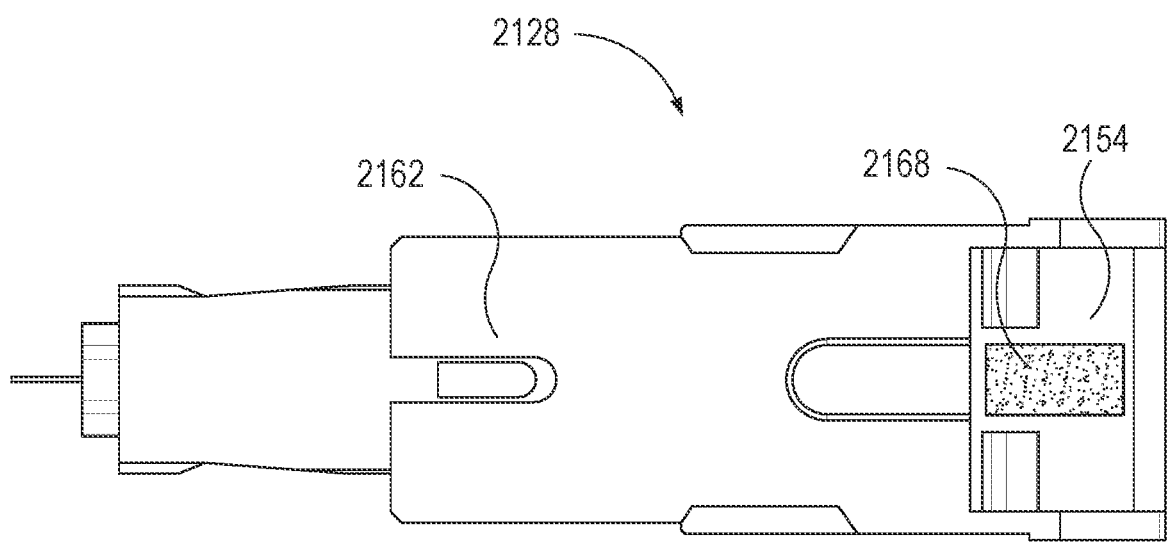
FIG. 53A is a front plan view of an instrument optical fiber connector having a cleaning portion configured in accordance with an embodiment of the present technology.
Figure 53B:
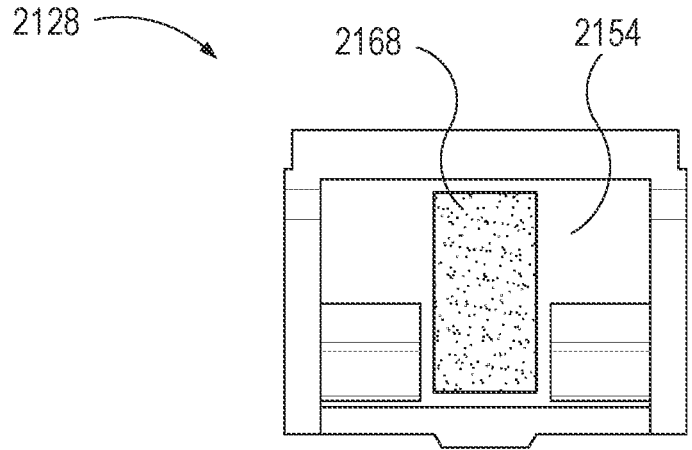
FIG. 53B is a bottom plan view of the instrument optical fiber connector of FIG. 53A.

FIGS. 53A and 53B illustrate another instrument-side solution for reducing particle generation in accordance with an embodiment of the present technology. In this arrangement, the door 2154 of the instrument optical fiber connector 2128 can include a cleaning portion 2168 thereon. In some embodiments, the entire door 2154 may comprise the cleaning portion 2168. The cleaning portion 2168 can be, for example, a material embedded with cleaning fluid and/or configured to wipe surfaces with which it comes into contact. Referring to FIGS. 51A, 51B, 53A, and 53B together, for example, the cleaning portion 2168 can be positioned on a portion of the door 2154 that contacts the optical fiber 2142 and/or ferrule 2146 of the carriage fiber optic assembly 2138 when the instrument optical fiber connector 2128 is connected to the carriage optical fiber connector 2130. The cleaning portion 2168 can be configured to remove particles from exposed portions of the optical fiber 2142 and/or ferrule 2146 to reduce the likelihood of damage to the optical fiber 2142 or optical fiber of the instrument optical fiber connector 2128 when the instrument optical fiber connector 2128 is connected to the carriage optical fiber connector 2130.

Modifying materials used to construct portions of the instrument optical fiber connector 2128 can also reduce the likelihood that particles are generated during connection between the instrument optical fiber connector 2128 and the carriage optical fiber connector 2130. For example, referring again to FIGS. 51A, 51B, 53A, and 53B together, the door 2154 and/or housing 2162 of the instrument optical fiber connector 2128 can be constructed from materials or combinations of materials configured to resist chipping, flaking, or otherwise generating particles. In some embodiments, the door 2154 and/or housing 2162 of the instrument optical fiber connector 2128 is constructed from a material softer than silica or other materials used to construct the optical fiber 2142. Use of soft materials can reduce the likelihood of damage to the optical fiber 2142 even if particles are generated. Use of soft materials on the door 2154 under housing 2162 of the instrument optical fiber connector 2128 can also reduce the likelihood of chipping, scratching, and/or otherwise damaging portions of the carriage optical fiber connector 2130 or components thereof.

With reference again back to FIGS. 51A and 51B, the system side (e.g., some portion of the carriage optical fiber connector 2130) may be modified to reduce the likelihood of damage to the optical fiber 2142 and/or optical fiber 2143. System-side modifications can include modifications to the doors 2132 and/or other portions of the carriage 2122 and/or carriage optical fiber connector 2130. Modifications to the doors 2132 can include moving and/or adding hinges, changing the number of doors, and/or changing the types of doors used in the carriage optical fiber connector 2130. For example, the doors 2132 of the carriage optical fiber connector 2130 can be modified to open out from the housing 2134 (e.g., away from the carriage fiber optic assembly 2138) through the opening 2136. Outwardly-opening system-side doors can be used independently or in conjunction with one or more of the rollers 2166 of FIGS. 52A and 52B or the cleaning portions 2168 of FIGS. 53A and 53B. In some embodiments where the outwardly-opening doors are used in conjunction with the rollers 2166 and/or with the cleaning portions 2168, aspects of each component may further reduce overall particle generation during connection between the instrument optical fiber connector 2128 and the carriage optical fiber connector 2130. In some embodiments, the doors are configured to open/slide laterally (e.g., in a direction perpendicular to the longitudinal axis 2144 of the carriage optical fiber connector 2130). Laterally-sliding system-side doors can be used independently or in conjunction with one or more of the rollers 2166 of FIGS. 52A and 52B or the cleaning portions 2168 of FIGS. 53A and 53B. In some embodiments where the laterally-sliding doors are used in conjunction with the rollers 2166 and/or with the cleaning portions 2168, aspects of each component may further reduce overall particle generation during connection between the instrument optical fiber connector 2128 and the carriage optical fiber connector 2130.

FIGS. 54A-54D, for example, illustrate a system-side solution in accordance with an embodiment of the present technology. In the arrangement shown in FIGS. 54A-54D, the doors 2170 can include second hinges 2172 that are moved away from the outer edges of the doors 2170. The second hinges 2172 are positioned to separate the doors 2170 into two outer door portions 2174 and two inner door portions 2176. The hinges 2172 can be spaced apart from each other in a direction perpendicular to the longitudinal axis 2144 of the carriage optical fiber connector 2130. For example, the hinges 2172 can be spaced from each other by a width W1. In this arrangement, the width W1 is less than or equal to a width W2 of the distal end 2152 of instrument optical fiber connector 2128 as measured in a direction perpendicular to the longitudinal axis 2144 and the axes of rotation of the two hinges 2172. The second hinges 2172 can be biased to rotate the inner door portions 2176 (including the free ends of the inner door portions 2176 opposite the second hinges 2172) inward and upward in the frame of reference of FIG. 54A, as reflected by the arrows 2171 in FIG. 54A.

Figure 54A:
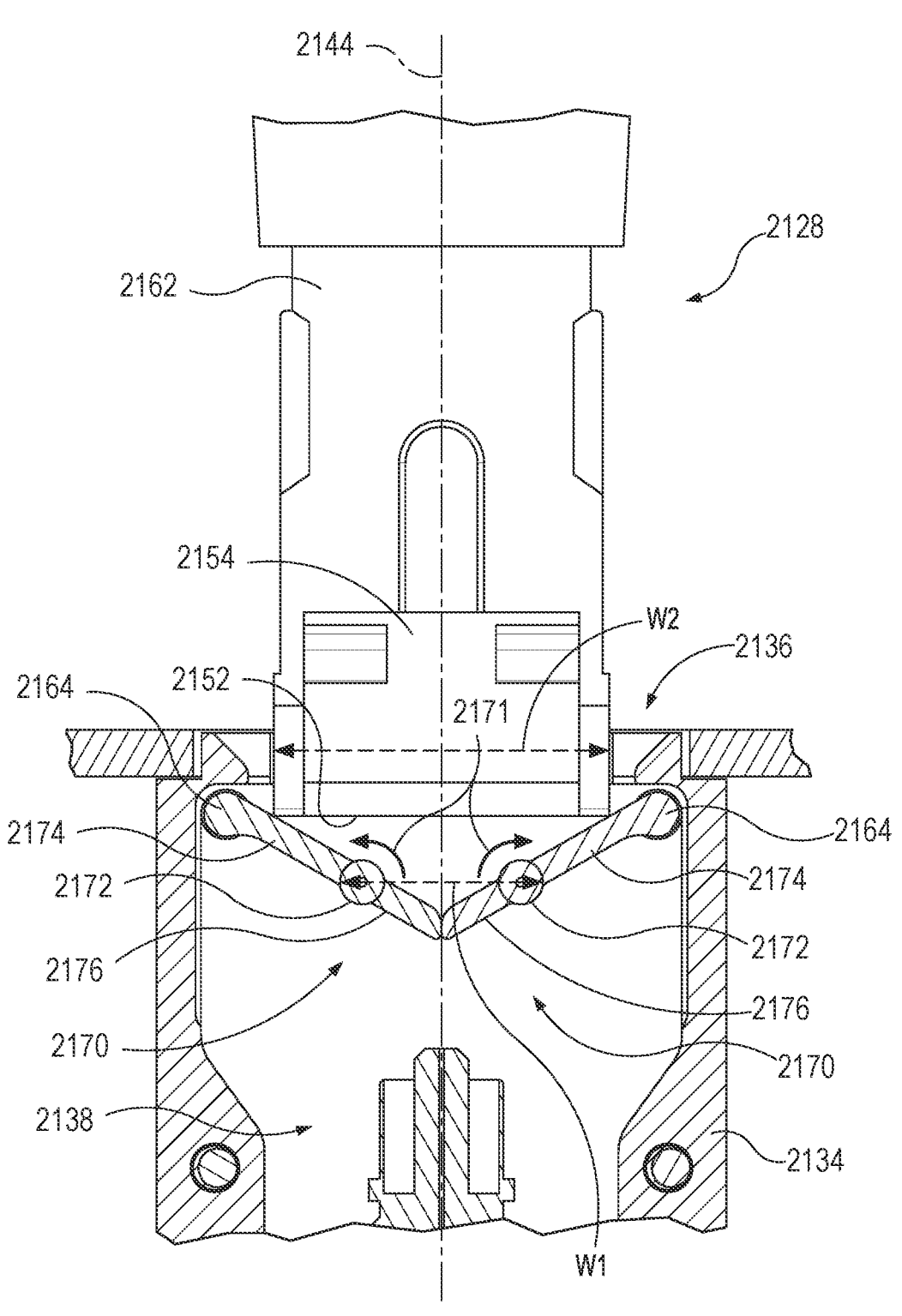
FIG. 54A is a partial cross-section view of an instrument optical fiber connector and a carriage optical fiber connector having doors with second hinges configured in accordance with an embodiment of the present technology, wherein the instrument optical fiber connector is in a first position.
Figure 54B:
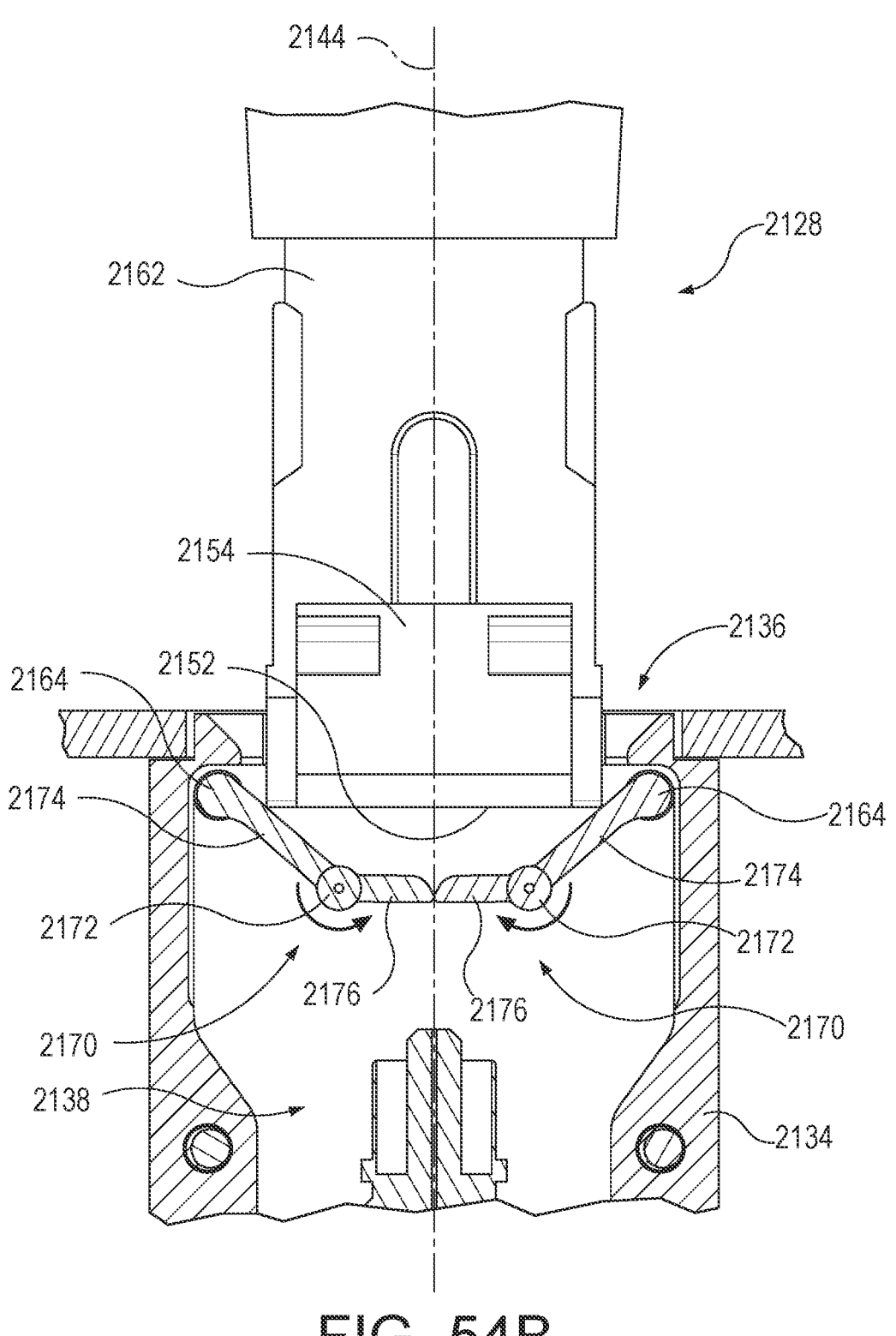
FIG. 54B is a partial cross-section view of the instrument optical fiber connector and carriage optical fiber connector of FIG. 54A with the instrument optical fiber connector in a second position further inserted into the carriage optical fiber connector.

During operation, the instrument optical fiber connector 2128 is brought into initial contact with the doors 2170, as illustrated in FIG. 54A. More specifically, because the width W1 of the second hinges 2172 is less than the width W2 of the distal end 2152 of the instrument optical fiber connector 2128, the instrument optical fiber connector 2128 initially contacts the outer door portions 2174. Further advancement of the instrument optical fiber connector 2128 into the carriage optical fiber connector 2130, as illustrated in FIG.

Figure 54C:
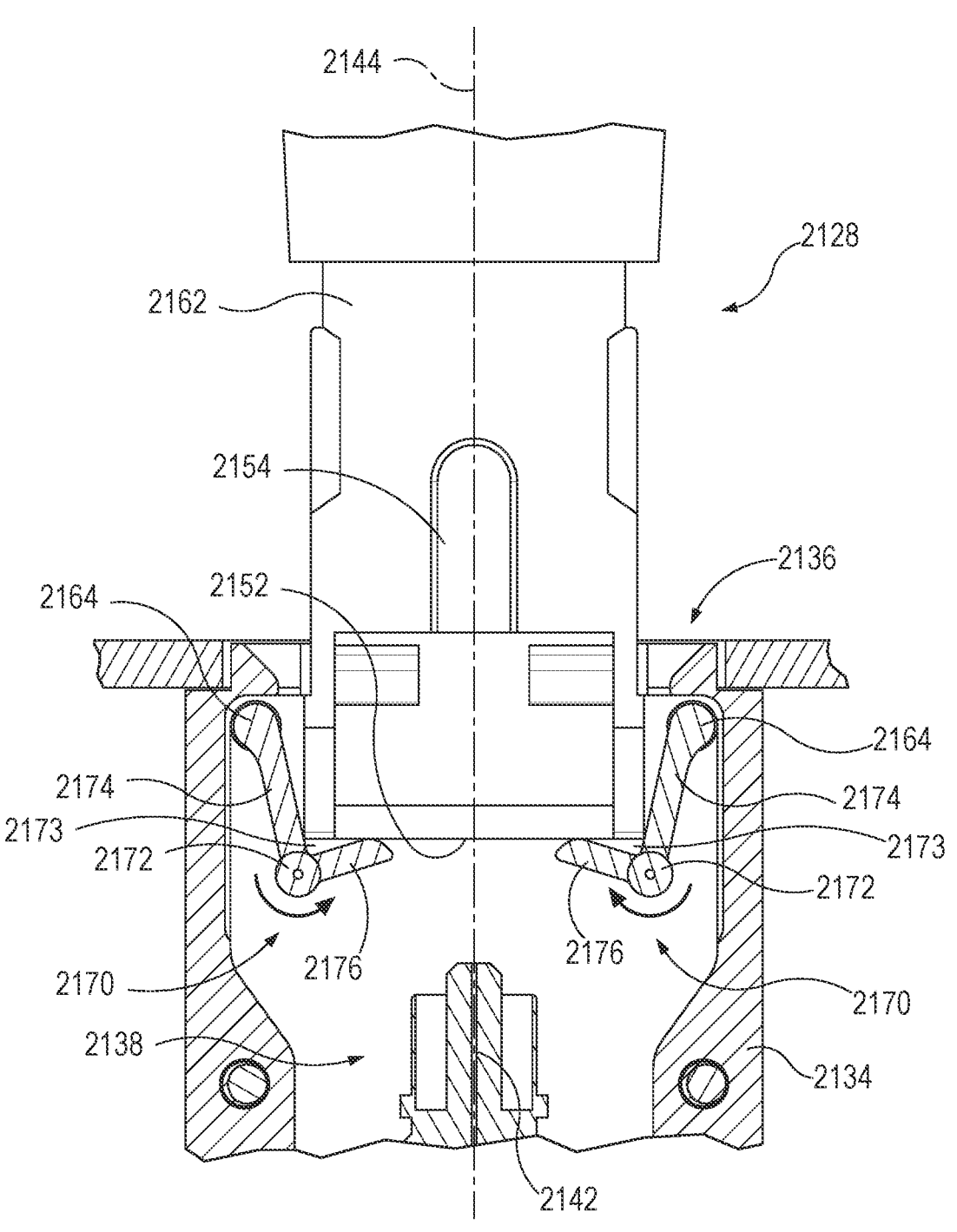
FIG. 54C is a partial cross-section view of the instrument optical fiber connector and carriage optical fiber connector of FIG. 54A with the instrument optical fiber connector in a third position even further inserted into the carriage optical fiber connector.

54B, pushes the outer door portions 2174 open. Opening of the outer door portions 2174 allows the second hinges 2172 to move away from each other, resulting in rotation of the inner door portions 2176 toward the opening 2136 (e.g., under the biasing force of the second hinges 2172). Even further advancement of the instrument optical fiber connector 2128 into the carriage optical fiber connector 2130, as illustrated in FIG. 54C, opens the outer door portions 2174 further (e.g., moves the outer door portions 2174 toward the housing 2134 of the carriage optical fiber connector 2130), thereby moving the second hinges 2172 further away from each other. When the second hinges 2172 move apart a distance greater than twice the length of the inner door portions 2176, the inner door portions 2176 can rotate upward under the influence of the biasing force of the second hinges 2172, forming troughs 2173 (FIG. 54C) between the inner and outer door portions 2176, 2174. These troughs 2173 can collect particles (if any) formed by contact between the instrument optical fiber connector 2128 and the doors 2170 and reduce or eliminate dropping of particles onto the optical fiber 2142 of the carriage optical fiber connector 2128.

Figure 54D:
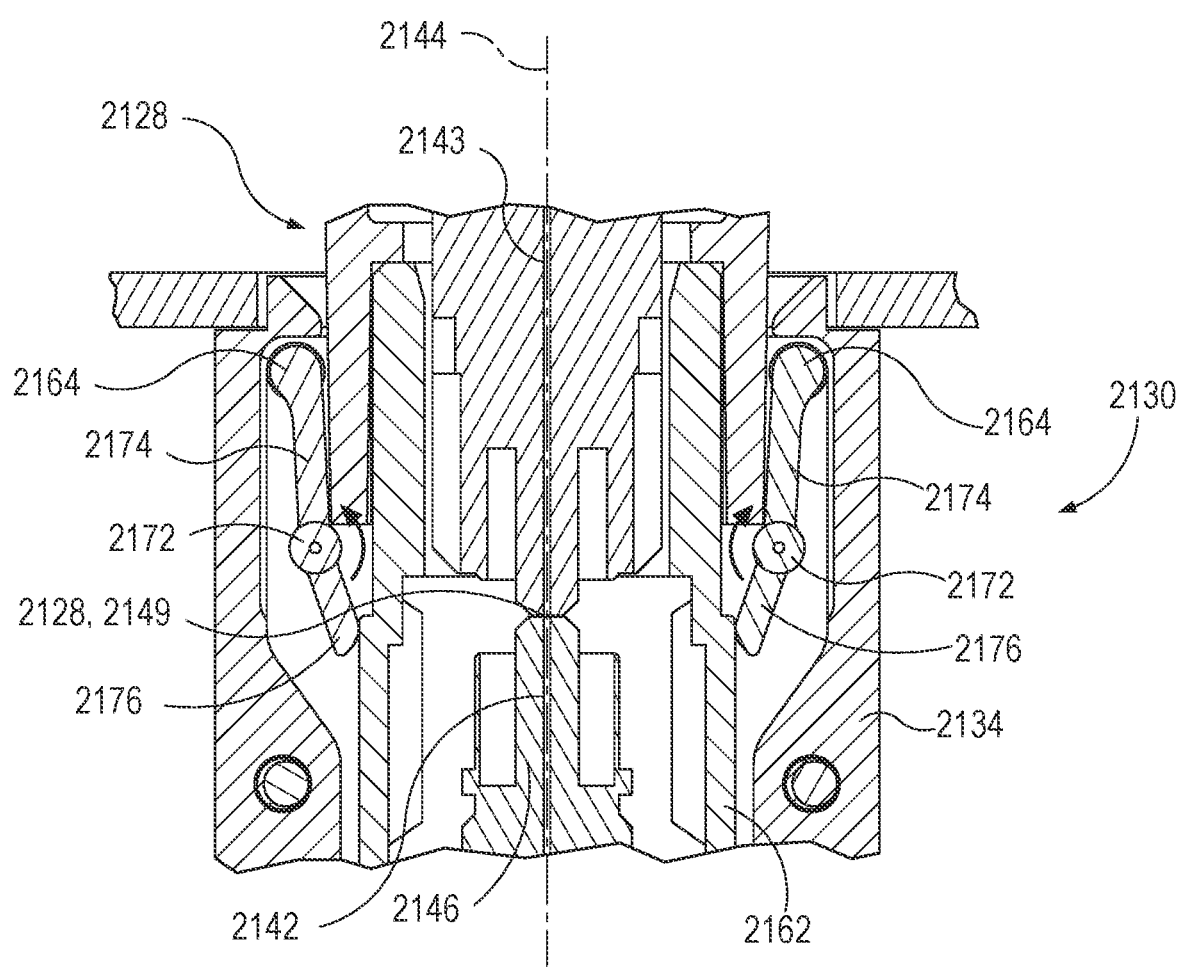
FIG. 54D is a cross-section view of the instrument optical fiber connector and carriage optical fiber connector of FIG. 54A with the optical fiber of the instrument optical fiber connector in contact with the optical fiber of the carriage optical fiber connector.

Further advancement of the instrument optical fiber connector 2128 into the carriage optical fiber connector 2130 will eventually result in complete connection between the optical fibers 2142, 2143, as illustrated in FIG. 54D. The distal end 2152 of the instrument optical fiber connector 2128 can also pass completely through the doors 2170, thereby rotating the inner door portions 2176 back downward (e.g., away from the opening 2136). Downward rotation of the inner door portions 2176 can effectively dump particles out from the troughs 2173 into portions of the carriage optical fiber connector 2130 away from (e.g., nearer the housing 2134) optical fiber 2142 and ferrule 2146, thereby reducing or eliminating deposition of particles onto the optical fiber 2142. The doors 2170 can be used independently or in conjunction with one or more of the rollers 2166 of FIGS. 52A and 52B or the cleaning portions 2168 of FIGS. 53A and 53B. In some embodiments where the doors 2170 are used in conjunction with the rollers 2166 and/or with the cleaning portions 2168, aspects of each component may further reduce overall particle generation during connection between the instrument optical fiber connector 2128 and the carriage optical fiber connector 2130.

Figure 55:
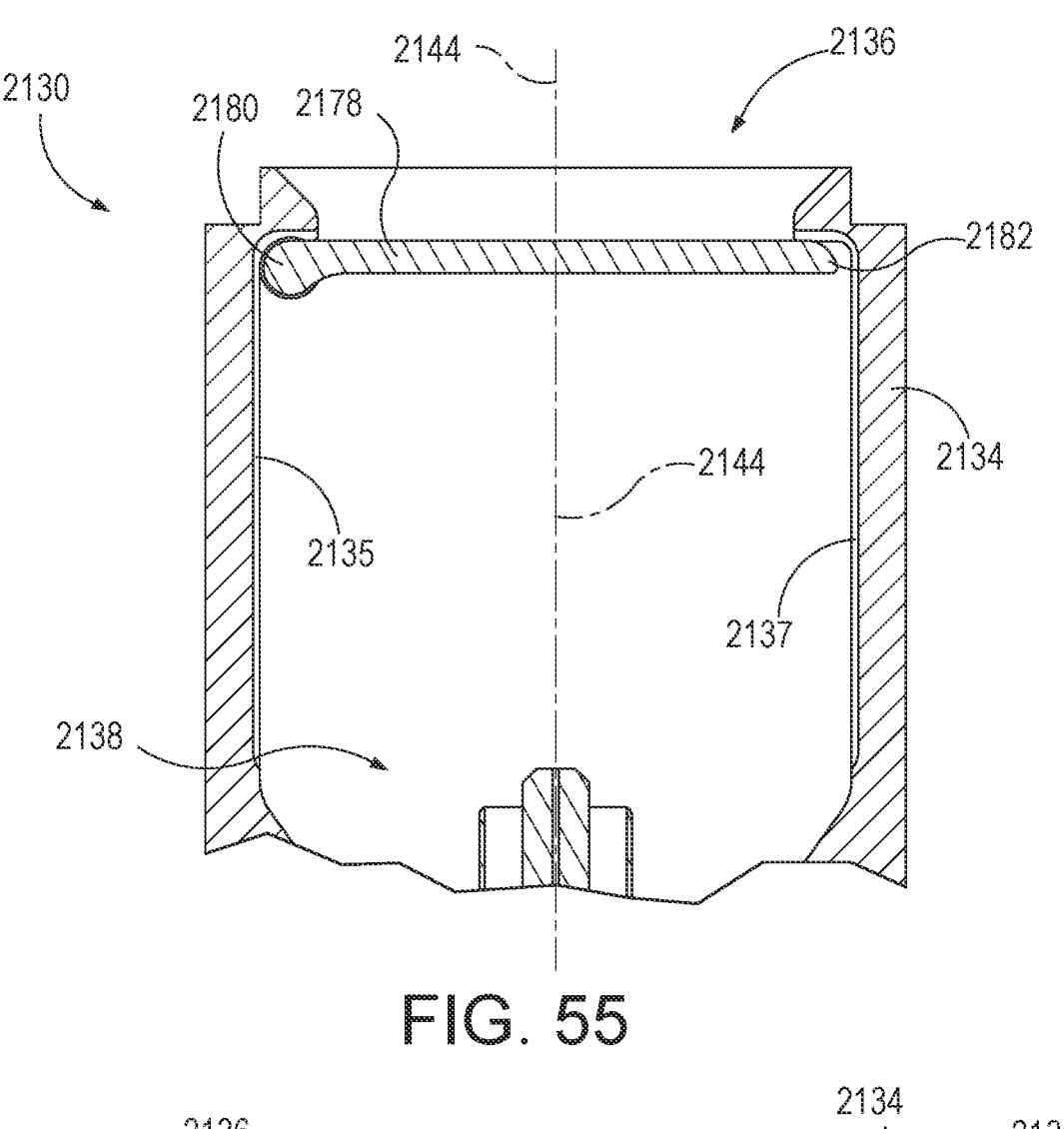
FIG. 55 is a partial cross-section view of an instrument optical fiber connector and a carriage optical fiber connector having a single door configured in accordance with an embodiment of the present technology.

FIG. 55 illustrates another system-side solution in accordance with an embodiment of the present technology. In this embodiment, the carriage optical fiber connector 2130 includes a single door 2178 configured to selectively block the opening 2136 of the carriage optical fiber connector 2130. The single door 2178 can be configured to rotate about a hinge 2180 at or near a first side 2135 of the housing 2134. The door 2178 can have a free end 2182 on an opposite side of the door 2178 from the hinge 2180. The free end 2182 of the door 2178 can be positioned near or in contact with a second side 2137 of the housing 2134 of the carriage optical fiber connector 2130. Positioning the free end 2182 of the door 2178 near the second side 2137 of the housing 2134 and out of alignment (e.g., not overlapping) with the carriage fiber optic assembly 2138 (in a direction parallel to the longitudinal axis 2144 of the carriage optical fiber connector 2130) can allow any particles produced during connection between the carriage optical fiber connector 2130 and the instrument optical fiber connector 2128 to be directed toward the second side 2137 of the housing 2134 and away from the carriage fiber optic assembly 2138 when the door 2178 is opened. The door 2178 can be used independently or in conjunction with one or more of the rollers 2166 of FIGS.

52A and 52B or the cleaning portions 2168 of FIGS. 7A and 7B. In some embodiments where the door 2178 is used in conjunction with the rollers 2166 and/or with the cleaning portions 2168, aspects of each component may further reduce overall particle generation during connection between the instrument optical fiber connector 2128 and the carriage optical fiber connector 2130.

Figure 56:
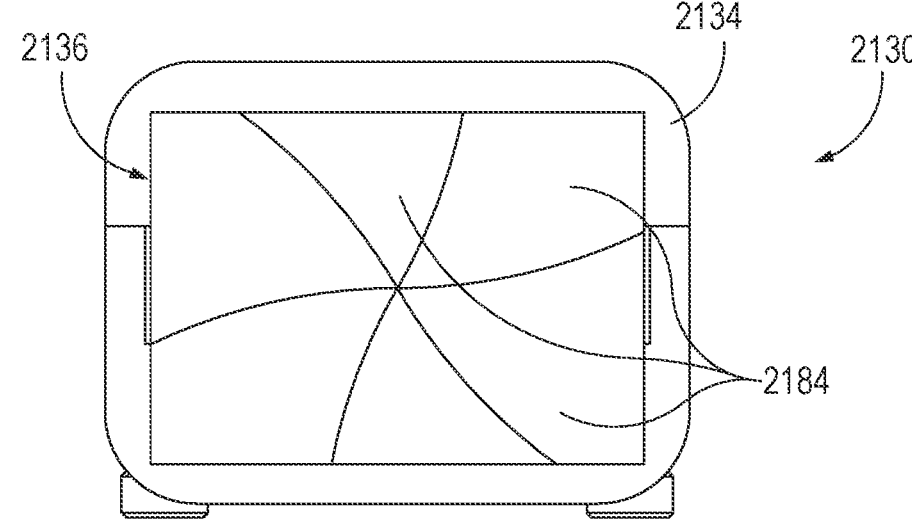
FIG. 56 is a top plan view of a carriage optical fiber connector having multiple blades forming a shutter in accordance with an embodiment of the present technology.

FIG. 56 illustrates a system-side solution in accordance with another embodiment of the present technology. In this embodiment, the carriage optical fiber connector 2130 includes a shuttered door having multiple blades 2184 configured to rotate and/or translate with respect to each other in order to uncover the opening 2136 of the carriage optical fiber connector 2130. For example, the blades 2184 of the carriage optical fiber connector 2130 can be configured to operate in a manner similar to or the same as the diaphragm shutter on a camera. In some embodiments, the blades 2184 are configured to move to an open position in response to mechanical switch or other actuator on the carriage optical fiber connector 2130. In some embodiments, the blades 2184 move in response to electronic signals, magnetic forces, and/or other non-contact mechanisms. For example, the blades 2184 can be configured to be opened by an actuator (e.g., a motor) when the instrument optical fiber connector 2128 is detected (e.g., via one or more sensors) to be a predetermined distance from the carriage optical fiber connector 2130/blades 2184. Moving the blades 2184 to uncover the opening 2136 without contact from the instrument optical fiber connector 2128 may reduce or eliminate production of particles during connection/disconnection between the instrument optical fiber connector 2128 and the carriage optical fiber connector 2130. The blades 2184 can be used independently or in conjunction with one or more of the rollers 2166 of FIGS. 52A and 52B or the cleaning portions 2168 of FIGS. 53A and 53B. In some embodiments where the blades 2184 are used in conjunction with the rollers 2166 and/or with the cleaning portions 2168, aspects of each component may further reduce overall particle generation during connection between the instrument optical fiber connector 2128 and the carriage optical fiber connector 2130.

Figure 57:
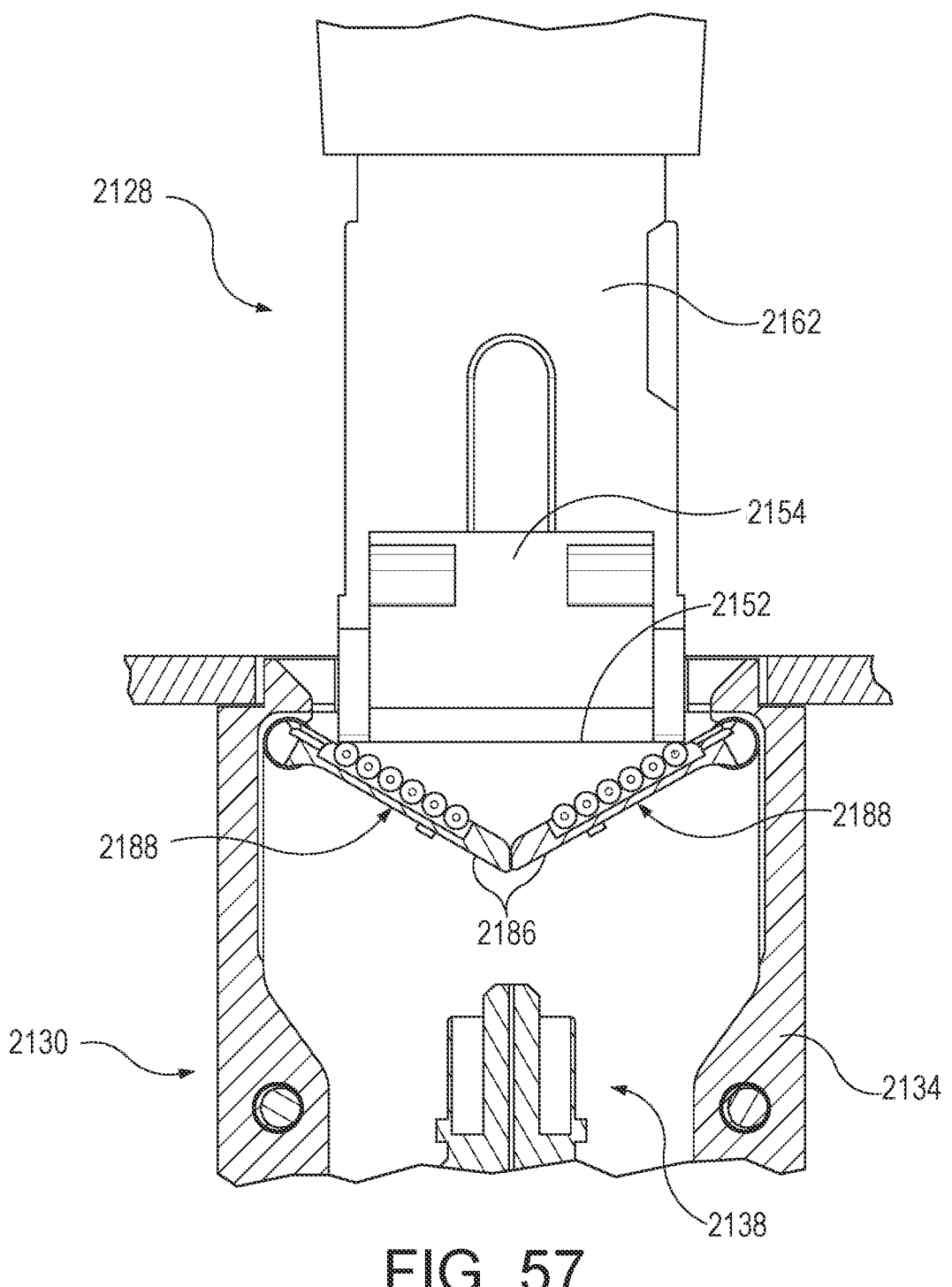
FIG. 57 is a partial cross-section view of an instrument optical fiber connector and a carriage optical fiber connector having doors with rollers configured in accordance with an embodiment of the present technology

FIG. 57 illustrates a system-side solution in accordance with still another embodiment of the present technology. In this embodiment, the carriage optical fiber connector 2130 includes doors 2186 having rollers 2188 thereon. The rollers 2188 can be positioned such that the distal end 2152 of the instrument optical fiber connector 2128 (or some portion thereof) contacts the rollers 2188 as the instrument optical fiber connector 2128 is engaged with the carriage optical fiber connector 2130. The rollers 2188 are configured to reduce friction between the instrument optical fiber connector 2128 and the doors 2186, and thereby reduce the risk of particle production during connection between the instrument optical fiber connector 2128 and the carriage optical fiber connector 2130. The rollers 2188 can be constructed from the same or similar materials as disclosed above with respect to the rollers 2166. The rollers 2188 can be used independently or in conjunction with one or more of the rollers 2166, the cleaning portions 2168, the doors 2170, or the door 2178 of FIGS. 52A-55. In some embodiments where the rollers 2188 are used in conjunction with the rollers 2166, the cleaning portions 2168, the doors 2170, and/or the door 2178, aspects of each component may further reduce overall particle generation during connection between the instrument optical fiber connector 2128 and the carriage optical fiber connector 2130.

Figure 58A:
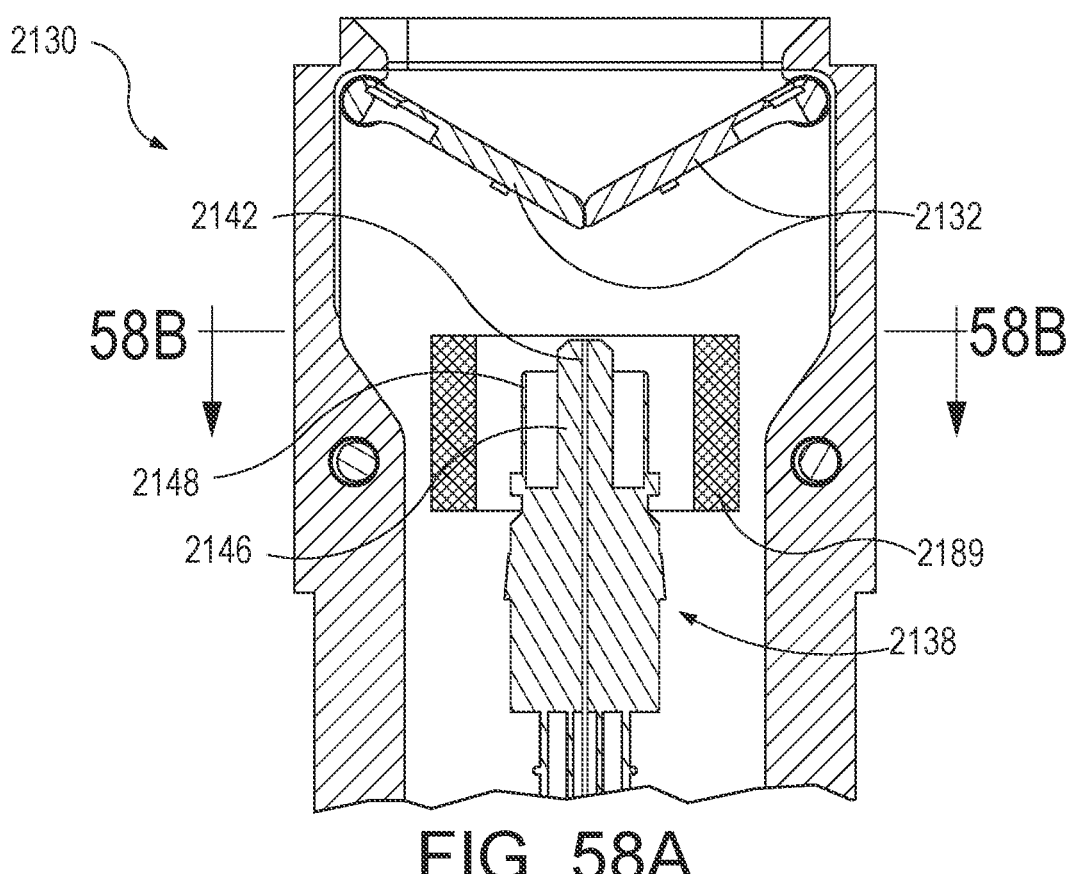
FIG. 58A is a cross-section view of a carriage optical fiber connector having an electrostatic component configured in accordance with an embodiment of the present technology.
Figure 58B:
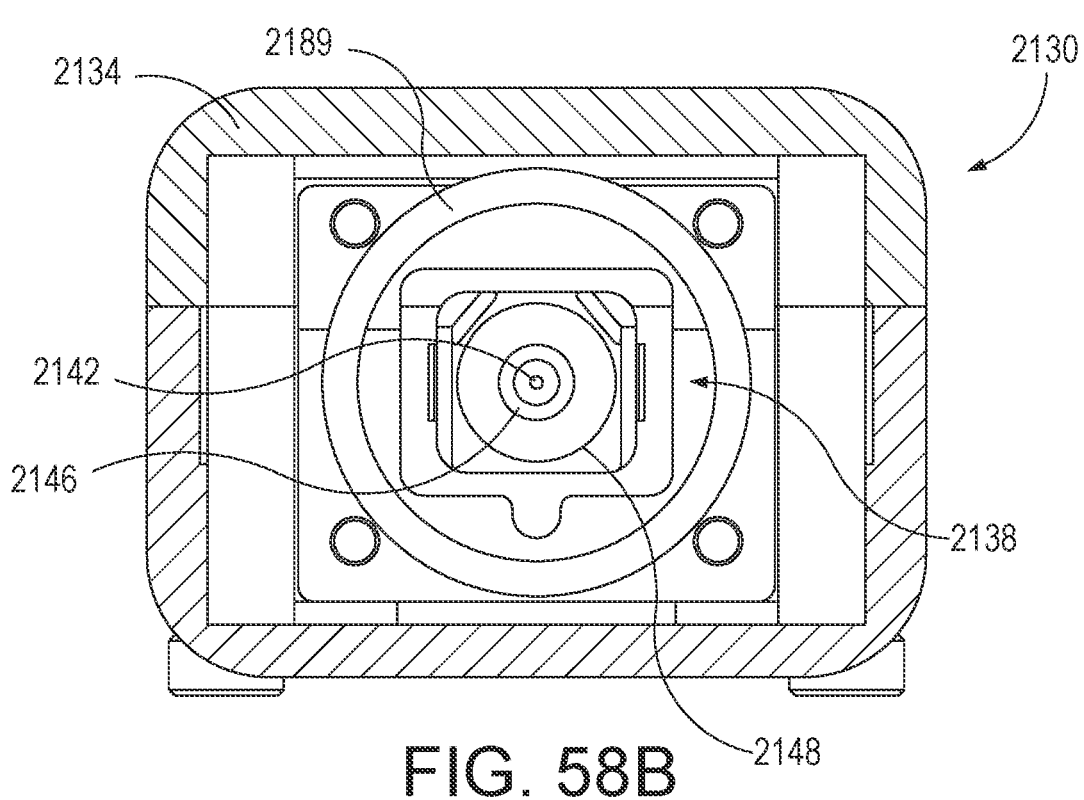
FIG. 58B is a cross-section view of the carriage optical fiber connector of FIG. 58A, as viewed along the cut-plane 58B-58B of FIG. 58A.

FIGS. 58A and 58B illustrate another system-side solution configured in accordance with an embodiment of the present technology. In this arrangement, the carriage optical fiber connector 2130 includes one or more components configured to draw particles away from the optical fiber 2142 and/or ferrule 2146. For example, carriage optical fiber connector 2130 can include an electrostatic component 2189. The electrostatic component 2189, for example, can have an annular shape and surround at least a portion of the carriage fiber optic assembly 2138. The electrostatic component 2189 may comprise an electrostatic air filter to, for example, ionize the dust particles. In some embodiments, the electrostatic component 2189 is passive and does not require a power source. In some embodiments, the electrostatic component 2189 is operably connected to a power source (not shown) within the medical system 2100. The electrostatic component 2189 can ionize particles/debris to have a positive or negative charge. The ferrule 2146 and/or optical fiber 2142 can have the same charge as the ionized particles. The housing 2134 of the fiber connector assembly can have the opposite charge to draw the ionized particles to it and away from the ferrule 2146 and/or optical fiber 2142. In some embodiments, the electrostatic component 2189 includes a removable cartridge, and the removable cartridge that can be replaced, cleaned, or otherwise maintained. The electrostatic component 2189 can be used independently or in conjunction with one or more of the outwardly-opening system-side doors, laterally-sliding system-side doors, the rollers 2166, the cleaning portions 2168, the doors 2170, the door 2178, the doors 2184, or the rollers 2188 of FIGS. 52A-57. In some embodiments where the electrostatic component 2189 is used in conjunction with the outwardly-opening system-side doors, laterally-sliding system-side doors, the rollers 2166, the cleaning portions 2168, the doors 2170, the door 2178, the doors 2184, and/or the rollers 2188, aspects of each component may further reduce overall particle generation during connection between the instrument optical fiber connector 2128 and the carriage optical fiber connector 2130.

In some embodiments, the interior of the carriage optical fiber connector 2130 can be maintained at a positive pressure (e.g., pressure greater than ambient pressure). Positive pressure can be generated by one or more fans or other air moving components of the medical system 2100. For example, air from the vent systems and/or exhaust systems of the medical system 2100 can be redirected to the carriage optical fiber connector 2130. In some embodiments, a separate fan can be positioned within or adjacent the carriage optical fiber connector 2130 to generate positive pressure within the carriage optical fiber connector 2130. Positive pressure can be produced on a continuous or selective basis. For example, positive pressure within the carriage optical fiber connector 2130 can be initiated upon opening of the door(s) of the carriage optical fiber connector 2130 or some other predetermined time. When positive pressure or airflow is applied, particles within the carriage optical fiber connector 2130 may be directed out of the housing 2134 of the carriage optical fiber connector 2130. As previously explained, the door 2154 of the instrument optical fiber connector 2128 might not open until later in the engagement process, so the instrument optical fiber may be protected from particles as they are directed out of the housing 2134 of the carriage optical fiber connector 2130.

Figure 59:
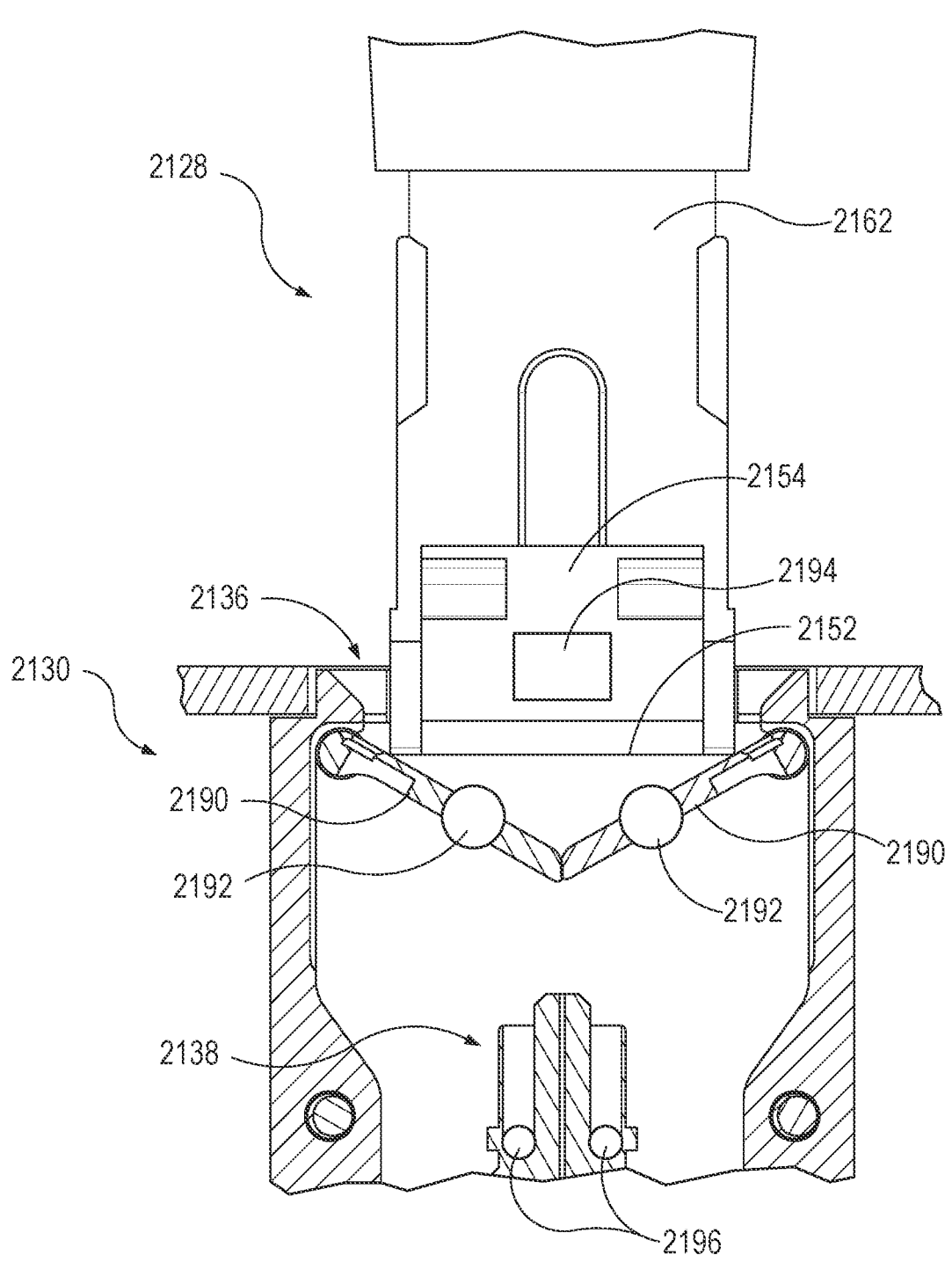
FIG. 59 is a partial cross-section view of an instrument optical fiber connector and a carriage optical fiber connector having magnets configured in accordance with an embodiment of the present technology.

As mentioned above, some solutions to the particle-production problem can be implemented on both the instrument side (e.g., modifications to the instrument optical fiber connector 2128 or portions thereof) and the system side (e.g., modifications to the carriage optical fiber connector 2130, the carriage 2122, or one or more portions thereof). FIG. 59 illustrates such a solution in accordance with an embodiment of the present technology. In this embodiment, the carriage optical fiber connector 2130 can include doors 2190 having one or more magnets 2192 configured to facilitate opening of the doors 2190 without requiring contact with the instrument optical fiber connector 2128 (e.g., the distal ends 2152). The instrument optical fiber connector 2128 can include one or more magnets 2194 configured to repel the doors 2190 and/or the magnets 2192 of the doors 2190 of the carriage optical fiber connector 2130. In some embodiments, the magnetic force of the magnets 2192, 2194 and/or the spring force of the doors 2190 are configured to facilitate full opening of the doors 2190 without contact from the instrument optical fiber connector 2128 or any portion thereof. In some embodiments, the carriage fiber optic assembly 2138 also includes one or more magnets 2196. The magnets 2196 can be configured to repel the magnet 2194 of the instrument optical fiber connector 2128. For example, in embodiments where the magnet 2194 is positioned on the door 2154 of the instrument optical fiber connector 2128, the magnets 2196 of the carriage fiber optic assembly 2138 can force the door 2154 to open via magnetic force without requiring the door 2154 to contact any portion of the carriage fiber optic assembly 2138. The magnets 2192, 2194, 2196 or additional magnets can be positioned at other locations on the instrument optical fiber connector 2128 and/or on the carriage optical fiber connector 2130. For example, one or more magnets may be positioned on the housing 2162 of the instrument optical fiber connector 2128, on the ferrules, and/or on other components. The magnets can have varying shapes, sizes, and/or magnetic forces. Reducing or eliminating contact between the components of the instrument optical fiber connector 2128 and the carriage optical fiber connector 2130 may reduce or eliminate the production of particles during connection and disconnection of the instrument optical fiber connector 2128 from the carriage optical fiber connector 2130. The magnets 2192 and/or 2194 can be used independently or in conjunction with one or more of the outwardly-opening system-side doors, laterally-sliding system-side doors, the rollers 2166, the cleaning portions 2168, the doors 2170, the door 2178, the doors 2184, the rollers 2188, or electrostatic component 2189 of FIGS. 52A-58. In some embodiments where the magnets 2192 and/or 2194 are used in conjunction with the outwardly-opening system-side doors, laterally-sliding system-side doors, the rollers 2166, the cleaning portions 2168, the doors 2170, the door 2178, the doors 2184, the rollers 2188, and/or electrostatic component 2189, aspects of each component may further reduce overall particle generation during connection between the instrument optical fiber connector 2128 and the carriage optical fiber connector 2130.

Figure 60:
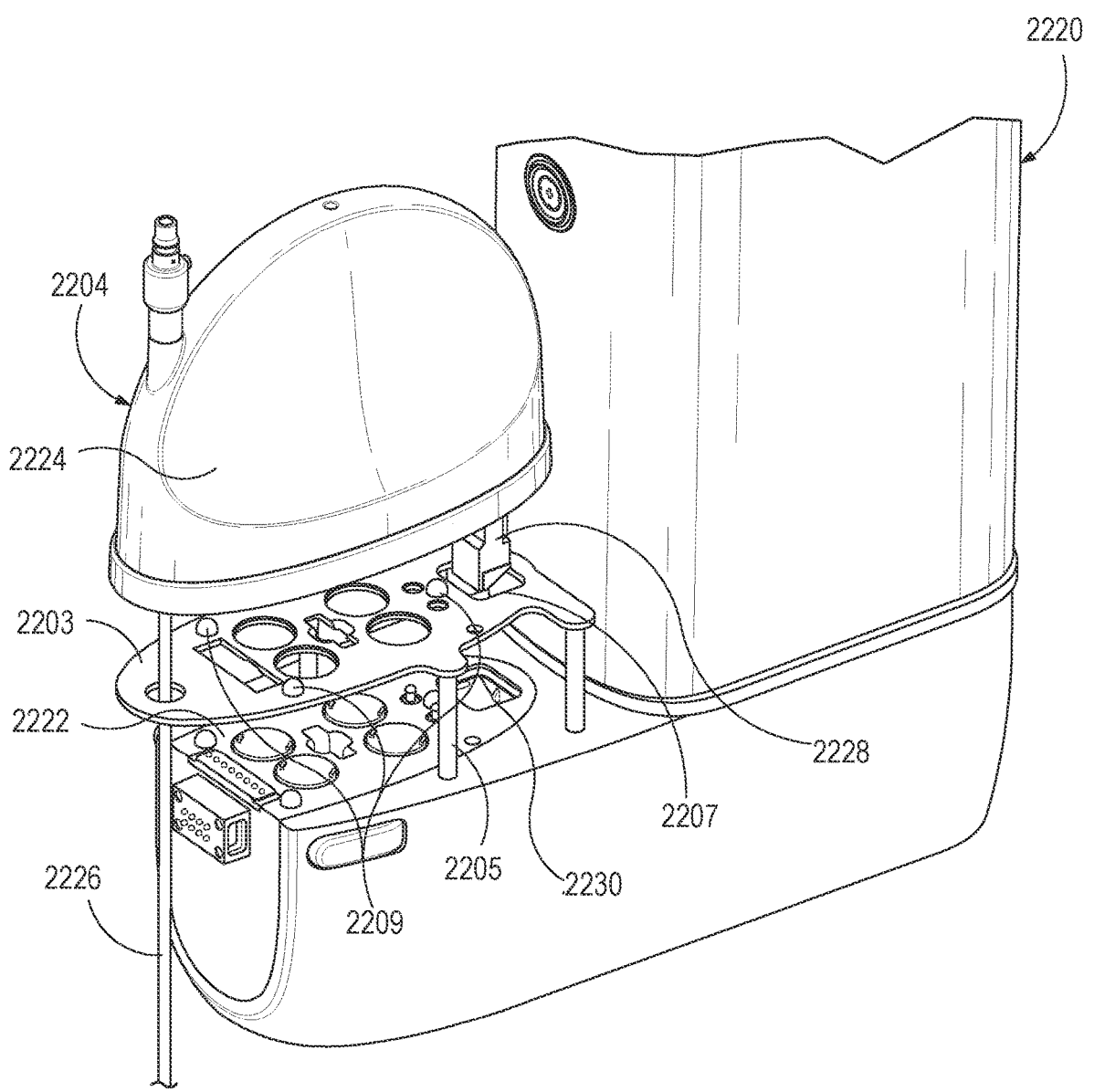
FIG. 60 is a perspective view of a translating alignment plate extending from the carriage of the manipulator assembly of FIG. 47B, configured in accordance with an embodiment of the present technology.

FIG. 60 shows another embodiment of a friction-reducing interface between a medical instrument 2204 and an instrument manipulator 2220 configured for use with the system 2100. The instrument manipulator 2220 may include a translating alignment plate 2203 coupled to an upper surface of the carriage 2222. Certain features of the medical instrument 2204 and the instrument manipulator 2220 shown in FIG. 60 are similar to features of the medical instrument 2104 and the instrument manipulators of FIGS. 47A-59 described above. As such, the features of the medical instrument 2204 and the instrument manipulator 2220 are denoted in the 2200-series with like numbers corresponding to similar features of the medical instrument 2104 and the instrument manipulator 2120 denoted in the 2100-series, unless otherwise stated.

The translating alignment plate 2203 may be configured to linearly translate from (a) a first position above the upper surface of the carriage 2222 where the instrument optical fiber connector 2228 is not inserted into the carriage optical fiber connector 2230, to (b) a second position adjacent the carriage 2222 where the instrument optical fiber connector 2228 is inserted in the carriage optical fiber connector 2230. The translating alignment plate 2203 may include one or more telescoping standoffs 2205 that constrain the translating alignment plate 2203 to the linear translation. The standoffs 205 may be further configured to dampen translation of the translating alignment plate 203 for control of the rate of connection between the instrument optical fiber connector 228 and the carriage optical fiber connector 230, as high impulse connections can damage the exposed ends of the fibers.

As illustrated in FIG. 60, the translating alignment plate 2203 may include an optical fiber connector pass-through 2207 to receive the instrument optical fiber connector 2228 as the medical instrument 2204 is initially mated to the translating alignment plate 2203 in the first position. The translating alignment plate 2203 may also include one or more alignment indices 2209 configured to position the medical instrument 2204 with respect to the translating alignment plate 2203 such that the instrument optical fiber connector 2228 is generally aligned with the carriage optical fiber connector 2230 as the translating alignment plate 2203 moves from the first position to the second position. To form the connection between the instrument optical fiber connector 2228 and the carriage optical fiber connector 2230, the medical instrument 2204 is first aligned and coupled to the translating alignment plate 2203, and then the medical instrument 2204 and the translating alignment plate 2203 are simultaneously lowered from the first position to the second position, inserting the instrument optical fiber connector 2228 into the carriage optical fiber connector 2230. In some embodiments, shutters of the carriage optical fiber connector 2230 may be configured to open when the medical instrument 2204 is coupled to the translating alignment plate 2203. In some embodiments, connection and/or alignment of the elongate device 2226 (e.g., catheter) with the alignment plate 2203 triggers opening of the shutters/doors of the carriage optical fiber connection 2230. Opening the shutters/doors of the carriage optical fiber connector 2230 when the medical instrument 2204 is coupled to the translating alignment plate 2203 may reduce or eliminate contact between the instrument optical fiber connector 2228 and the shutters/doors, thereby reducing or eliminating production of particles during connection between the instrument optical fiber connector 2228 and the carriage optical fiber connector 2230.

As the translating alignment plate 2203 is lowered from the first position to the second position, various other mechanical and/or electrical connections are formed between the carriage 2222 and the medical instrument 2204. To facilitate such mechanical connections, the translating alignment plate 2203 may include various openings for passing through movements of the controls of the instrument manipulator 2220 such that the movements are relayed to the various receiving components of the medical instrument 2204. Similarly, the translating alignment plate 2203 may include electrical connectors to form connections between the instrument manipulator 2220 and the medical instrument 2204. In some embodiments, the translating alignment plate

2203 has one or more intermediate components to transfer movement and/or signals of the instrument manipulator 2220 to the medical instrument 2204. In embodiments with intermediate components, the translating alignment plate 2203 may serve as a clean connection for sterile environments, e.g., a drape can be coupled to a perimeter of the translating alignment plate 2203. The translating alignment plate 2203 can be used independently or in conjunction with one or more of the outwardly-opening system-side doors, laterally-sliding system-side doors, the rollers 2166, the cleaning portions 2168, the doors 2170, the door 2178, the doors 2184, the rollers 2188, electrostatic component 2189, or magnets 2192, 2194 of FIGS. 52A-59. In some embodiments where the translating alignment plate 203 is used in conjunction with the outwardly-opening system-side doors, laterally-sliding system-side doors, the rollers 2166, the cleaning portions 2168, the doors 2170, the door 2178, the doors 2184, the rollers 2188, electrostatic component 2189, and/or the magnets 2192, 2194, aspects of each component may further reduce overall particle generation during connection between the instrument optical fiber connector 2128 and the carriage optical fiber connector 2130.

Figure 61:
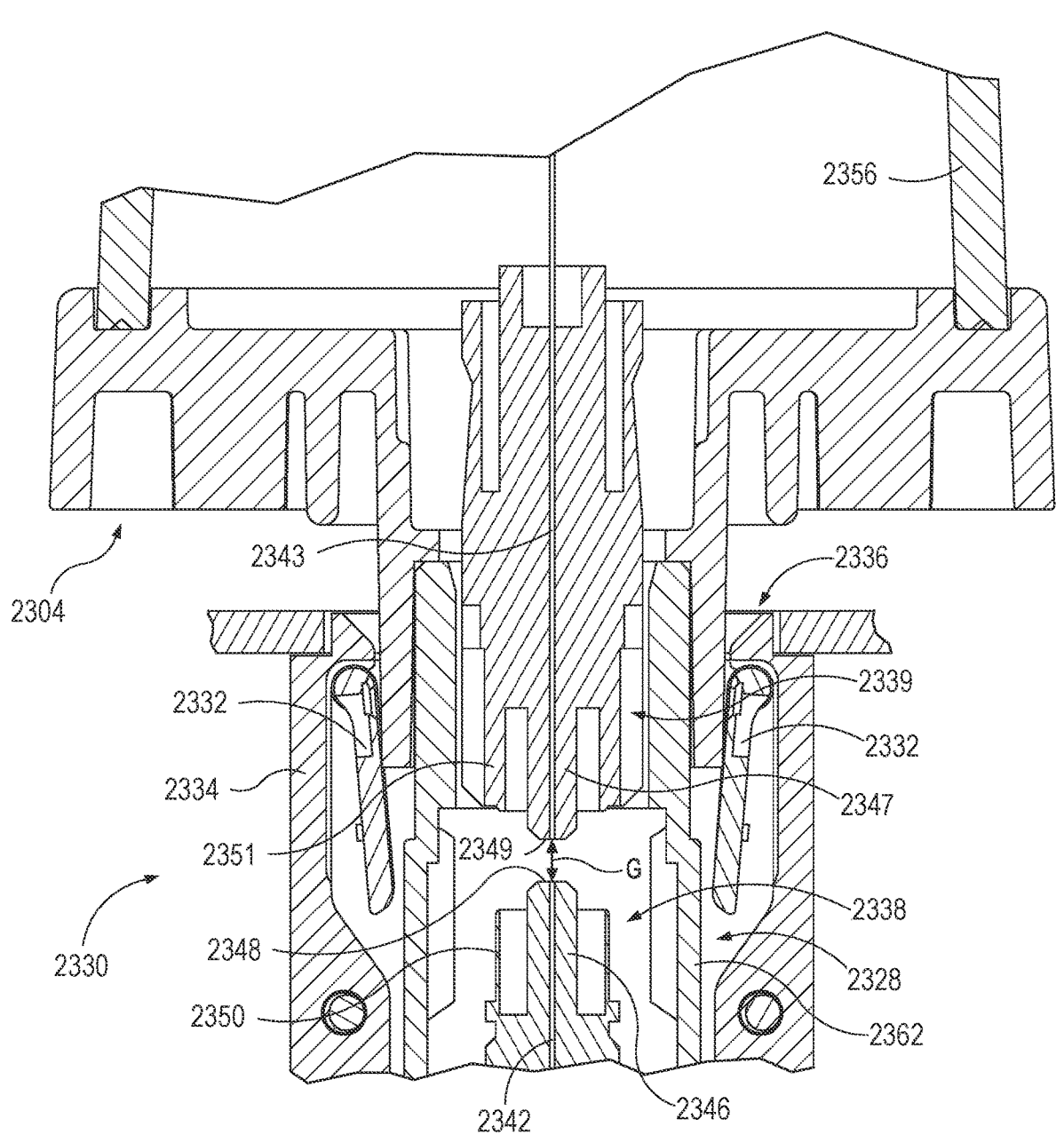
FIG. 61 is a cross-section view of an instrument optical fiber connector and a carriage optical fiber connector having retractable optical fibers configured in accordance with an embodiment of the present technology.

FIG. 61 illustrates a system and instrument side solution in accordance with another embodiment of the present technology. More specifically, FIG. 60 illustrates the carriage optical fiber connector 2330 connection with an instrument optical fiber connector 2328 of the medical instrument 2304. Certain features of the medical instrument 2304 and the carriage optical fiber connector 2330 shown in FIG. 61 are similar to features of the medical instruments 2104, 2204 and the carriage optical fiber connectors 2130, 2230 of FIGS. 47A-60 described above. As such, the features of the medical instrument 2304 and the carriage optical fiber connector 2330 are denoted in the 2300-series with like numbers corresponding to similar features of the medical instrument 2104, 2204 and the carriage optical fiber connector 2130, 2230 denoted in the 2100-series and 2200-series, unless otherwise stated.

As illustrated, the instrument optical fiber connector 2328 can include instrument fiber assembly 2339 positioned at least partially within the housing 2362 of the instrument optical fiber connector 2328. The instrument fiber assembly 2339 can include an instrument optical fiber 2343. The instrument optical fiber 2343 can be surrounded, at least in part, by a ferrule 2347. In some embodiments, the instrument fiber assembly 2339 includes a shroud 2351 surrounding at least a portion of the ferrule 2347. The distal end 2349 of the instrument optical fiber 2343 can be exposed. The distal end 2349 of the optical fiber 2343 can be configured to operably connect to the proximal end 2348 of the optical fiber 2342 of the carriage optical fiber connector 2330.

One or both of the instrument optical fiber 2343 and the optical fiber 2342 of the carriage optical fiber connector 2330 (and/or the associated ferrules 2346, 2347) can be configured to translate between an engaged position and withdrawn position. In the withdrawn position, as illustrated in FIG. 61, the optical fibers 2342, 2343 are spaced from each other by gap G. One or both of the optical fibers 2342, 2343 can be configured to move toward the other optical fiber after the instrument optical fiber connector 2328 is engaged with the carriage optical fiber connector 2330. For example, the carriage optical fiber connector 2330 and/or the instrument optical fiber connector 2328 can include one or more actuators (e.g., motors) configured to move one or both of the optical fibers 2342, 2343. The actuator(s) can be configured to move the fiber(s) 2342, 2343 when, for example, the housing 2362 of the instrument optical fiber connector 2328 is fully seated in the carriage optical fiber connector 2330. Full engagement/seating between the instrument optical fiber connector 2328 and the carriage optical fiber connector 2330 can be detected by one or more sensors (e.g., positional/proximity sensors). Maintaining a gap G between the optical fibers 2342, 2343 until after the instrument optical fiber connector 2328 is engaged with the carriage optical fiber connector 2330 may reduce or eliminate the risk of impacting the optical fibers 2342, 2343 against each other in a manner that could damage one or both optical fibers 2342, 2343. The translating ferrules can be used independently or in conjunction with one or more of the outwardly-opening system-side doors, laterally-sliding system-side doors, the rollers 2166, the cleaning portions 2168, the doors 2170, the door 2178, the doors 2184, the rollers 2188, electrostatic component 2189, magnets 2192, 2194, or translating alignment plate 2203 of FIGS. 52A-60. In some embodiments where the translating ferrules are used in conjunction with the outwardly-opening system-side doors, laterally-sliding system-side doors, the rollers 2166, the cleaning portions 2168, the doors 2170, the door 2178, the doors 2184, the rollers 2188, electrostatic component 2189, the magnets 2192, 2194, and/or the translating alignment plate 2203, aspects of each component may further reduce overall particle generation during connection between the instrument optical fiber connectors 2128, 2228, 2328 and the carriage optical fiber connectors 2130, 2230, 2330.

In some embodiments, the doors of any of the above-described instrument optical fiber connectors and/or carriage optical fiber connectors can be opened prior to contact between the instrument optical fiber connector and the carriage optical fiber connector. For example, the instrument optical fiber connector and/or carriage optical fiber connector can include sensors (e.g., proximity sensors) configured to detect when the instrument optical fiber connector and the carriage optical fiber connector are close to each other. Example sensors include near field communication devices, motion sensors, IR sensors, and/or other sensors or combinations of sensors configured to detect proximity between the instrument optical fiber connector and the carriage optical fiber connector. The doors of one or both of the instrument optical fiber connector and the carriage optical fiber connector can be configured to open automatically (e.g., via an electric motor or other actuator) when a distance between the instrument optical fiber connector and the carriage optical fiber connector is detected to be less than a threshold (e.g., minimum) distance. In some embodiments, relative position measurements between the elongate device 2126 and components of the instrument manipulator 2120 can trigger opening of the doors of the instrument optical fiber connector and/or the carriage optical fiber connector. In some embodiments, doors of one or both of the instrument optical fiber connector and the carriage optical fiber connector are configured to open in response to a signal from a controller. The controller can be part of the overall medical system 2100, the manipulator assembly 2102, or part of another system. In some embodiments, the controller is configured to receive input from the one or more sensors (e.g., proximity sensors). Example systems and methods for measuring the relative position/advancement of elongate devices with respect to instrument manipulators and/or devices connected to instrument manipulators (e.g., an anti-buckling guide) are described in International Application No. PCT/2019/040965 (filed Jul. 9, 2019, titled "Systems and Methods for Tool Detection and Associated Control Modes"), the entire contents of which are hereby incorporated by reference herein and made part of the present disclosure.

Examples

Several aspects of the present technology are set forth in the following examples.

Example 1. An apparatus comprising:
  a housing;
  an optical fiber extending through at least a portion of the housing; and
  a first optical fiber connector connected to the housing and the optical fiber, wherein the first optical fiber connector is configured to connect to a second optical fiber connector, and
    wherein the first optical fiber connector includes—an optical fiber connector housing; and one or more rollers connected to the optical fiber connector housing;
  wherein, as the first optical fiber connector moves into contact with the second optical fiber connector—
    the one or more rollers are configured to contact a portion of the second optical fiber connector and roll to reduce friction between the first optical fiber connector and the second optical fiber connector.

Example 2. The apparatus of example 1 wherein the one or more rollers are composed of a polymer material.

Example 3. The apparatus of example 1 or example 2 wherein the fiber connector housing comprises a first end portion connected to the housing and a second end portion extending from the housing, and wherein the one or more rollers are positioned on the second end portion of the fiber connector housing.

Example 4. The apparatus of example 3 wherein the first optical fiber connector comprises a door configured to prohibit access to the optical fiber when the door is in a closed position, and wherein the door includes a swabbing surface configured to contact one or more of a ferrule or an optical fiber in the second optical fiber connector.

Example 5. The apparatus of any of examples 1-4 wherein the one or more rollers comprise a first roller and a second roller, and wherein the first roller is connected to the optical fiber connector housing on a same side of the optical fiber connector housing as the second roller.

Example 6. The apparatus of any of examples 1-5, further comprising a flexible elongate device extending from the housing, wherein the optical fiber extends through at least a portion of the flexible elongate device.

Example 7. The apparatus of any of examples 1-6, further comprising a ferrule surrounding at least a distal portion of the optical fiber.

Example 8. The apparatus of example 7 wherein:
  the ferrule is configured to translate between a retracted position and an extended position;
  the ferrule is spaced closer to the one or more rollers in the extended position than in the retracted position; and
  the ferrule is configured to translate from the retracted position to the extended position after full connection between the first optical fiber connector and the second optical fiber connector.

Example 9. The apparatus of example 1 or example 2, further comprising a door configured to prohibit access to the optical fiber when the door is in a closed position, wherein the door is configured to open without contacting a ferrule or an optical fiber of the second optical fiber connector.

Example 10. The apparatus of example 9, further comprising a magnet connected to or embedded in the door, wherein the magnet is configured to repel one or more of a door of the second optical fiber connector or a magnet of the second optical fiber connector.

Example 11. The apparatus of example 9, wherein the door is configured to open without contacting the ferrule or the optical fiber of the second optical fiber connector based on a signal received from a controller.

Example 12. The apparatus of example 9 wherein the door is configured to open when a signal from a proximity sensor indicates that a distance between the optical fiber of the first optical fiber connector and the optical fiber of the second optical fiber connector is less than a threshold distance.

Example 13. The apparatus of example 12, further comprising the proximity sensor, wherein the proximity sensor is configured to detect distance between the optical fiber of the first optical fiber connector and the optical fiber of the second optical fiber connector.

Example 14. An apparatus comprising:
    a housing;
    one or more doors configured to transition between a first configuration and a second configuration; and
    a first optical fiber connection within the housing, the first optical fiber connection comprising—
    an optical fiber having a distal portion; and
    a ferrule surrounding at least the distal portion of the optical fiber;
    wherein—
    the one or more doors are configured to block access to the optical fiber when the one or more doors are in the first configuration;
    the one or more doors are configured to facilitate access to the optical fiber when the one or more doors are in the second configuration; and
    the one or more doors are configured to transition from the first configuration to the second configuration before the one or more doors contact a second apparatus having a second optical fiber connection.

Example 15. The apparatus of example 14, further comprising an electrostatic structure positioned within the housing and configured to gather debris away from the optical fiber.

Example 16. The apparatus of example 15 wherein the electrostatic structure comprises an annular structure surrounding at least a portion of the ferrule of the first optical fiber connection.

Example 17. The apparatus of examples 15 or 16 wherein the electrostatic structure is configured to activate when the one or more doors are in the second configuration.

Example 18. The apparatus of any of examples 14-17 wherein:
    the ferrule is configured to transition between a retracted position and an extended position;
    the ferrule is spaced closer to the one or more doors in the extended position than in the retracted position; and
    the ferrule is configured to translate from the retracted position to the extended position after full connection between the first optical fiber connection and the second optical fiber connection.

Example 19. The apparatus of any of examples 14-18 wherein the one or more doors are configured to translate in a direction perpendicular to a longitudinal axis of the ferrule of the first optical fiber connection when transitioning between the first configuration and the second configuration.

Example 20. The apparatus of any of examples 14-19 wherein the one or more doors are configured to rotate about one or more axes of rotation parallel to a longitudinal axis of the ferrule of the first optical fiber connection when transitioning between the first configuration and the second configuration.

Example 21. The apparatus of any of examples 14-18 wherein the one or more doors are configured to rotate away from the ferrule of the first optical fiber connection when transitioning between the first configuration and the second configuration.

Example 22. The apparatus of any of examples 14-18 wherein the one or more doors comprise a magnet configured to repel one or more of a door of the second apparatus or a magnet of the second optical fiber connection.

Example 23. The apparatus of any of examples 14-18, further comprising a controller configured to transition the one or more doors to the second configuration before the one or more doors contact the second apparatus.

Example 24. The apparatus of example 23 wherein the controller is configured to transition the one or more doors to the second configuration based on the controller receiving a signal from a proximity sensor indicating that a distance between the optical fiber of the first optical fiber connection and a second optical fiber of the second optical fiber connection is less than a threshold distance.

Example 25. The apparatus of example 24, further comprising the proximity sensor, wherein the proximity sensor is configured to detect distance between the optical fiber of the first optical fiber connection and the second optical fiber of the second optical fiber connection.

Example 26. The apparatus of example 24 or example 25 wherein the proximity sensor comprises a near field communication sensor.

Example 27. The apparatus of any of examples 14-26 wherein the apparatus comprises a medical system, wherein the second apparatus comprises a catheter, and wherein the one or more doors are configured to transition from the first configuration to the second configuration when a portion of the catheter reaches a predetermined position with respect to the medical system.

Example 28. The apparatus of any of examples 14-27, further comprising a fan configured to generate positive air pressure within the housing.

Example 29. The apparatus of example 28 wherein the fan is actuated when the one or more doors transition from the first configuration to the second configuration.

Example 30. The apparatus of example 28 or example 29 wherein the fan generates positive air pressure within the housing when the one or more doors are in the first configuration.

Example 31. The apparatus of any of examples 14-30, further comprising a translating alignment plate connected to the housing, wherein the one or more doors are configured to transition from the first configuration to the second configuration when an elongate device of the second apparatus is connected to or aligned with the translating alignment plate.

Example 32. The apparatus of example 31, wherein the translating alignment plate comprises one or more telescoping standoffs configured to restrict motion of the translating alignment plate to a linear translation.

Example 33. An apparatus comprising:
    a housing;
    one or more doors configured to transition between a closed configuration and an opened configuration; and
    a first optical fiber connection within the housing, wherein the first optical fiber connection includes—
    an optical fiber having a distal portion; and a ferrule surrounding at least the distal portion of the optical fiber;

wherein— the one or more doors are configured to block access to the optical fiber when the one or more doors are in the closed configuration;

the one or more doors are configured to allow access to the optical fiber when the one or more doors are in the opened configuration; and the one or more doors are configured to inhibit or prevent introduction of particles to the distal portion of the optical fiber during transition of the one or more doors between the closed configuration and the opened configuration.

Example 34. The apparatus of example 33 wherein the one or more doors include one or more rollers configured to reduce friction between the one or more doors and a second optical fiber connection of a second apparatus.

Example 35. The apparatus of examples 33 or 34 wherein a first door of the one or more doors comprise a first hinge and a second hinge, and wherein at least a portion of the first door is configured to rotate away from the optical fiber when the first door transitions to the opened configuration from the closed configuration.

Example 36. The apparatus of example 35 wherein the second hinge is positioned between the first hinge and a distal portion of the door, and wherein the second hinge is configured to bias the distal portion of the first door away from the optical fiber when the first door transitions to the opened configuration from the closed configuration.

Example 37. The apparatus of example 33, wherein the one or more doors are configured to translate in a direction perpendicular to a longitudinal axis of the ferrule of the first optical fiber connection when transitioning between the closed configuration and the opened configuration.

Example 38. The apparatus of example 33 wherein the one or more doors are configured to rotate about one or more axes of rotation parallel to a longitudinal axis of the ferrule of the first optical fiber connection when transitioning between the closed configuration and the opened configuration.

Example 39. The apparatus of any of examples 33-37 wherein the one or more doors are configured to rotate away from the ferrule of the first optical fiber connection when transitioning between the closed configuration and the opened configuration.

Example 40. The apparatus of examples 33 or 34 wherein the one or more doors comprises a hinge and a free end opposite the hinge, and wherein the free end of the one or more doors does not overlap the first optical fiber in a direction parallel to a longitudinal axis of the ferrule when the one or more doors are in the closed configuration.

Example 41. The apparatus of any of examples 33-40 wherein the one or more doors comprise a magnet configured to repel one or more of a door of a second apparatus or a magnet of the second apparatus.

Example 42. The apparatus of any of examples 33-41, further comprising a fan configured to generate positive air pressure within the housing.

Example 43. The apparatus of example 42 wherein the fan is actuated when the one or more doors transition to the opened configuration.

Example 44. The apparatus of example 42 or example 43 wherein the fan generates positive air pressure within the housing when the one or more doors are in the closed configuration.

Example 45. The apparatus of any of examples 33-44, further comprising an electrostatic structure positioned within the housing and configured to gather debris away from the optical fiber.

Example 46. The apparatus of example 45 wherein the electrostatic structure comprises an annular structure surrounding at least a portion of the ferrule of the first optical fiber connection.

Example 47. The apparatus of examples 45 or 46 wherein the electrostatic structure is configured to activate when the one or more doors are in the opened configuration.

Example 48. An apparatus comprising:

a housing;

one or more doors configured to transition between a closed configuration and an opened configuration;

an optical fiber connection within the housing, wherein the optical fiber connection includes an optical fiber having a distal portion; and an electrostatic structure positioned within the housing and configured to gather debris away from the optical fiber.

Example 49. The apparatus of example 48 wherein the electrostatic structure comprises an annular structure surrounding at least a portion of the optical fiber.

Example 50. The apparatus of example 48 or example 49 wherein the electrostatic structure is configured to activate when the one or more doors are in the opened configuration.

CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. Moreover, the various embodiments described herein may also be combined to provide further embodiments. For example, the electrostatic component 2189 described above may be combined with the features of any of the other embodiments described in the present disclosure. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment.

For ease of reference, identical reference numbers are used to identify similar or analogous components or features throughout this disclosure, but the use of the same reference number does not imply that the features should be construed to be identical. Indeed, in many examples described herein, identically numbered features have a plurality of embodiments that are distinct in structure and/or function from each other. Furthermore, the same shading may be used to indicate materials in cross section that can be compositionally similar, but the use of the same shading does not imply that the materials should be construed to be identical unless specifically noted herein.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. As used herein, with respect to measurements, terms of degree such as "about," "approximately," "substantially," etc. mean+/−5%. Additionally, the term "comprising" is used throughout to mean including at least the recited feature(s) such that any greater number of the same feature and/or additional types of other features are not precluded. Directional terms, such as "upper," "lower," "front," "back," "vertical," and "horizontal," may be used herein to express and clarify the relationship between various elements. It should be understood that such terms do not denote absolute orientation. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. The breadth and scope of the present invention(s) should not be limited by any of the above-described illustrative embodiments but should be defined only in accordance with the claims and their equivalents.

What is claimed is:

1. A system, comprising:
an optical fiber;
a manipulator assembly configured to manipulate a medical instrument, the manipulator assembly comprising:
a chassis;
an optical fiber cleaning assembly housed within the chassis, comprising:
a cleaning tape;
a first spool on which the cleaning tape is wound; and
a second spool onto which the cleaning tape is drawn after use; and
a drive mechanism housed within the chassis and configured to advance the cleaning tape from the first spool to the second spool such that a portion of the cleaning tape wipes a face of the optical fiber; and
a control unit configured to control the drive mechanism to advance the cleaning tape.

2. The system of claim 1, wherein the cleaning tape is impregnated with an index matching fluid having a refractive index that corresponds to a refractive index of one or more cores of the optical fiber.

3. The system of claim 2, wherein the index matching fluid is contained within a reservoir enclosed within the chassis.

4. The system of claim 1, wherein the optical fiber cleaning assembly further comprises an optical sensor configured to detect particulate matter on the face of the optical fiber.

5. The system of claim 4, further comprising an indicator configured to indicate when particulate matter is present on the face of the optical fiber as detected by the optical sensor.

6. The system of claim 4, wherein the optical sensor detects particulate matter by capturing an image of the face of the optical fiber.

7. The system of claim 4, wherein the optical sensor detects particulate matter by detecting an outline of an object on the face of the optical fiber.

8. The system of claim 1, wherein the drive mechanism is configured to rotate a rotating disk of the system to rotate a capstan of a device and advance the cleaning tape.

9. The system of claim 1, wherein the drive mechanism is configured to actuate a pump such that index matching fluid is supplied by the pump onto the cleaning tape.

10. The system of claim 1, further comprising a contact sensor configured to detect when a second optical fiber contacts the cleaning tape, wherein when the second optical fiber contacts the cleaning tape as determined by the contact sensor, the control unit causes the drive mechanism to automatically advance the cleaning tape.

11. The system of claim 1, wherein the cleaning tape comprises a plurality of apertures arranged along a longitudinal axis of the cleaning tape, and wherein the plurality of apertures are spaced from one another.

12. The system of claim 11, wherein the plurality of apertures have a diameter smaller than a diameter of the optical fiber to prevent the optical fiber from passing through the plurality of apertures and allow the optical fiber to be visible through the plurality of apertures.

13. The system of claim 1, wherein the optical fiber is an optical fiber of the manipulator assembly.

14. The system of claim 1, wherein the chassis defines a cleaning window, a portion of the optical fiber being arranged in the cleaning window.

15. The system of claim 14, wherein the cleaning window is arranged on a front surface of the manipulator assembly.

16. The system of claim 14, wherein the cleaning window is configured to receive a second optical fiber.

17. The system of claim 14, further comprising guide members to help position the cleaning tape across the cleaning window and maintain the cleaning tape under tension.

18. The system of claim 1, wherein the manipulator assembly further comprises a barrier configured to prevent connection of the optical fiber and a second optical fiber if particulate matter is detected on the optical fiber or the second optical fiber.

19. A system, comprising:
an optical fiber;
a manipulator assembly comprising:
a chassis;
an optical fiber cleaning assembly housed within the chassis, comprising:
a cleaning tape;
a first spool on which the cleaning tape is wound; and
a second spool onto which the cleaning tape is drawn after use; and
a drive mechanism housed within the chassis and configured to advance the cleaning tape from the first spool to the second spool such that a portion of the cleaning tape wipes a face of the optical fiber; and
a control unit configured to control the drive mechanism to advance the cleaning tape, wherein the cleaning tape comprises a plurality of apertures arranged along a longitudinal axis of the cleaning tape, wherein the plurality of apertures are spaced from one another, and wherein the plurality of apertures have a diameter larger than a diameter of the optical fiber to allow the optical fiber to pass through the plurality of apertures.

20. A system, comprising:
an optical fiber;
a manipulator assembly comprising:
a chassis;
an optical fiber cleaning assembly housed within the chassis, comprising:
a cleaning tape;
a first spool on which the cleaning tape is wound; and a second spool onto which the cleaning tape is drawn after use; and a drive mechanism housed within the chassis and configured to advance the cleaning tape from the first spool to the second spool such that a portion of the cleaning tape wipes a face of the optical fiber; and a control unit configured to control the drive mechanism to advance the cleaning tape, wherein the chassis defines a cleaning window, a portion of the optical fiber being arranged in the cleaning window, wherein the cleaning window is configured to receive a second optical fiber, and wherein when the cleaning tape is advanced, an opposing portion of the cleaning tape wipes a face of the second optical fiber.

* * * * *